(12) United States Patent
Kai et al.

(10) Patent No.: US 8,716,976 B2
(45) Date of Patent: May 6, 2014

(54) CONTACTLESS ELECTRICITY-SUPPLYING DEVICE

(75) Inventors: Toshihiro Kai, Yamato (JP); Kraisorn Throngnumchai, Yokohama (JP); Yusuke Minagawa, Yokosuka (JP); Yasuaki Hayami, Yokosuka (JP); Kengo Maikawa, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 343 days.

(21) Appl. No.: 13/320,099

(22) PCT Filed: May 14, 2010

(86) PCT No.: PCT/JP2010/058162
§ 371 (c)(1),
(2), (4) Date: Nov. 11, 2011

(87) PCT Pub. No.: WO2010/131732
PCT Pub. Date: Nov. 18, 2010

(65) Prior Publication Data
US 2012/0056580 A1 Mar. 8, 2012

(30) Foreign Application Priority Data

May 14, 2009 (JP) ................................. 2009-117527
Apr. 27, 2010 (JP) ................................. 2010-101755

(51) Int. Cl.
*H02J 7/00* (2006.01)
(52) U.S. Cl.
USPC ......................................... 320/108; 320/109
(58) Field of Classification Search
USPC ....................................................... 320/108
See application file for complete search history.

(56) References Cited

U.S. PATENT DOCUMENTS

| 5,093,638 A * | 3/1992 | Kinsman et al. ............... 333/195 |
| 2002/0080635 A1* | 6/2002 | Yasumura ........................ 363/97 |

(Continued)

FOREIGN PATENT DOCUMENTS

| JP | 2002-49428 A | 2/2002 |
| JP | 2003-37949 A | 2/2003 |

(Continued)

*Primary Examiner* — Arun Williams
(74) *Attorney, Agent, or Firm* — Foley & Lardner LLP

(57) ABSTRACT

A contactless electricity-supplying device (20) includes a secondary winding (201) to which electric power is supplied from a primary winding (101), by an AC power supply (6). The impedance characteristic (Z) of $Z_1$ in regard to the frequency has a local maximum ($Z_{MAX}$) near the frequency ($f_0$) of the fundamental wave component of aforementioned AC power supply (6); and the impedance characteristic (Z) of $Z_2$ in regard to the frequency has the aforementioned frequency ($f_0$) of the fundamental wave component to be between, a frequency ($f_{MAX}$) that has its local maximum ($Z_{MAX}$) nearest to aforementioned frequency ($f_0$) of the fundamental wave component, and a frequency ($f_{MIN}$) that has its local minimum ($Z_{Min}$) nearest to the frequency ($f_0$) of the fundamental wave component. $Z_1$ indicates that the coupling coefficient (k) between aforementioned primary winding (101) and aforementioned secondary winding (201) is a prescribed value (0.3), and that it is an impedance of just the primary side ($Z_1$) as seen from the output side of aforementioned AC power supply (6); and $Z_2$ indicates that the coupling coefficient (k) between aforementioned primary winding (101) and aforementioned secondary winding (201) is the aforementioned prescribed value (0.3), and that it is an impedance of just the secondary side ($Z_2$) as seen from the side of a load (72) to be connected to aforementioned secondary winding (201).

25 Claims, 35 Drawing Sheets

(56) References Cited

U.S. PATENT DOCUMENTS

| | | | |
|---|---|---|---|
| 2002/0125244 A1* | 9/2002 | Yokozeki et al. | 219/619 |
| 2004/0124779 A1* | 7/2004 | Howald et al. | 315/111.51 |
| 2005/0270805 A1* | 12/2005 | Yasumura | 363/16 |
| 2007/0152904 A1* | 7/2007 | Castaneda et al. | 343/859 |
| 2007/0205730 A1* | 9/2007 | Baarman | 315/338 |
| 2007/0247883 A1 | 10/2007 | Belyanina | |
| 2009/0208162 A1* | 8/2009 | Yap | 385/3 |

FOREIGN PATENT DOCUMENTS

| | | |
|---|---|---|
| JP | 2008-125198 A | 5/2008 |
| JP | 2008-312357 A | 12/2008 |
| RU | 2306653 C1 | 9/2007 |
| RU | 2 322 745 C2 | 4/2008 |
| RU | 2342761 C1 | 12/2008 |
| SU | 1720126 A1 | 3/1992 |
| WO | WO 2007/029438 A1 | 3/2007 |

* cited by examiner

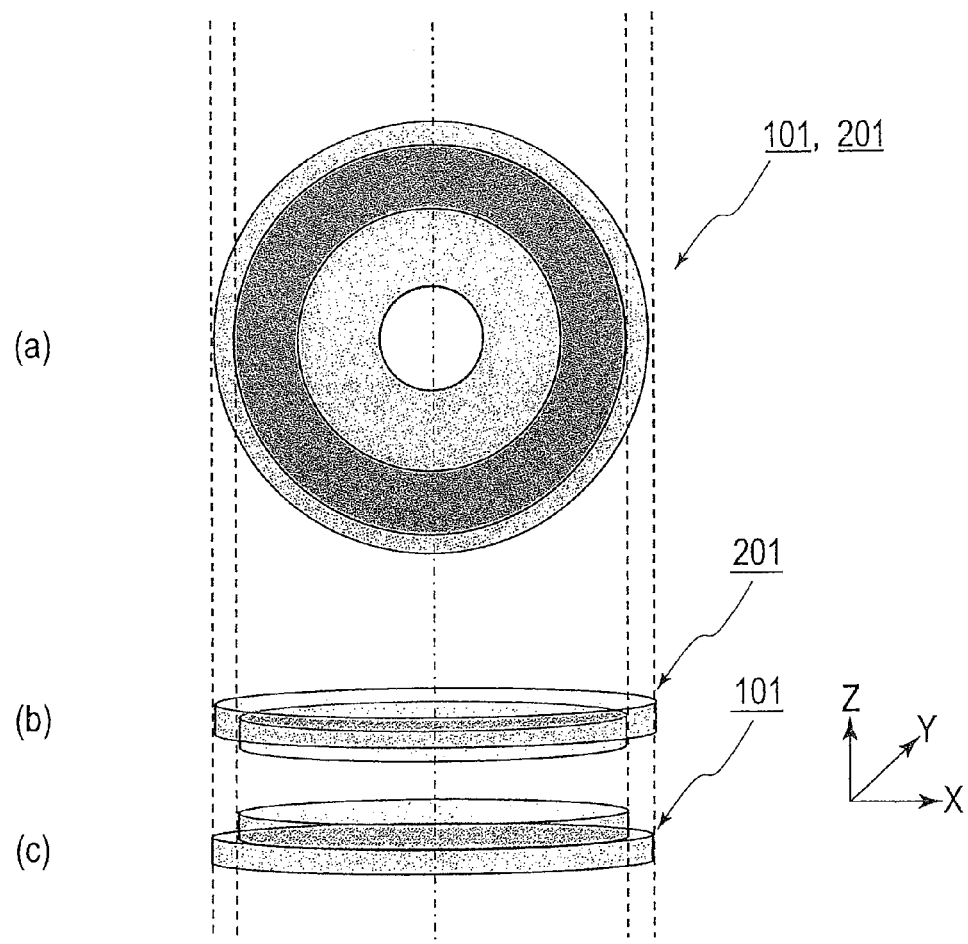

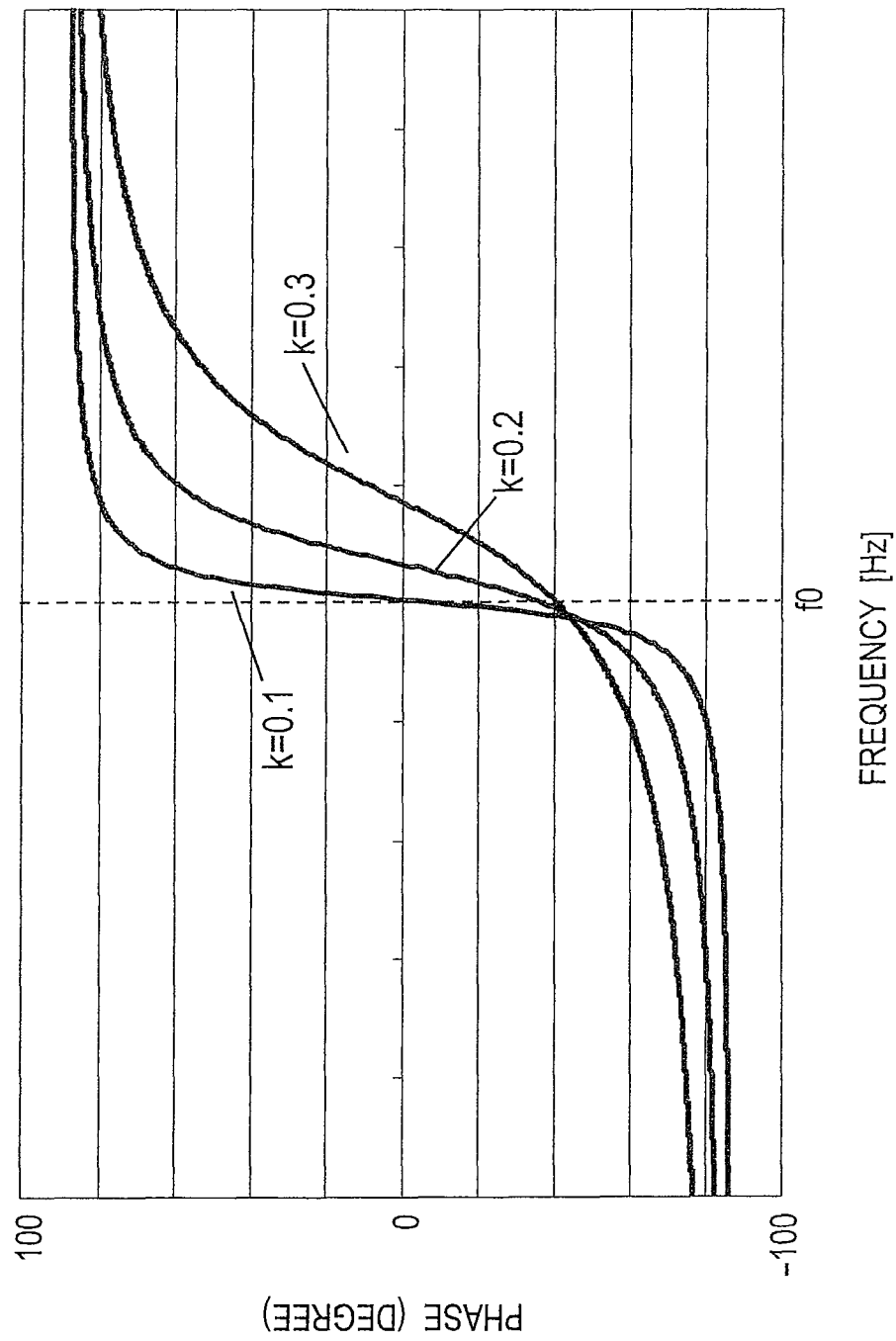

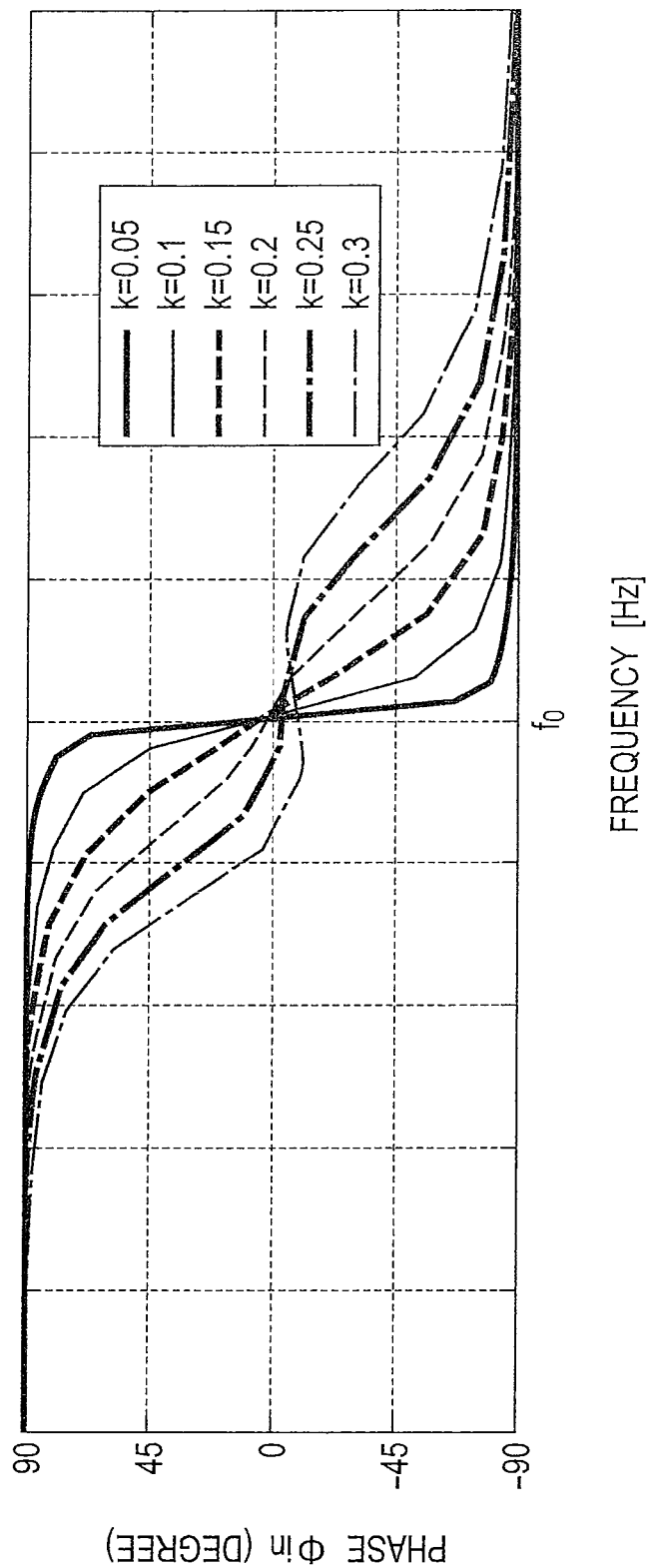

CONTACTLESS ELECTRICITY-SUPPLYING DEVICE

TECHNICAL FIELD

The present invention relates to a contactless electricity-supplying device.

BACKGROUND ART

A contactless electricity-supplying device is conventionally known which has such a structure that a series capacitor is connected to a primary winding driven by an AC power supply and a parallel capacitor is connected to a secondary winding, where the value of each of the series and parallel capacitors is so set based on a certain expression that a transformer of the known contactless electricity-supplying device is substantially equivalent to an ideal transformer.
(Patent Document 1)

CITATION LIST

Patent Literature

PATENT DOCUMENT: International Publication No. 2007/029438

SUMMARY OF INVENTION

Technical Problem

However, in the conventional contactless electricity-supplying device, the capacitor and the like are so set as to accomplish high efficiency on the premise that a coupling coefficient between the primary winding and the secondary winding is constant, therefore, when the coupling coefficient changes, the efficiency of the transformer greatly changes, which was a problem.

Therefore, the present invention provides a contactless electricity-supplying device capable of reducing change of efficiency of a transformer even when the coupling state changes.

Solution to Problem

According to the present invention, an impedance characteristic of $Z_1$ relative to a frequency has the maximum in a vicinity of a frequency of a fundamental wave component of the alternating current power supply, an impedance characteristic of $Z_2$ relative to the frequency has the frequency of the fundamental wave component between, a frequency that has the maximum nearest to the frequency of the fundamental wave component (NA) and a frequency that has the minimum nearest to the frequency of the fundamental wave component, to thereby solve the above problem.

Advantageous Effects of Invention

According to the present invention, the phase characteristic of an impedance (relative to the frequency) viewed from an output side of an alternating current power supply so changes as to rotate around an area in the vicinity of a fundamental wave frequency in accordance with fluctuation of a coupling coefficient. Therefore, when the impedance is set in accordance with the coupling coefficient, the fluctuation band of the phase of the impedance becomes small, as a result, making it possible to suppress decrease of the efficiency.

BRIEF DESCRIPTION OF DRAWINGS

FIG. 2a shows a plan view and a perspective view of the primary winding and secondary winding in FIG. 1.

FIG. 4 shows phase characteristics of the input impedance relative to the frequency in the contactless electricity-supplying device according to the conventional technology.

FIG. 35b shows the phase characteristic of the contactless electricity-supplying device in FIG. 26.

DESCRIPTION OF EMBODIMENTS

Hereinafter, embodiments of the present invention will be explained based on drawings.

First Embodiment

As an example of a contactless power circuit device according to the first embodiment of the present invention, a contactless electricity-supplying device 20 used together with a vehicle-oriented cell and a power load of an electric vehicle and the like will be explained.

Figure 1:
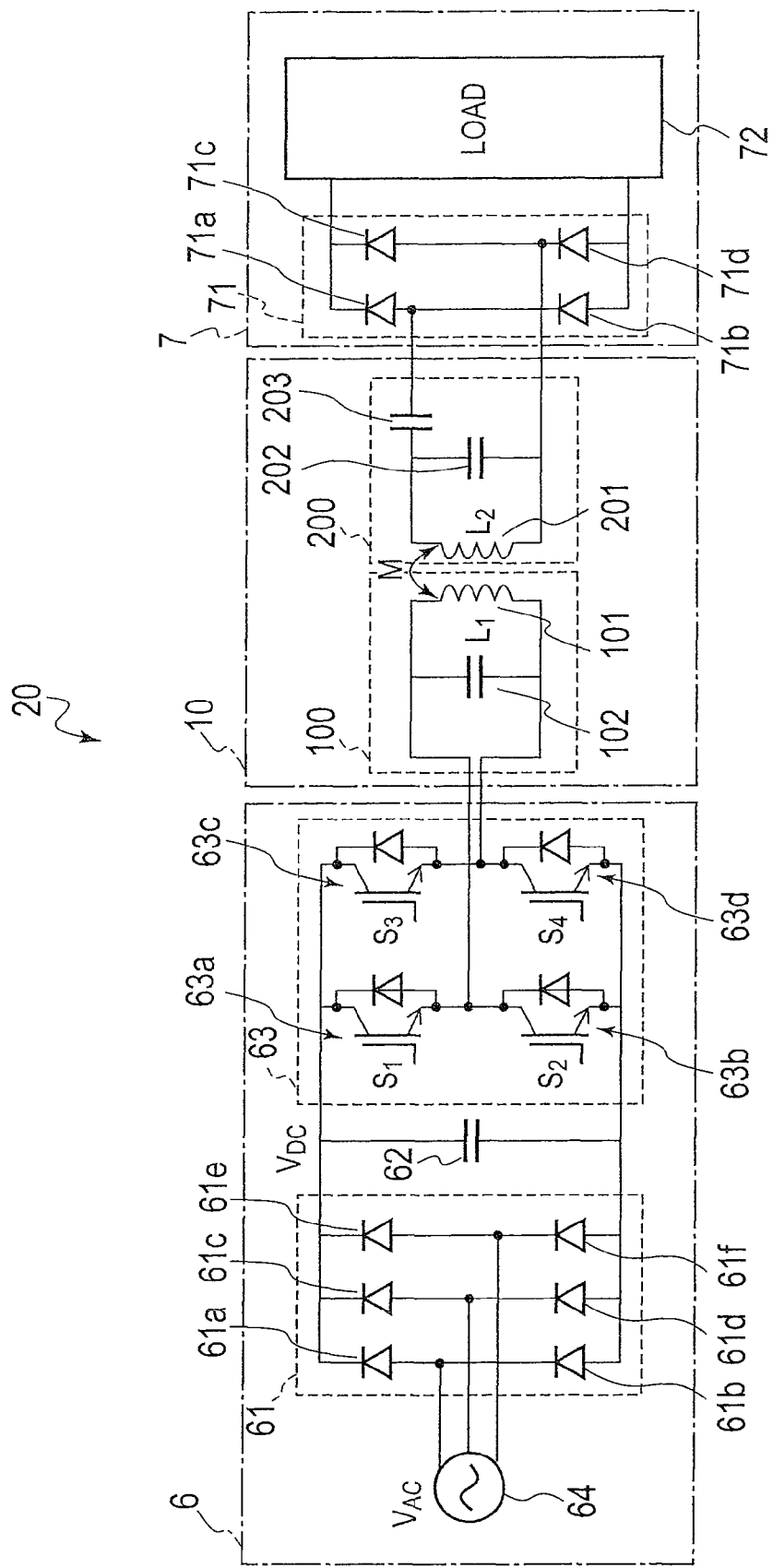
FIG. 1 is an electric circuit diagram of the contactless electricity-supplying device according to the first embodiment of the present invention.

FIG. 1 shows an electric circuit diagram of the contactless electricity-supplying device 20. The contactless electricity-supplying device 20 according to the first embodiment has a high-frequency AC (alternating current) power supply circuit 6, a contactless electricity-supplying portion 10 for contactlessly supplying an electric power outputted from the high-frequency AC power supply circuit 6, and a load 7 to which the electric power is supplied by the contactless electricity-supplying portion 10.

The high-frequency AC power supply circuit 6 has a 3-phase AC power supply 64, a rectifier 61 connected to the 3-phase AC power supply 64 and adapted to rectify a 3-phase alternating current to a direct current, and a voltage-type inverter 63 connected to the rectifier 61 via a smoothing capacitor 62 and adapted to invert the rectified current to a high-frequency electric power. The rectifier 61 has such a structure that a pair of a diode 61a and a diode 61b, a pair of a diode 61c and a diode 61d and a pair of a diode 61e and a diode 61f are connected in parallel (three rows) and each of three outputs of the 3-phase AC power supply 64 is connected to one of respective intermediate connecting points of the above three pairs. The voltage-type inverter 63 has such a structure that a first series circuit having a switching element 63a and a switching element 63b (like switching element 63a) and a second series circuit having a switching element 63c (like switching element 63a) and a switching element 63d (like switching element 63a) are connected in parallel, where each of the switching elements 63a, 63b, 63c and 63d has such a structure that a diode is inversely connected in parallel to a power transistor and the like of MOSFET. The voltage-type inverter 63 is connected with the rectifier 61 via the smoothing capacitor 62. Then, an intermediate connecting point between the switching element 63a and the switching element 63b and an intermediate connecting point between the switching element 63c and the switching element 63d are each connected with a power transmission circuit portion 100 which is a primary side of the contactless electricity-supplying portion 10. The voltage-type inverter 63 supplies an alternating power of about several kHz to 100 kHz to the contactless electricity-supplying portion 10.

The contactless electricity-supplying portion 10 has the power transmission circuit portion 100 as an input side of a transformer and an incoming circuit portion 200 as an output side of the transformer. The power transmission circuit portion 100 has a primary winding 101 and a capacitor 102 which is connected in parallel to the primary winding 101. The incoming circuit portion 200 has a secondary winding 201, a capacitor 202 which is connected in parallel to the secondary winding 201 and a capacitor 203 which is connected in series to a parallel circuit composed of the secondary winding 201 and capacitor 202.

The load portion 7 has a rectifying portion 71 for rectifying into a direct current the alternating power supplied from the contactless electricity-supplying portion 10 and a load 72 which is connected to the rectifying portion 71. The rectifier 71 has such a structure that a pair of a diode 71a and a diode 71b are connected in parallel to a pair of a diode 71c and a diode 71d. Each of two outputs of the incoming circuit portion 200 is connected with one of respective intermediate connecting points of the above two pairs. Then, outputs of the rectifying portion 71 are connected to the load 72.

Then, referring to FIG. 2 and FIG. 3, an explanation is made about a mutual inductance M of the primary winding 101 and secondary winding 201 when the contactless power circuit device (contactless electricity-supplying device 20) is provided for a vehicle and a parking area.

According to the first embodiment, the incoming circuit portion 200 (including the secondary winding 201) and the load portion 7 are provided, for example, for the vehicle while the power transmission circuit portion 100 (including the primary winding 101) and the high-frequency AC power supply circuit 6 are provided, for example, for the parking area as a ground side. In the case of an electric vehicle, the load 72 corresponds, for example, to a secondary battery. The secondary winding 201 is provided for, for example, a chassis of the vehicle. Then, a driver of the vehicle parks the vehicle such that the secondary winding 201 is positioned on (above) the primary winding 101, to thereby supply an electric power from the primary winding 101 to the secondary winding 201, thus charging the secondary battery included in the load 72.

Figure 2B:
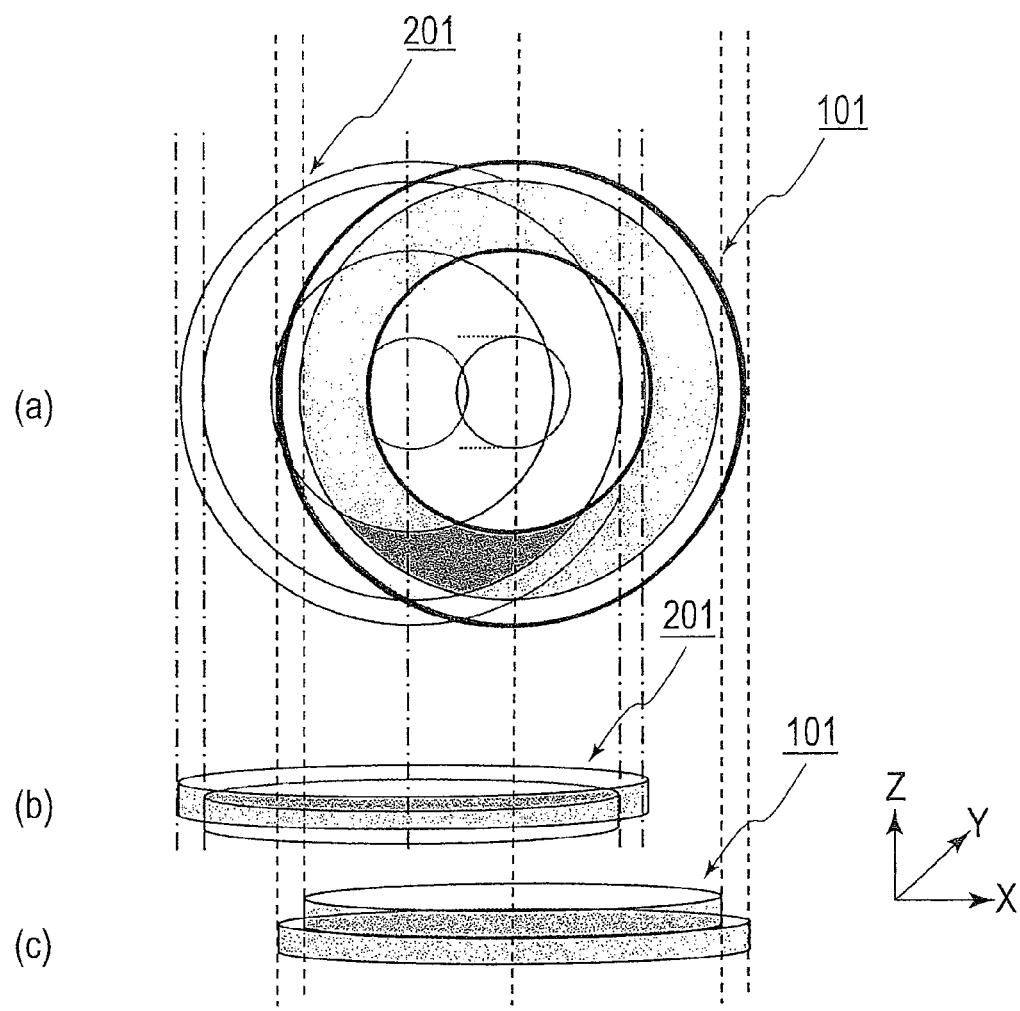
FIG. 2b shows a plan view and a perspective view of the primary winding and secondary winding in FIG. 1.

FIG. 2a and FIG. 2b each show a plan view and a perspective view of the primary winding 101 and secondary winding 201. In FIG. 2a and FIG. 2b, an X-axis and a Y-axis denote a flat surface direction of the primary winding 101 and secondary winding 201 while a z-axis denotes a height direction of the primary winding 101 and secondary winding 201. In FIG. 2a and FIG. 2b, "(a)" denotes the plan view of the primary winding 101 and secondary winding 201, "(b)" denotes the perspective view of the secondary winding 201 and "(c)" denotes the perspective view of the primary winding 101. Now, for convenience sake, the primary winding 101 and secondary winding 201 have the same circular configuration. However, it is not necessary to keep such circular configuration and it is not necessary to form the same configuration between the primary winding 101 and the secondary winding 201, according to the first embodiment.

As shown in FIG. 2a, in the X-axis and Y-axis directions which form the flat surface direction, it is preferable that the vehicle be parked such that the secondary winding 201 coincides with the primary winding 101. However, depending on the driver's technique, a position of the primary winding 101 relative to the secondary winding 201 is, as the case may be, deviated in the flat surface direction. Moreover, the height of the vehicle differs with type of vehicle, therefore, the height of the primary winding 101 and the height of the secondary winding 201 are different from each other with the vehicle height.

Figure 3A:
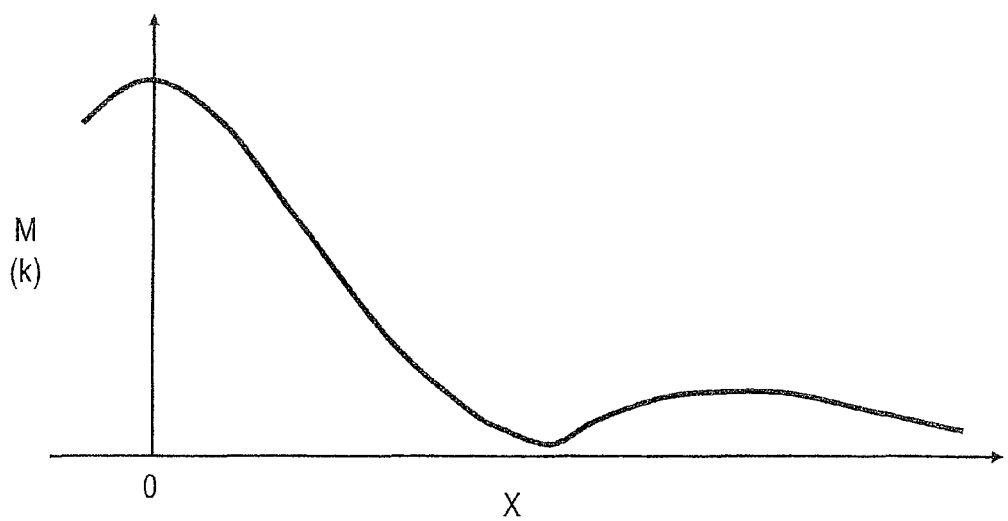
FIG. 3a shows changes of the mutual inductance M relative to the deviation of the secondary winding in the flat surface direction.
Figure 3B:
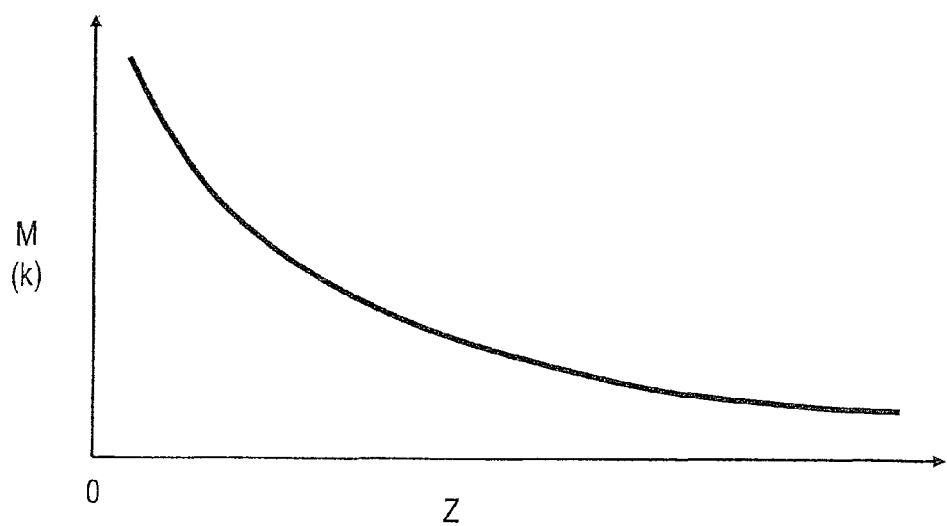
FIG. 3b shows changes of the mutual inductance M relative to the deviation of the secondary winding in the height direction.

FIG. 3a shows changes of the mutual inductance M relative to the deviation of the secondary winding 201 in the X-axis direction in FIG. 2, and FIG. 3b shows changes of the mutual inductance M relative to the deviation of the secondary winding 201 in the Z-axis direction in FIG. 2. As shown in FIG. 2a, when the center of the primary winding 101 coincides with the center of the secondary winding 201, a leak magnetic flux between the primary winding 101 and the secondary winding 201 is small, thereby the value of the X-axis in FIG. 3a corresponds to zero and the mutual inductance M or a coupling coefficient k is larger. On the other hand, as shown in FIG. 2b compared with FIG. 2a, when the position of the primary winding 101 is deviated from the position of the secondary winding 201 in the X-axis direction, the leak magnetic flux is larger, thereby, as shown in FIG. 3a, the mutual inductance M or the coupling coefficient k is smaller. Moreover, when the deviation of the primary winding 101 relative to the secondary winding 201 in the Z-axis (height) direction is larger, as shown in FIG. 3b, the mutual inductance M or the coupling coefficient k is smaller.

Now, a contactless power-supplying device and the like adopted for charging home electric appliances (such as electric toothbrush, shaver and the like) or mobile devices which are made cordless have such a structure that the primary winding 101 does not move relative to the secondary winding 201, therefore, assumption of fluctuation of the mutual inductance M as stated above is not necessary. Thus, on the premise that the mutual inductance M is fixed, the circuit of the capacitors and inductors included in the power transmission circuit portion 100 and incoming circuit portion 200 are designed such that the electric power can be efficiently supplied to the incoming circuit portion 200 under the certain coupling coefficient k.

FIG. 4 shows a phase of an input impedance ($Z_{in}$) viewed from an output side of the AC power supply in the contactless electricity-supplying device in the Patent Document 1, showing a difference in coupling coefficient between the primary winding and the secondary winding. Herein, $f_0$ denotes a frequency of a fundamental wave component of the AC power supply (hereinafter, referred to as fundamental wave frequency). When, as a switching power source, an output of, for example, the inverter is connected to the power transmission circuit portion 100, the fundamental wave frequency $f_0$ depends on a switching frequency of a switching element which drives the inverter. According to the first embodiment, the fundamental wave frequency $f_0$ depends on the switching frequencies of switching elements 63a to 63d.

As showing in FIG. 4, when the coupling coefficient k is 0.1, the phase characteristic of the input impedance is zero in the vicinity of the fundamental wave frequency ($f_0$), therefore, a power factor of supplied power is 1, thus making it possible to efficiently supply the electric power to the load. On the other hand, when the setting of the capacitor-inductor included in the power transmission circuit portion 100 and incoming circuit portion 200 are unchanged and the position of the primary winding 101 is deviated from the secondary winding 201 to thereby change the coupling coefficient k, the phase in the vicinity of the fundamental wave frequency ($f_0$) is delayed to a large extent when the coupling coefficient k is 0.2. Thus, the power factor of the supplied power is decreased, thereby decreasing efficiency of the power-supplying. Moreover, when the coupling coefficient k is changed to become 0.3, the phase in the vicinity of the fundamental wave frequency ($f_0$) is further delayed, to thereby decrease the power factor of the supplied power, thus decreasing the efficiency of the power-supplying.

That is, when the electric power is inputted in a position (primary winding 101 and secondary winding 201) causing the coupling coefficient k=0.1, the power can be efficiently supplied. However, when the position of the primary winding 101 is deviated from the position of the secondary winding 201 to thereby fluctuate the coupling coefficient k, the electric power supplied to the secondary side is remarkably decreased, resulting in decreased efficiency.

Figure 5:
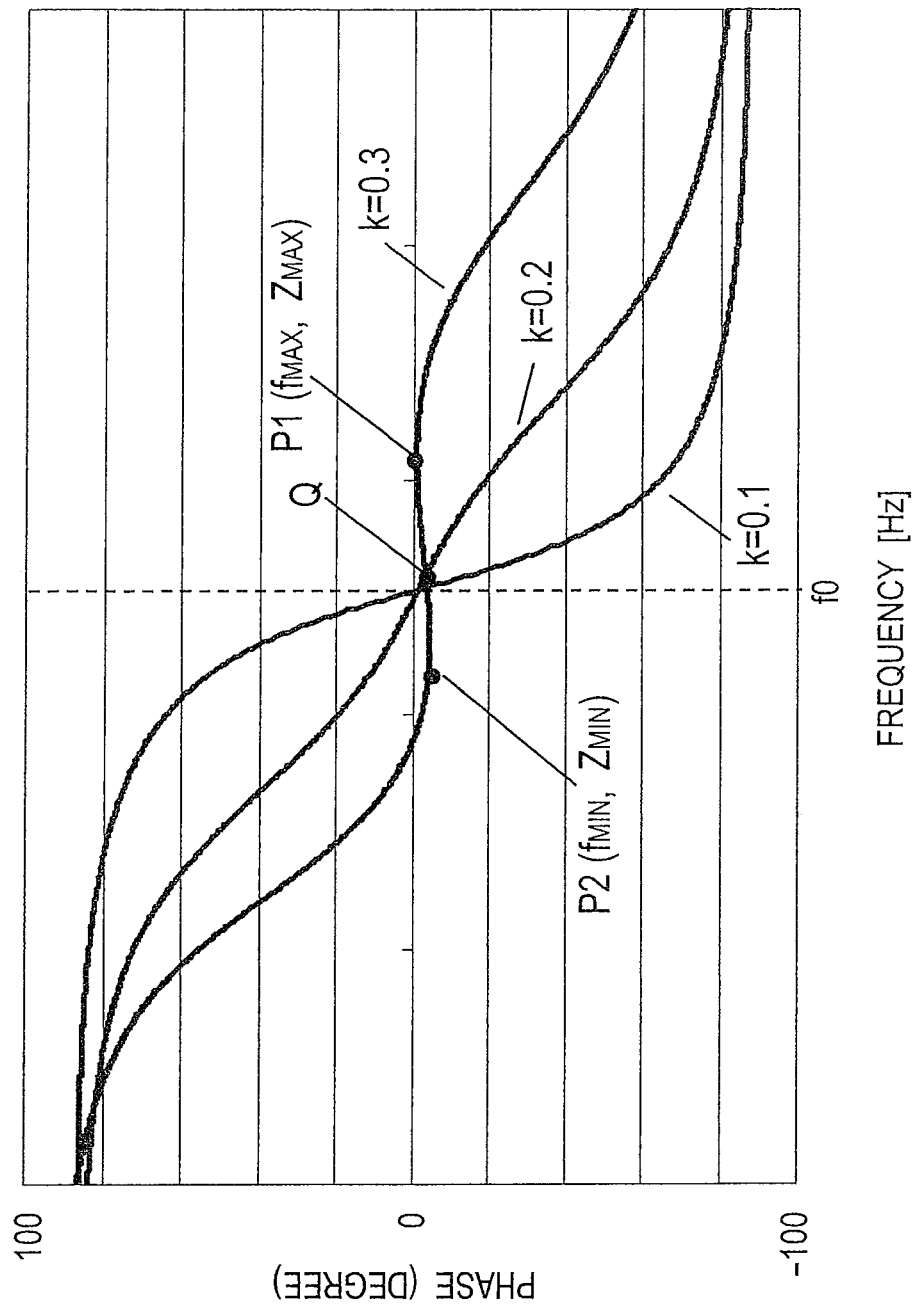
FIG. 5 shows the phase characteristics of the input impedance relative to the frequency in the contactless electricity-supplying device in FIG. 1.

According to the first embodiment, when the coupling coefficient k between the primary winding 101 and the secondary winding 201 takes a certain value, the phase characteristic of the input impedance ($Z_{in}$) of the contactless electricity-supplying portion 10 when viewed from the high-frequency AC power supply circuit 6 side is in parallel with the frequency axis in the vicinity of the frequency ($f_0$) of the fundamental wave component of the high-frequency AC power supply circuit 6. As shown in FIG. 5, with respect to the contactless electricity-supplying device 20 according to the first embodiment, when the coupling coefficient k is 0.3, the phase characteristic of the input impedance ($Z_{in}$) is in parallel with the frequency axis in the vicinity of the fundamental wave frequency ($f_0$). In other words, the phase characteristic of the input impedance ($Z_{in}$) is uneven and is flat in the vicinity of the fundamental wave frequency ($f_0$). In this case, the phase of the input impedance ($Z_{in}$) is close to zero, thereby the power factor of the supplied power is close to 1, and the contactless electricity-supplying portion 10 efficiently supplies the power to the secondary side. In addition, it is not necessary that "in parallel with frequency axis" is exactly parallel with the frequency axis and therefore "in parallel with frequency axis" can include a slight inclination.

Then, with respect to the contactless electricity-supplying device 20 according to the first embodiment, when the coupling coefficient k is fluctuated to become 0.2, the phase characteristic of the input impedance ($Z_{in}$) changes in such a manner as to rotate around an area in the vicinity of the fundamental wave frequency ($f_0$), and the phase in the vicinity of the fundamental wave frequency ($f_0$) does not change to a large extent compared with when the coupling coefficient k is 0.3, that is, the phase in the vicinity of the fundamental wave frequency ($f_0$) is kept close to zero. Moreover, even when the coupling coefficient k is fluctuated to become 0.1, the phase characteristic of the input impedance ($Z_{in}$) changes in such a manner as to rotate around the area in the vicinity of the fundamental wave frequency ($f_0$), and the phase in the vicinity of the fundamental wave frequency ($f_0$) does not change to a large extent compared with when the coupling coefficient k is 0.2 or 0.3, that is, the phase in the vicinity of the fundamental wave frequency ($f_0$) is kept close to zero.

In other words, with respect to the phase characteristic of the input impedance ($Z_{in}$) according to the first embodiment, when the coupling coefficient k between the primary winding 101 and the secondary winding 201 takes the certain value (k=0.3 in FIG. 5), the difference between the maximum ($Z_{MAX}$) and minimum ($Z_{MIN}$) of the phase characteristic of the input impedance ($Z_{in}$) of the contactless electricity-supplying portion 10 is close to zero. Herein, especially, when the phase characteristic has a plurality of maximums ($Z_{MAX}$), the maximum ($Z_{MAX}$) denotes a value corresponding to the frequency that is nearest to the fundamental wave frequency ($f_0$). Also, the same is true of the minimum ($Z_{MIN}$). In FIG. 5, in the case of the frequency ($f_{MAX}$) denoted by a point P1, the phase has the maximum ($Z_{MAX}$) and in the case of the frequency ($f_{MIN}$) denoted by a point P2, the phase has the minimum ($Z_{MIN}$). Then, as shown in FIG. 5, the difference between the maximum ($Z_{MAX}$) and the minimum ($Z_{MIN}$) is close to zero.

In other words, with respect to the phase characteristic of the input impedance ($Z_{in}$) according to the first embodiment, when the coupling coefficient k between the primary winding 101 and the secondary winding 201 takes the certain value (k=0.3 in FIG. 5), the phase characteristic of the input impedance ($Z_{in}$) of the contactless electricity-supplying portion 10 has such a feature that an inflection point is in the vicinity of the fundamental wave frequency ($f_0$) and a tangent line of the inflection point is in parallel with the frequency axis. In FIG. 5, Q denotes the inflection point Q which is in the vicinity of the fundamental wave frequency ($f_0$). Moreover, as shown in FIG. 5, the tangent line of the inflection point Q is in parallel with the frequency axis. In addition, it is not necessary that "in parallel with frequency axis" is exactly parallel with the frequency axis and therefore "in parallel with frequency axis" can include a slight inclination.

As stated above, designing the capacitor-inductor included in the contactless electricity-supplying portion 10 can allow the contactless electricity-supplying device 20 according to the first embodiment to obtain the above-described phase characteristic of the input impedance ($Z_{in}$), with the variable coupling coefficient k taking the certain value. Then, explained next referring to FIG. 6 is an example of a circuit where the input impedance ($Z_{in}$) has the above-described phase characteristic.

Figure 6A:
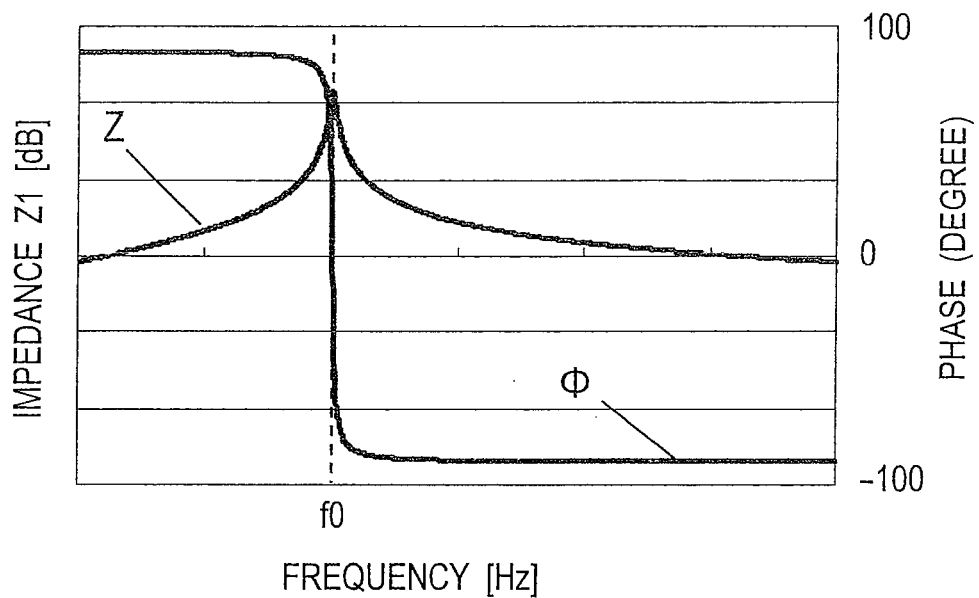
FIG. 6a shows the phase characteristics of the impedance of only the primary side relative to the frequency in the contactless electricity-supplying device in FIG. 1.
Figure 6B:
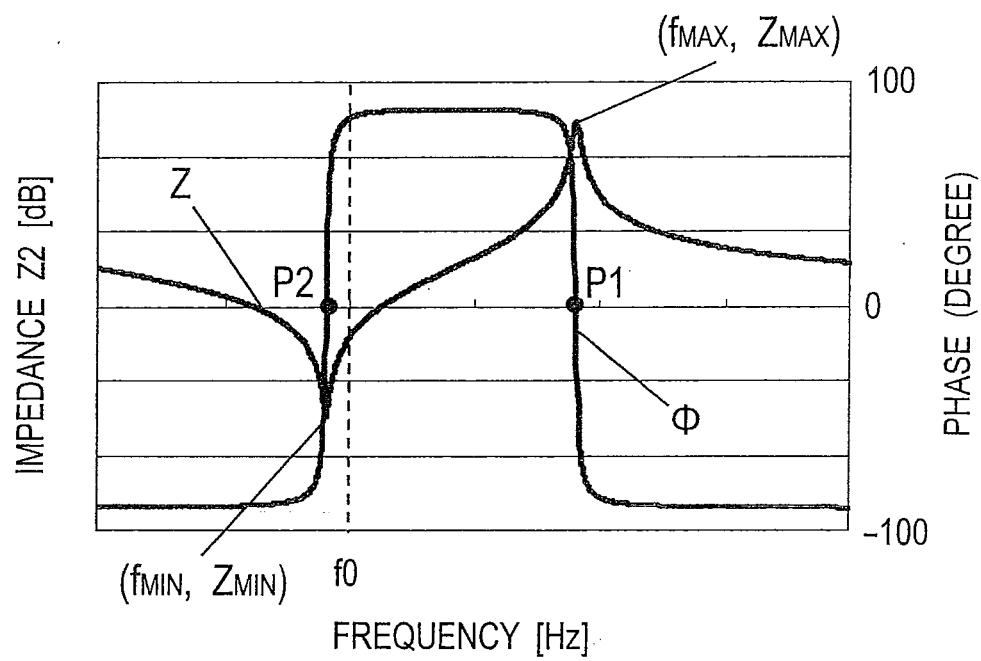
FIG. 6b shows the phase characteristics of the impedance of only the secondary side relative to the frequency in the contactless electricity-supplying device in FIG. 1.

FIG. 6a shows the impedance characteristic (Z) and phase characteristic (Φ) of the impedance ($Z_1$) of only the primary side relative to the frequency when viewed from the high-frequency AC power supply circuit 6 side in the contactless electricity-supplying portion 10 shown in FIG. 1. Moreover, FIG. 6b shows the impedance characteristic (Z) and phase characteristic (Φ) of the impedance ($Z_2$) of only the secondary side relative to the frequency when viewed from the load portion 7 side in the contactless electricity-supplying portion 10 shown in FIG. 1. The impedance ($Z_1$) of only the primary side and the impedance ($Z_2$) of only the secondary side may be respectively calculated, with the mutual inductance M as zero.

As shown in FIG. 6a, the impedance characteristic (Z) of the impedance ($Z_1$) of only the primary side has the maximum in the vicinity of the fundamental wave frequency ($f_0$). Moreover, the phase characteristic (Φ) of the impedance ($Z_1$) of only the primary side keeps about +90 degrees up to the area in the vicinity of the fundamental wave frequency ($f_0$), then diverges the phase inclination in the vicinity of the fundamental wave frequency ($f_0$), and then keeps about −90 degrees over the area in the vicinity of the fundamental wave frequency ($f_0$).

As shown in FIG. 6b, the impedance characteristic (Z) of the impedance ($Z_2$) of only the secondary side has the fundamental wave frequency ($f_0$) between the frequency ($f_{MAX}$) taking the maximum ($Z_{MAX}$) and the frequency ($f_{MIN}$) taking the minimum ($Z_{MIN}$). Herein, especially, in the case of the phase characteristic having a plurality of maximums ($Z_{MAX}$), the maximum ($Z_{MAX}$) denotes a value corresponding to the frequency that is nearest to the fundamental wave frequency ($f_0$). Also, the same is true of the minimum ($Z_{MIN}$). The phase characteristic (Φ) of the impedance ($Z_2$) of only the secondary side has two points (point P1 and point P2 shown in FIG. 6b) at which the phase inclinations are diverged, and has a portion (between the two points P1 and P2) which is parallel to the frequency axis, where the fundamental wave frequency component ($f_0$) is present between the two points P1 and P2. In other words, the above phase characteristic (Φ) makes a turn around the area in the vicinity of the fundamental wave frequency ($f_0$) and comes back.

Then, the impedance ($Z_1$) of only the primary side having the characteristic shown in FIG. 6a is set to the power transmission circuit portion 100 and the impedance ($Z_2$) of only the secondary side having the characteristic shown in FIG. 6b is set to the incoming circuit portion 200, to thereby set the contactless electricity-supplying portion 10 having the above characteristic, as shown in FIG. 5.

As stated above, according to the first embodiment, the position between the primary winding 101 and the position of the secondary winding 201 is fluctuated and the coupling coefficient k is fluctuated, however, at the certain value (k=0.3 in FIG. 5), the phase characteristic of the input impedance ($Z_{in}$) is in parallel with the frequency axis in the vicinity of the fundamental wave frequency ($f_0$). In other words, according to the first embodiment, when the coupling coefficient k takes the certain value, the phase characteristic of the input impedance ($Z_{in}$) of the contactless electricity-supplying portion 10 when viewed from the high-frequency AC power supply circuit 6 side is made parallel to the frequency axis in the vicinity of the fundamental wave frequency ($f_0$) of the high-frequency AC power supply circuit 6. Still, in other words, according to the first embodiment, when the coupling coefficient k takes the certain value, the difference between the maximum ($Z_{MAX}$) and minimum ($Z_{MIN}$) of the phase characteristic of the input impedance ($Z_{in}$) of the contactless electricity-supplying portion 10 is made close to zero. Furthermore, in other words, according to the first embodiment, when the coupling coefficient k takes the certain value, the phase characteristic of the input impedance ($Z_{in}$) of the contactless electricity-supplying portion 10 has the inflection point Q in the vicinity of the fundamental wave frequency ($f_0$) and the tangent line of the inflection point Q is in parallel with the frequency axis.

With this, when the coupling coefficient k fluctuates from the certain value, the phase characteristic of the input impedance ($Z_{in}$) fluctuates in such a manner as to rotate around the point of taking the phase ($\Phi_0$) which corresponds to the fundamental wave frequency ($f_0$), thereby making it possible to decrease the fluctuation band of the phase of the input impedance ($Z_{in}$) relative to the fundamental wave frequency ($f_0$) and to suppress (even when the coupling coefficient k fluctuates) the fluctuation of the phase ($\Phi_0$).

According to the first embodiment, the phase characteristic of the input impedance ($Z_{in}$) having the coupling coefficient k of the certain value has the phase in the vicinity of zero relative to the fundamental wave frequency ($f_0$), thereby making it possible to enhance the efficiency of supplying the electric power to the incoming circuit portion 200 and also making it possible (when the coupling coefficient k fluctuates from the certain value) to supply the electric power with the high efficiency kept.

According to the first embodiment, with respect to the phase characteristic of the input impedance ($Z_{in}$) having the coupling coefficient k of the certain value, when the coupling coefficient k is changed within a constant range relative to the certain value, the phase relative to the fundamental wave frequency ($f_0$) fluctuates in the vicinity of zero. With this, even when the coupling coefficient k is fluctuated from the certain value within the constant range, a high power factor can be kept according to the first embodiment, therefore, as a result, making it possible to keep high efficiency against the fluctuation of the coupling coefficient k and to supply the electric power.

In addition, the above constant range can be determined, for example, in the following manner: when the efficiency of supplying the electric power by fluctuating the coupling coefficient k fluctuates, the coupling coefficient k corresponding to an allowable range of the efficiency is set in advance. The allowable range is properly set depending on performance of the used primary winding 101, used secondary winding 201, standard electric power of the secondary battery as the load 72, and the like.

Hereinafter explained referring to FIG. 7 to FIG. 10 are points and the like that the above impedance characteristic (Z) or phase characteristic ($\Phi$) allows the contactless electricity-supplying device 20 according to the first embodiment to keep higher electricity-supplying efficiency compared with the conventional contactless electricity-supplying device.

Figure 7:
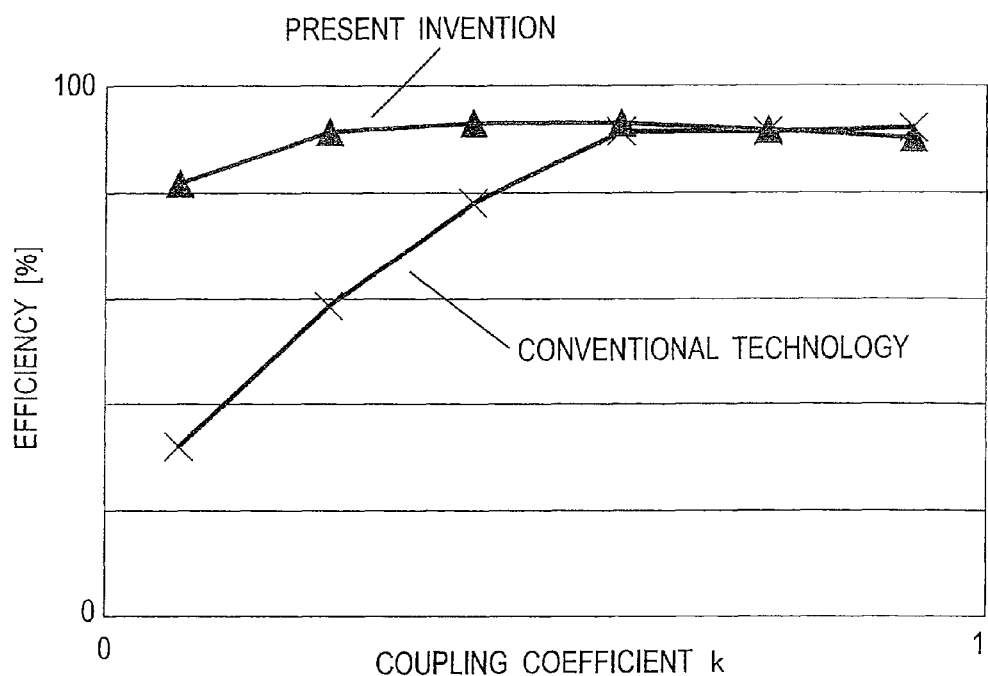
FIG. 7 is a characteristic diagram showing the electricity-supplying efficiency relative to the coupling coefficient.

FIG. 7 shows electricity-supplying efficiency relative to the coupling coefficient k, with respect to the contactless electricity-supplying device 20 according to the first embodiment of the present invention compared with the conventional contactless electricity-supplying device. Herein, the efficiency (%) in FIG. 7 denotes a ratio of an output power from the contactless electricity-supplying portion 10 relative to an input power to the contactless electricity-supplying portion 10. In addition, the frequency is the fundamental wave frequency of the AC power supply connected to the input side.

With respect to the conventional contactless electricity-supplying device, the circuit of inductor-capacitor included in the contactless electricity-supplying portion is designed focusing on the electricity-supplying efficiency, such that the power factor is improved on the premise of high coupling coefficient k. Thus, the electricity-supplying efficiency is high at the high coupling coefficient k. However, as shown in FIG. 7, when the coupling coefficient k is gradually decreased, the electricity-supplying efficiency is rapidly worsened.

On the other hand, with respect to the contactless electricity-supplying device 20 according to the first embodiment of the present invention, the coupling coefficient k, when decreased, can keep the electricity-supplying efficiency higher than that of the conventional technology. Moreover, according to the first embodiment, the coupling coefficient k which is small can accomplish a high electricity-supplying efficiency.

Figure 8:
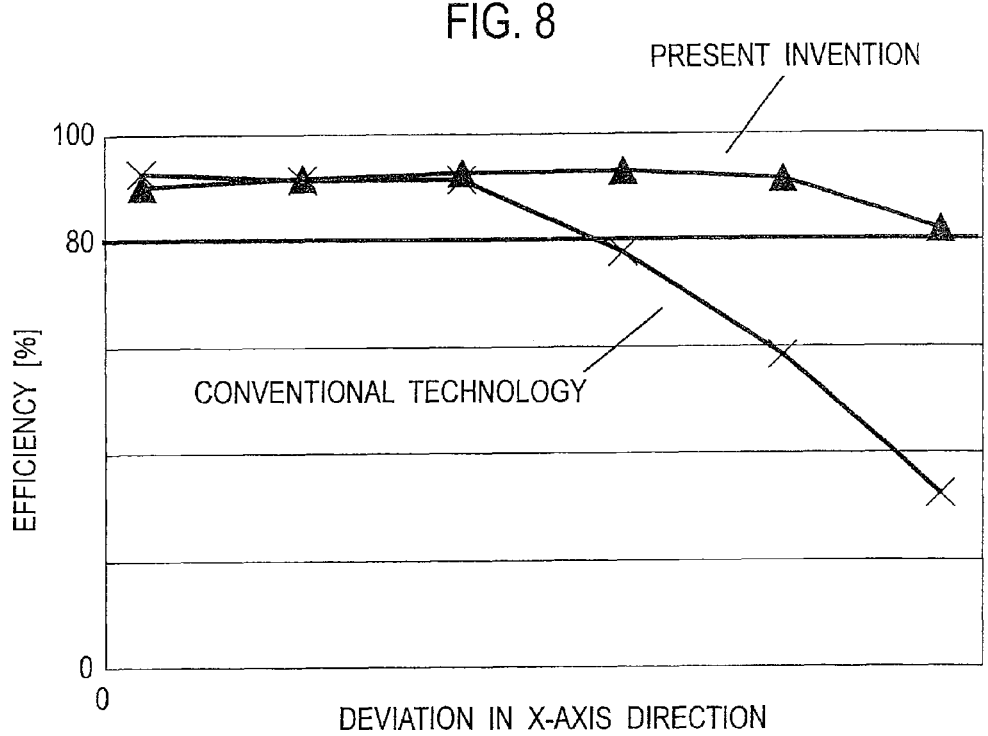
FIG. 8 is a characteristic diagram showing the electricity-supplying efficiency relative to the deviation in the flat surface direction.

FIG. 8 shows electricity-supplying efficiency changes when the position of the primary winding 101 relative to the secondary winding 201 is deviated in the X-axis direction shown in FIG. 2b or FIG. 3a. Herein, the electricity-supplying efficiency is the same as that shown in FIG. 7.

With respect to the conventional contactless electricity-supplying device, when the position of the primary winding 101 relative to the secondary winding 201 is deviated in the X-axis direction, the coupling coefficient k is decreased, therefore, when the deviation is enlarged, the efficiency is rapidly decreased at a certain point. On the other hand, with respect to the contactless electricity-supplying device 20 according to the first embodiment of the present invention, even when the position of the primary winding 101 relative to the secondary winding 201 is deviated, the efficiency can be kept high. Then, with the efficiency necessary for the system as 80% (service condition), 80% or over is defined as an allowable efficiency for the system. In this case, the contactless electricity-supplying device 20 according to the first embodiment can extend the allowability of the decreased efficiency (relative to the deviation in the X-axis direction) by about 1.5 times compared with the conventional technology.

Figure 9:
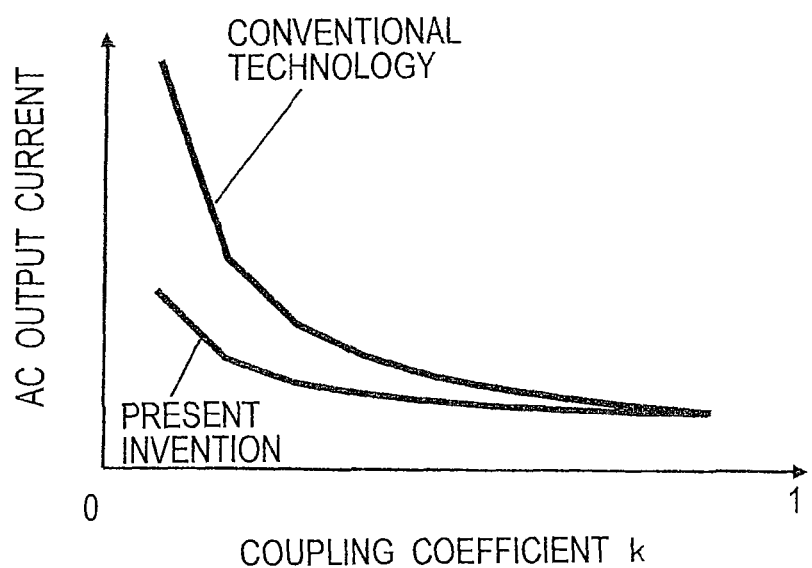
FIG. 9 is a characteristic diagram showing the output current of the AC power supply relative to the coupling coefficient.

FIG. 9 shows the current necessary on the AC power supply side relative to the coupling coefficient k, where such current is observed when obtaining a constant output power is necessary (for example, when a constant power of 10 KW be supplied to the load 72). With respect to the conventional contactless electricity-supplying device, when the coupling coefficient k is high, the necessary power can be supplied to the incoming circuit portion 200 even when the current flowing the power transmission circuit portion 100 is small, however, when the coupling coefficient k is low, the current flowing the power transmission circuit portion 100 is large, thereby increasing the loss which occurs to the primary winding 101 and the like in the circuit. On the other hand, with the contactless electricity-supplying device 20 according to the first embodiment, when the coupling coefficient k is low, the current flowing the power transmission circuit portion 100 can be suppressed small, thereby making it possible to efficiently supply the power to the incoming circuit portion 200.

In addition, according to the first embodiment, when the coupling coefficient k is 0.3, the primary winding 101, capacitor 102, secondary winding 201, capacitor 202 and capacitor 203 included in the contactless electricity-supplying portion 10 are so set that the phase characteristic or impedance characteristic of the input impedance ($Z_{in}$) has the above characteristics, however, the coupling coefficient k failing to meet 0.3 is allowed.

That is, under a condition that the position of the secondary winding 201 relative to the primary winding 101 is changed, when the phase characteristic or impedance characteristic of the input impedance ($Z_{in}$) takes the above characteristics in the fluctuation band of the assumed coupling coefficient k, the coupling coefficient k obtained in this case is defined as the certain value. Moreover, designing the circuit such that the phase of the input impedance ($Z_{in}$) relative to the fundamental wave frequency ($f_0$) in this case is closer to zero can enhance the efficiency.

In addition, the impedance characteristic (Z) of the impedance ($Z_1$) of only the primary side or the impedance characteristic (Z) of the impedance ($Z_2$) of only the secondary side may have an extreme value other than the maximum ($Z_{MAX}$) or minimum ($Z_{MIN}$) that is nearest to the fundamental wave frequency ($f_0$). The high-frequency AC power supply circuit 6 according to the first embodiment corresponds to "alternating current power supply" of the present invention, the capacitor 102 according to the first embodiment corresponds to "first capacitor" of the present invention, and the capacitor 202 and capacitor 203 according to the first embodiment respectively correspond to "third capacitor" and "fourth capacitor" of the present invention.

Second Embodiment

Figure 10:
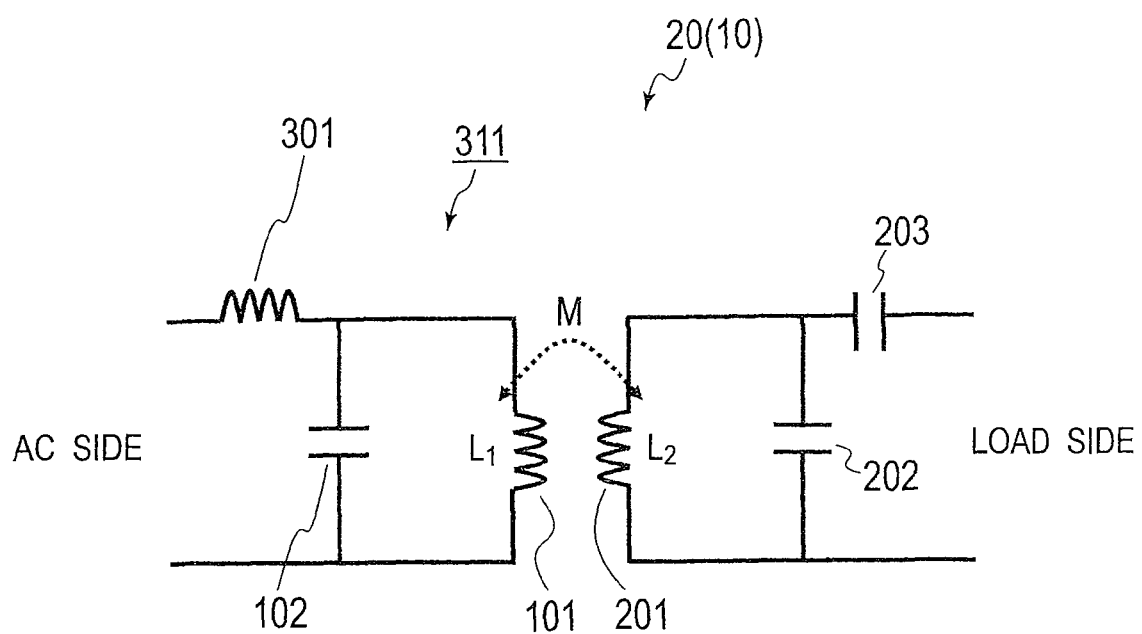
FIG. 10 shows an electric circuit diagram of the contactless electricity-supplying portion according to the second embodiment of the present invention.

FIG. 10 is a circuit portion showing the contactless electricity-supplying device 20 according to the second embodiment of the present invention. Compared with the first embodiment described above, the second embodiment differs in using a circuit that is different from the circuit of the power transmission circuit portion 100 in FIG. 1. Other than the above in terms of structure, the second embodiment is substantially the same as the first embodiment, and therefore descriptions of the first embodiment will be properly quoted according to the second embodiment.

As shown in FIG. 10, a power transmission circuit portion 311 according to the second embodiment has such a structure that an inductor 301 is connected in series to a parallel circuit having the primary winding 101 and the capacitor 102.

Figure 11:
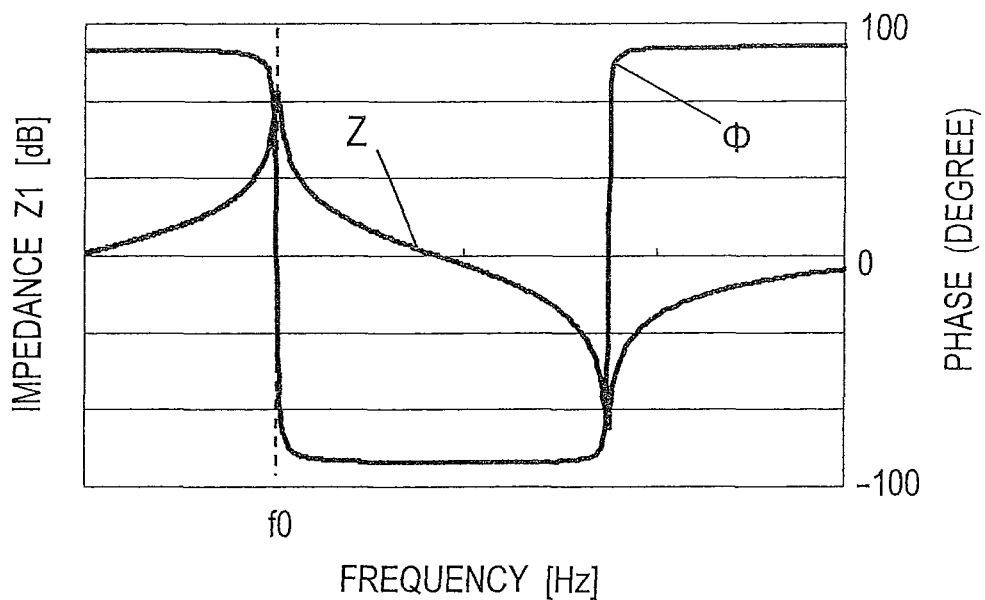
FIG. 11 shows the phase characteristics of the impedance of only the primary side relative to the frequency in the contactless electricity-supplying device in FIG. 10.

FIG. 11 shows the impedance characteristic (Z) and phase characteristic (Φ) relative to the frequency of the impedance ($Z_1$) of only the primary side when viewed from the high-frequency AC power supply circuit 6 side, with the mutual inductance M as zero.

As shown in FIG. 11, the impedance characteristic (Z) of the impedance ($Z_1$) according to the second embodiment has the maximum ($Z_{MAX}$) in the vicinity of the fundamental wave frequency ($f_0$) and has the minimum ($Z_{MIN}$) relative to the frequency higher than the fundamental wave frequency ($f_0$). Moreover, the phase characteristic (Φ) of the impedance ($Z_1$) according to the second embodiment has the phase inclination diverged in the vicinity of the fundamental wave frequency ($f_0$) and has a point at which the phase inclination is further diverged at the frequency higher than the fundamental wave frequency ($f_0$) other than the area in the vicinity of the fundamental wave frequency ($f_0$).

When the contactless electricity-supplying portion 10 is provided with the power transmission circuit portion 311 having the impedance characteristic (Z) or phase characteristic (Φ) shown in FIG. 11, the phase characteristic of the input impedance ($Z_{in}$) has, referring to FIG. 5, such a characteristic as shown according to the first embodiment. With this, in the contactless electricity-supplying device 20 according to the second embodiment, the fluctuation band of the phase of the input impedance ($Z_{in}$) relative to the fundamental wave frequency ($f_0$) is small even when the coupling coefficient k fluctuates, thus suppressing the fluctuation of the phase ($Φ_0$), as a result, keeping the power factor high and making it possible to efficiently supply the electric power.

In addition, the inductor 301 according to the second embodiment corresponds to "first inductor" of the present invention.

Third Embodiment

Figure 12:
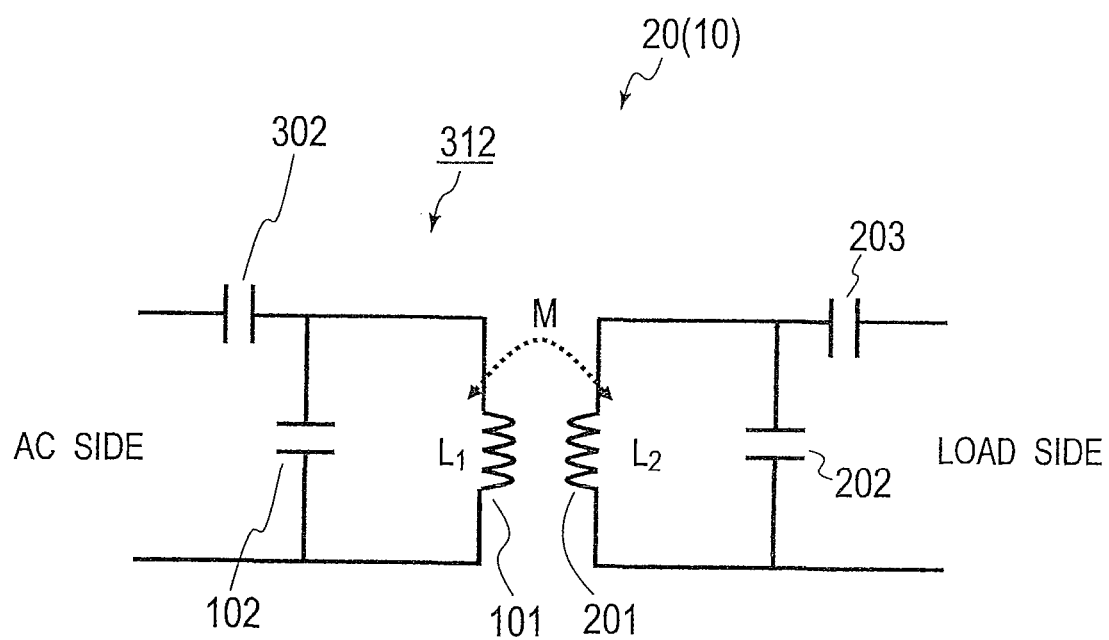
FIG. 12 shows an electric circuit diagram of the contactless electricity-supplying portion according to the third embodiment of the present invention.

FIG. 12 is a circuit portion showing the contactless electricity-supplying device 20 according to the third embodiment of the present invention. Compared with the first embodiment described above, the third embodiment differs in using a circuit that is different from the circuit of the power transmission circuit portion 100 in FIG. 1. Other than the above in terms of structure, the third embodiment is substantially the same as the first embodiment, and therefore descriptions of the first embodiment will be properly quoted according to the third embodiment.

As shown in FIG. 12, a power transmission circuit portion 312 according to the third embodiment has such a structure that the capacitor 302 is connected in series to the parallel circuit having the primary winding 101 and the capacitor 102.

Figure 13:
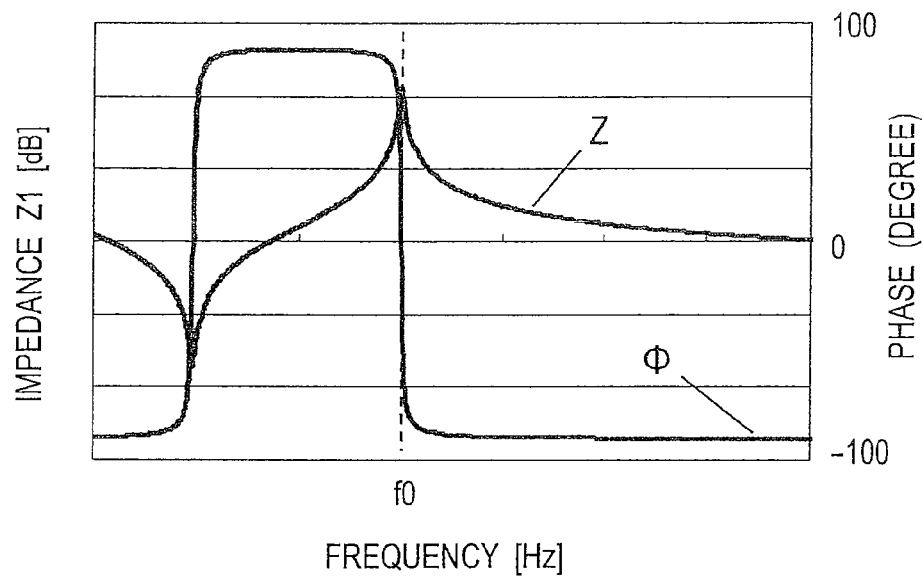
FIG. 13 shows the phase characteristics of the impedance of only the primary side relative to the frequency in the contactless electricity-supplying device in FIG. 12.

FIG. 13 shows the impedance characteristic (Z) and phase characteristic (Φ) relative to the frequency of the impedance ($Z_1$) of only the primary side when viewed from the high-frequency AC power supply circuit 6 side, with the mutual inductance M as zero.

As shown in FIG. 13, the impedance characteristic (Z) of the impedance ($Z_1$) according to the third embodiment has the maximum (mountain) in the vicinity of the fundamental wave frequency ($f_0$) and has the minimum relative to the frequency lower than the fundamental wave frequency ($f_0$) in an area other than the area in the vicinity of the fundamental wave frequency ($f_0$). Moreover, the phase characteristic (Φ) of the impedance ($Z_1$) has the phase inclination diverged in the vicinity of the fundamental wave frequency ($f_0$) and has a point at which the phase inclination is further diverged at a frequency lower than the fundamental wave frequency ($f_0$) other than the area in the vicinity of the fundamental wave frequency ($f_0$).

When the contactless electricity-supplying portion 10 is provided with the power transmission circuit portion 312 having the impedance characteristic (Z) and phase characteristic (Φ) shown in FIG. 13, the phase characteristic of the input impedance ($Z_{in}$) has, referring to FIG. 5, such a characteristic as shown according to the first embodiment. With this, in the contactless electricity-supplying device 20 according to the third embodiment, the fluctuation band of the phase of the input impedance ($Z_{in}$) relative to the fundamental wave frequency ($f_0$) is small even when the coupling coefficient k fluctuates, thus suppressing the fluctuation of the phase ($\Phi_0$), as a result, keeping the power factor high and making it possible to efficiently supply the electric power.

In addition, the capacitor 302 according to the third embodiment corresponds to "second capacitor" of the present invention.

Fourth Embodiment

Figure 14:
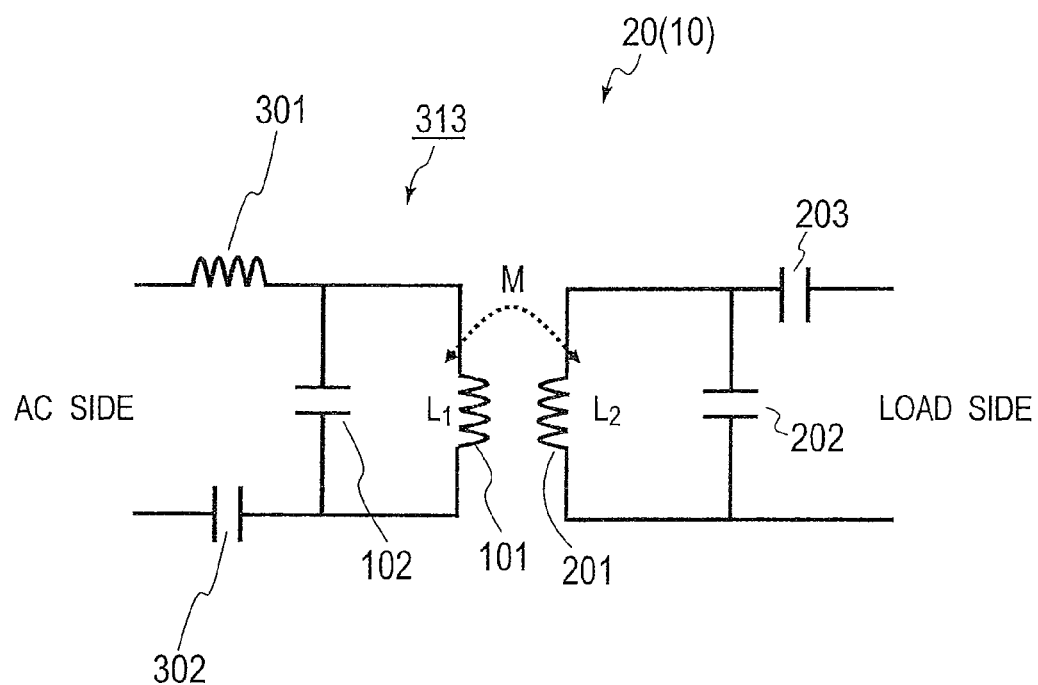
FIG. 14 shows an electric circuit diagram of the contactless electricity-supplying portion according to the fourth embodiment of the present invention.

FIG. 14 is a circuit portion showing the contactless electricity-supplying device 20 according to the fourth embodiment of the present invention. Compared with the first embodiment described above, the fourth embodiment differs in using a circuit that is different from the circuit of the power transmission circuit portion 100 in FIG. 1. Other than the above in terms of structure, the fourth embodiment is substantially the same as the first embodiment, and therefore descriptions of the first embodiment will be properly quoted according to the fourth embodiment.

As shown in FIG. 14, a power transmission circuit portion 313 according to the fourth embodiment has such a structure that the inductor 301 is connected to a first end of the parallel circuit having the primary winding 101 and the capacitor 102 and the capacitor 302 is connected to a second end of the above parallel circuit.

Figure 15:
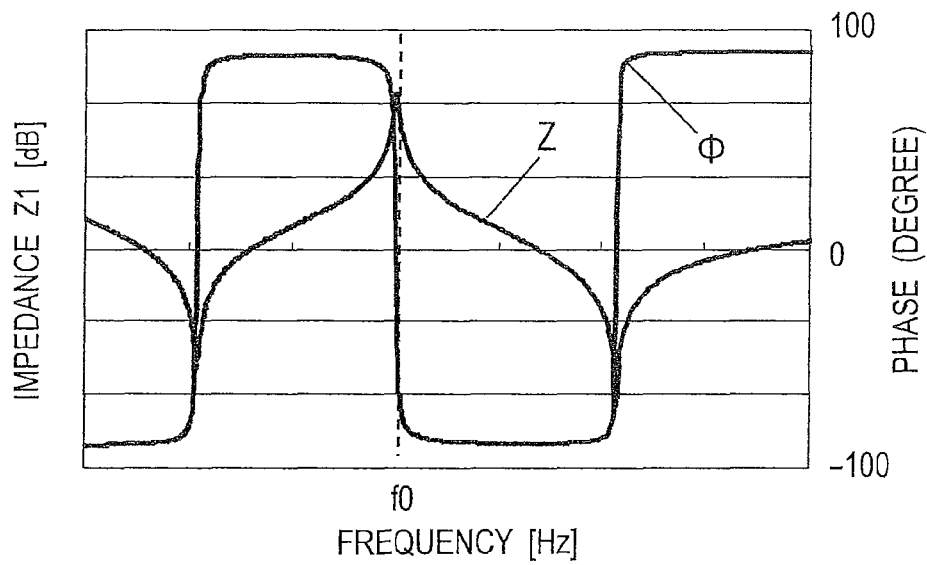
FIG. 15 shows the phase characteristic of the impedance of only the primary side relative to the frequency in the contactless electricity-supplying device in FIG. 14.

FIG. 15 shows the impedance characteristic (Z) and phase characteristic ($\Phi$) relative to the frequency of the impedance ($Z_1$) of only the primary side when viewed from the high-frequency AC power supply circuit 6 side, with the mutual inductance M as zero.

As shown in FIG. 15, the impedance characteristic (Z) of the impedance ($Z_1$) according to the fourth embodiment has the maximum (mountain) in the vicinity of the fundamental wave frequency ($f_0$) and has two minimums in two respective areas other than the area in the vicinity of the fundamental wave frequency ($f_0$). Moreover, the phase characteristic ($\Phi$) of the impedance ($Z_1$) has the phase inclination diverged in the vicinity of the fundamental wave frequency ($f_0$) and has two points at which the phase inclinations are further diverged at respective frequencies other than the area in the vicinity of the fundamental wave frequency ($f_0$).

When the contactless electricity-supplying portion 10 is provided with the power transmission circuit portion 313 having the impedance characteristic (Z) or phase characteristic ($\Phi$) shown in FIG. 15, the phase characteristic of the input impedance ($Z_{in}$) has, referring to FIG. 5, such a characteristic as shown according to the first embodiment. With this, in the contactless electricity-supplying device 20 according to the fourth embodiment, the fluctuation band of the phase of the input impedance ($Z_{in}$) relative to the fundamental wave frequency ($f_0$) is small even when the coupling coefficient k fluctuates, thus suppressing the fluctuation of the phase ($\Phi_0$), as a result, keeping the power factor high and making it possible to efficiently supply the electric power.

In addition, the inductor 301 according to the fourth embodiment corresponds to "first inductor" of the present invention and the capacitor 302 according to the fourth embodiment corresponds to "second capacitor" of the present invention.

Fifth Embodiment

Figure 16:
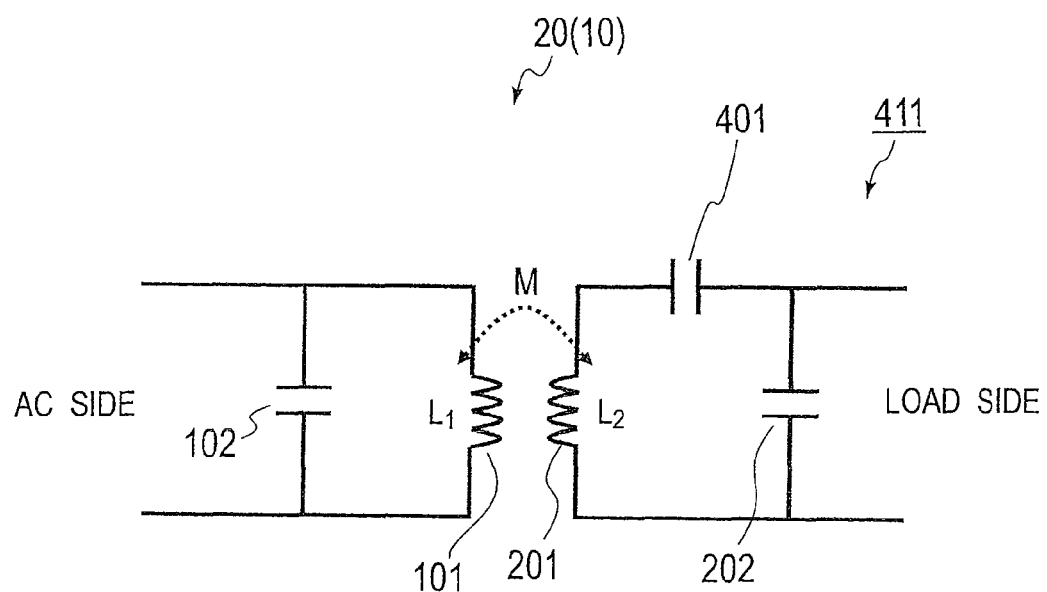
FIG. 16 shows an electric circuit diagram of the contactless electricity-supplying portion according to the fifth embodiment of the present invention.

FIG. 16 is a circuit portion showing the contactless electricity-supplying device 20 according to the fifth embodiment of the present invention. Compared with the first embodiment described above, the fifth embodiment differs in using a circuit that is different from the circuit of the incoming circuit portion 200 in FIG. 1. Other than the above in terms of structure, the fifth embodiment is substantially the same as the first embodiment, and therefore descriptions of the first embodiment will be properly quoted according to the fifth embodiment.

As shown in FIG. 16, an incoming circuit portion 411 has such a structure that the capacitor 401 is connected to the secondary winding 201 in series and the capacitor 202 is connected in parallel to the serial circuit composed of the secondary winding 201 and capacitor 401.

Figure 17:
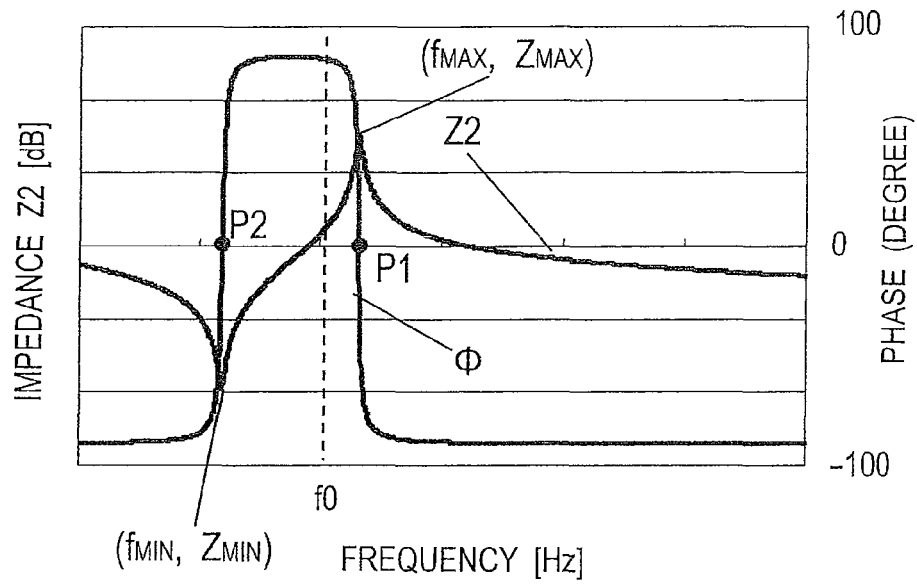
FIG. 17 shows the phase characteristic of the impedance of only the secondary side relative to the frequency in the contactless electricity-supplying device in FIG. 16.

FIG. 17 shows the impedance characteristic (Z) and phase characteristic ($\Phi$) relative to the frequency of the impedance ($Z_2$) of only the secondary side when viewed from the load portion 7 side, with the mutual inductance M as zero.

As shown in FIG. 17, the impedance characteristic (Z) of the impedance ($Z_2$) has the fundamental wave frequency ($f_0$) between the frequency ($f_{MAX}$) taking the maximum ($Z_{MAX}$) and the frequency ($f_{MIN}$) taking the minimum ($Z_{MIN}$).

The phase characteristic ($\Phi$) of the impedance ($Z_2$) has two points (point P1 and point P2 shown in FIG. 17) at which the phase inclinations are diverged and has a portion (between the two points P1, P2) which is parallel to the frequency axis, where the fundamental wave frequency ($f_0$) is present between the two points P1 and P2. In other words, the phase characteristic ($\Phi$) makes a turn around the area in the vicinity of the fundamental wave frequency ($f_0$) and comes back.

When the contactless electricity-supplying portion 10 is provided with the incoming circuit portion 411 having the impedance characteristic (Z) or phase characteristic ($\Phi$) shown in FIG. 17, the phase characteristic of the input impedance ($Z_{in}$) has, referring to FIG. 5, such a characteristic as shown according to the first embodiment. With this, in the contactless electricity-supplying device 20 according to the fifth embodiment, the fluctuation band of the phase of the input impedance ($Z_{in}$) relative to the fundamental wave frequency ($f_0$) is small even when the coupling coefficient k fluctuates, thus suppressing the fluctuation of the phase ($\Phi_0$), as a result, keeping the power factor high and making it possible to efficiently supply the electric power.

In addition, the capacitor 401 according to the fifth embodiment corresponds to "fifth capacitor" of the present invention and the capacitor 202 according to the fifth embodiment corresponds to "third capacitor" of the present invention.

Sixth Embodiment

Figure 18:
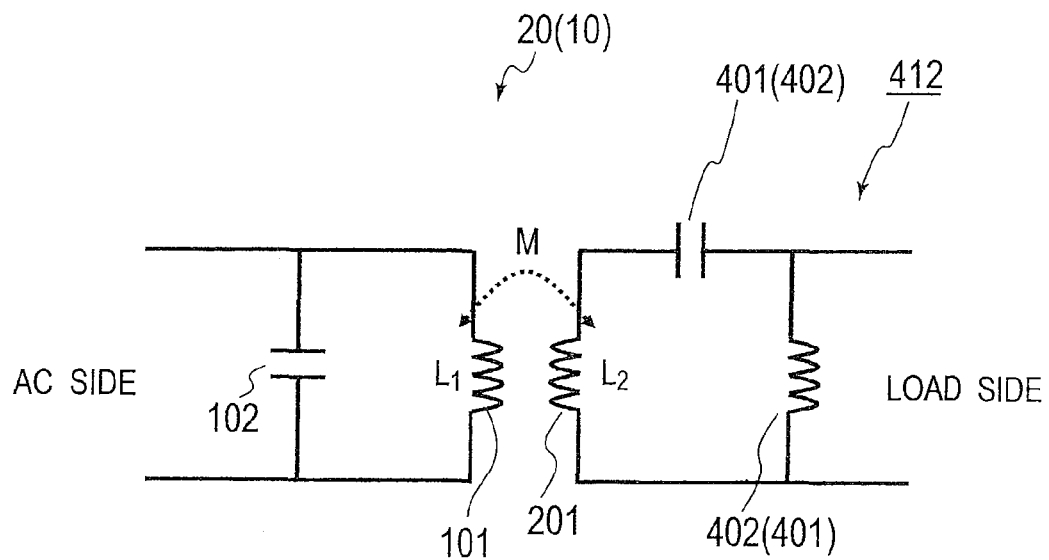
FIG. 18 shows an electric circuit diagram of the contactless electricity-supplying portion according to the sixth embodiment of the present invention.

FIG. 18 is a circuit portion showing the contactless electricity-supplying device 20 according to the sixth embodiment of the present invention. Compared with the first embodiment described above, the sixth embodiment differs in using a circuit that is different from the circuit of the incoming circuit portion 200 in FIG. 1. Other than the above in terms of structure, the sixth embodiment is substantially the same as the first embodiment, and therefore descriptions of the first embodiment will be properly quoted according to the sixth embodiment.

As shown in FIG. 18, an incoming circuit portion 412 according to the sixth embodiment has such a structure that the capacitor 401 is connected in series to the secondary winding 201 and the inductor 402 is connected in parallel to the serial circuit composed of the secondary winding 201 and capacitor 401.

Figure 19:
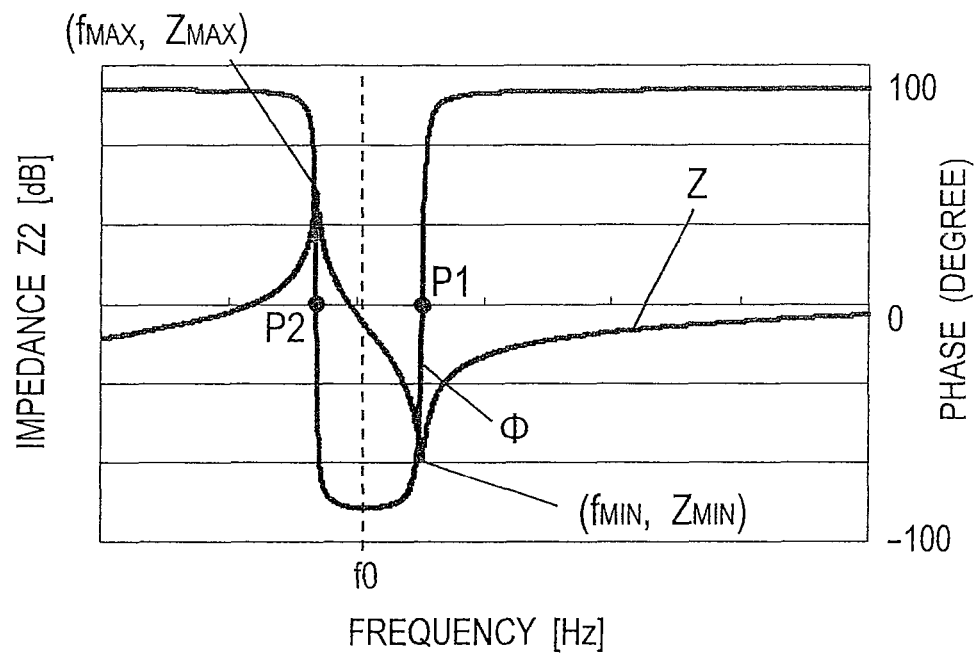
FIG. 19 shows the phase characteristic of the impedance of only the secondary side relative to the frequency in the contactless electricity-supplying device in FIG. 18.

FIG. 19 shows the impedance characteristic (Z) and phase characteristic (Φ) relative to the frequency of the impedance ($Z_2$) of only the secondary side when viewed from the load portion 7 side, with the mutual inductance M as zero.

As shown in FIG. 19, the impedance characteristic (Z) of the impedance ($Z_2$) has the fundamental wave frequency ($f_0$) between the frequency ($f_{MAX}$) taking the maximum ($Z_{MAX}$) and the frequency ($f_{MIN}$) taking the minimum ($Z_{MIN}$). Unlike the impedance characteristic (Z) shown in FIG. 6b according to the first embodiment, FIG. 19 of the sixth embodiment shows that the frequency ($f_{MAX}$) is lower than the fundamental wave frequency ($f_0$) and the frequency ($f_{MIN}$) is higher than the fundamental wave frequency ($f_0$).

The phase characteristic (Φ) of the impedance ($Z_2$) has two points (point P1 and point P2 shown in FIG. 19) at which the phase inclinations are diverged and has a portion (between the two points P1, P2) which is parallel to the frequency axis, where the fundamental wave frequency component ($f_0$) is present between the two points P1 and P2. In other words, the above phase characteristic (Φ) makes a turn around the area in the vicinity of the fundamental wave frequency ($f_0$) and comes back.

When the contactless electricity-supplying portion 10 is provided with the incoming circuit portion 412 having the impedance characteristic (Z) or phase characteristic (Φ) shown in FIG. 19, the phase characteristic of the input impedance ($Z_{in}$) has, referring to FIG. 5, such a characteristic as shown according to the first embodiment. With this, in the contactless electricity-supplying device 20 according to the sixth embodiment, the fluctuation band of the phase of the input impedance ($Z_{in}$) relative to the fundamental wave frequency ($f_0$) is small even when the coupling coefficient k fluctuates, thus suppressing the fluctuation of the phase ($Φ_0$), as a result, keeping the power factor high and making it possible to efficiently supply the electric power.

In addition, the capacitor 401 according to the sixth embodiment corresponds to "fifth capacitor" of the present invention and the inductor 402 according to the sixth embodiment corresponds to "third inductor" of the present invention.

Moreover, replacing the capacitor 401 with the inductor 402 and thereby connecting the inductor 402 in series to the secondary winding 201 while connecting the capacitor 401 with the series circuit composed of the secondary winding 201 and inductor 402 is allowed. In this case, the capacitor 401 according to the sixth embodiment corresponds to "third capacitor" of the present invention and the inductor 402 according to the sixth embodiment corresponds to "fourth inductor" of the present invention.

Seventh Embodiment

Figure 20:
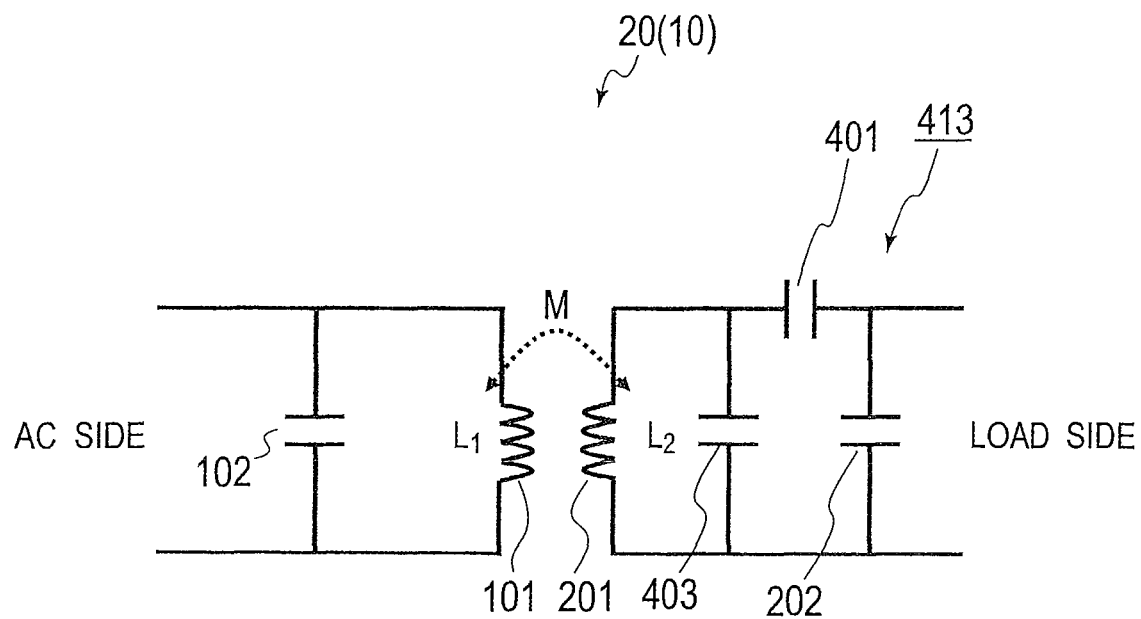
FIG. 20 shows an electric circuit diagram of the contactless electricity-supplying portion according to the seventh embodiment of the present invention.

FIG. 20 is a circuit portion showing the contactless electricity-supplying device 20 according to the seventh embodiment of the present invention. Compared with the first embodiment described above, the seventh embodiment differs in using a circuit that is different from the circuit of the incoming circuit portion 200 in FIG. 1. Other than the above in terms of structure, the seventh embodiment is substantially the same as the first embodiment, and therefore descriptions of the first embodiment will be properly quoted according to the seventh embodiment.

As shown in FIG. 20, an incoming circuit portion 413 according to the seventh embodiment has such a structure that the capacitor 401 is connected in series to the secondary winding 201 and the capacitor 403 is connected in an area between a connection (between a first end of the secondary winding 201 and the capacitor 401) and a second end of the secondary winding 201. Then, the capacitor 202 is connected in parallel relative to the serial circuit which has i) the parallel circuit composed of the secondary winding 201 and capacitor 403 and ii) the capacitor 401.

Figure 21:
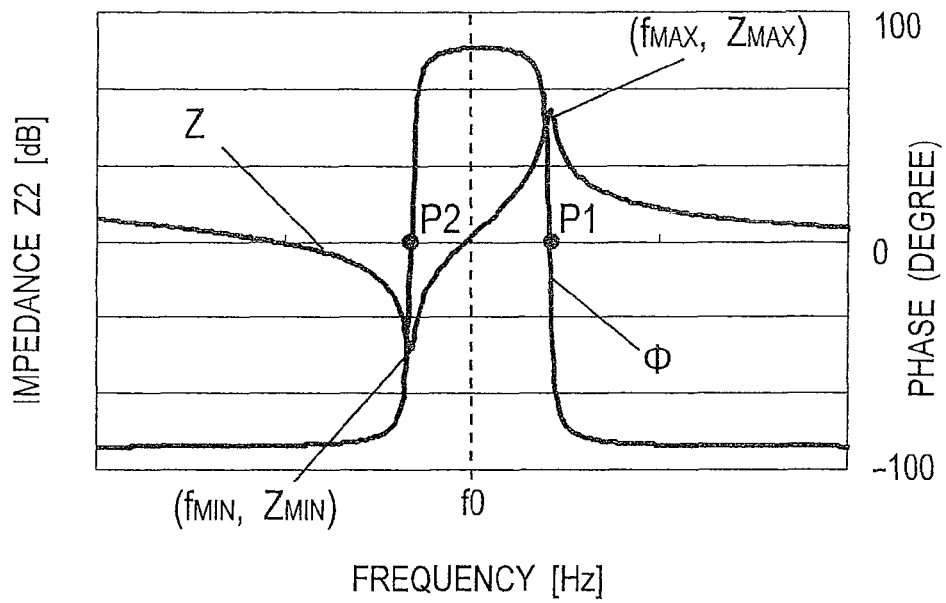
FIG. 21 shows the phase characteristic of the impedance of only the secondary side relative to the frequency in the contactless electricity-supplying device in FIG. 20.

FIG. 21 shows the impedance characteristic (Z) and phase characteristic (Φ) relative to the frequency of the impedance ($Z_2$) of only the secondary side when viewed from the load portion 7 side, with the mutual inductance M as zero.

As shown in FIG. 21, the impedance characteristic (Z) of the impedance ($Z_2$) of only the secondary side has the fundamental wave frequency ($f_0$) between the frequency ($f_{MAX}$) taking the maximum ($Z_{MAX}$) and the frequency ($f_{MIN}$) taking the minimum ($Z_{MIN}$).

The phase characteristic (Φ) of the impedance ($Z_2$) has two points (point P1 and point P2 shown in FIG. 21) at which the phase inclinations are diverged and has a portion (between the two points P1, P2) which is parallel to the frequency axis, where the fundamental wave frequency component ($f_0$) is present between the two points P1 and P2. In other words, the above phase characteristic (Φ) makes a turn around the area in the vicinity of the fundamental wave frequency ($f_0$) and comes back.

When the contactless electricity-supplying portion 10 is provided with the incoming circuit portion 413 having the impedance characteristic (Z) or phase characteristic (Φ) shown in FIG. 21, the phase characteristic of the input impedance ($Z_{in}$) has, referring to FIG. 5, such a characteristic as shown according to the first embodiment. With this, in the contactless electricity-supplying device 20 according to the seventh embodiment, the fluctuation band of the phase of the input impedance ($Z_{in}$) relative to the fundamental wave frequency ($f_0$) is small even when the coupling coefficient k fluctuates, thus suppressing the fluctuation of the phase ($Φ_0$), as a result, keeping the power factor high and making it possible to efficiently supply the electric power.

In addition, the capacitor 403 according to the seventh embodiment corresponds to "sixth capacitor" of the present invention.

Eighth Embodiment

Figure 22:
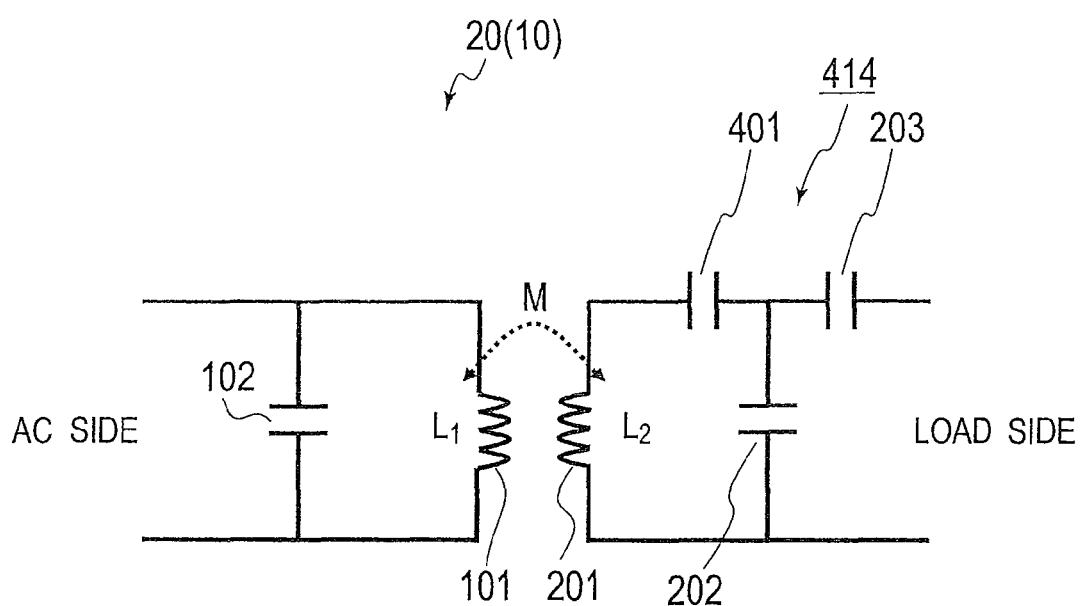
FIG. 22 shows an electric circuit diagram of the contactless electricity-supplying device according to the eighth embodiment of the present invention.

FIG. 22 is a circuit portion showing the contactless electricity-supplying device 20 according to the eighth embodiment of the present invention. Compared with the first embodiment described above, the eighth embodiment differs in using a circuit that is different from the circuit of the incoming circuit portion 200 in FIG. 1. Other than the above in terms of structure, the eighth embodiment is substantially the same as the first embodiment, and therefore descriptions of the first embodiment will be properly quoted according to the eighth embodiment.

As shown in FIG. 22, an incoming circuit portion 414 according to the eighth embodiment has such a structure that the capacitor 202 is connected in parallel to the serial circuit composed of the secondary winding 201 and capacitor 401 whereas the capacitor 203 is connected to a connection between the capacitor 202 and the capacitor 401.

Figure 23:
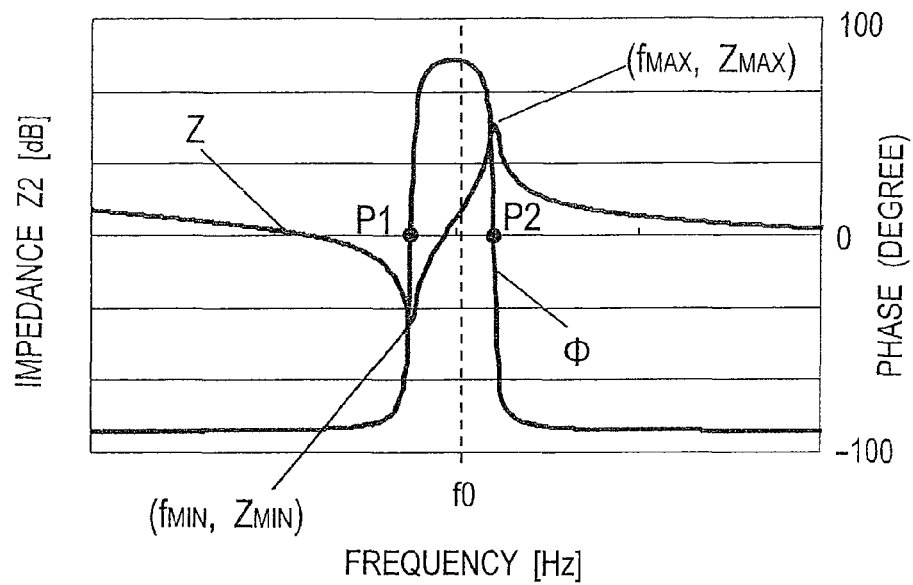
FIG. 23 shows the phase characteristic relative to the frequency of the impedance of only the secondary side in the contactless electricity-supplying device 20 in FIG. 22.

FIG. 23 shows the impedance characteristic (Z) and phase characteristic (Φ) relative to the frequency of the impedance ($Z_2$) of only the secondary side when viewed from the load portion 7 side, with the mutual inductance M as zero.

As shown in FIG. 23, the impedance characteristic (Z) of the impedance ($Z_2$) of only the secondary side has the fundamental wave frequency ($f_0$) between the frequency ($f_{MAX}$) taking the maximum ($Z_{MAX}$) and the frequency ($f_{MIN}$) taking the minimum ($Z_{MIN}$). Herein, especially, in the case of the phase characteristic having a plurality of maximums ($Z_{MAX}$), the maximum ($Z_{MAX}$) denotes a value corresponding to the frequency that is nearest to the fundamental wave frequency ($f_0$). Also, the same is true of the minimum ($Z_{MIN}$).

The phase characteristic (Φ) of the impedance ($Z_2$) of only the secondary side has two points (point P1 and point P2 shown in FIG. 23) at which the phase inclinations are diverged, and has a portion (between the two points P1, P2) which is parallel to the frequency axis, where the fundamental wave frequency component ($f_0$) is present between the two points P1 and P2. In other words, the above phase characteristic (Φ) makes a turn around the area in the vicinity of the fundamental wave frequency ($f_0$) and comes back.

When the contactless electricity-supplying portion 10 is provided with the incoming circuit portion 414 having the impedance characteristic (Z) or phase characteristic (Φ) shown in FIG. 23, the phase characteristic of the input impedance ($Z_{in}$) has, referring to FIG. 5, such a characteristic as shown according to the first embodiment. With this, in the contactless electricity-supplying device 20 according to the eighth embodiment, the fluctuation band of the phase of the input impedance ($Z_{in}$) relative to the fundamental wave frequency ($f_0$) is small even when the coupling coefficient k fluctuates, thus suppressing the fluctuation of the phase ($Φ_0$), as a result, keeping the power factor high and making it possible to efficiently supply the electric power.

In addition, the capacitor 202 according to the eighth embodiment corresponds to "third capacitor" of the present invention, the capacitor 401 corresponds to "fifth capacitor" of the present invention, and the capacitor 203 corresponds to "fourth capacitor" of the present invention.

Ninth Embodiment

Figure 24:
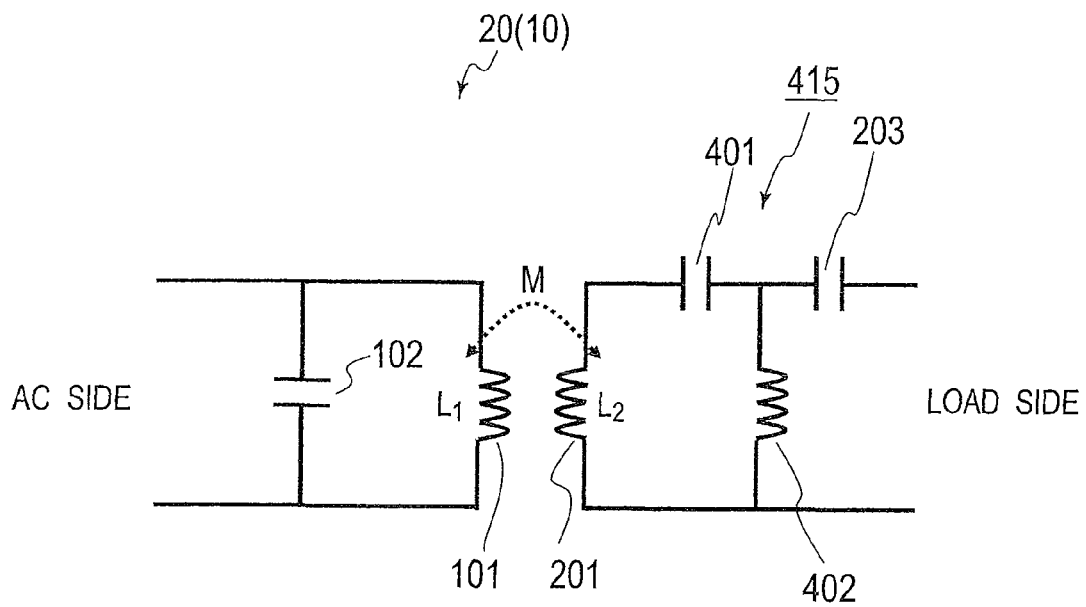
FIG. 24 shows an electric circuit diagram of the contactless electricity-supplying device according to the ninth embodiment of the present invention.

FIG. 24 is a circuit portion showing the contactless electricity-supplying device 20 according to the ninth embodiment of the present invention. Compared with the first embodiment described above, the ninth embodiment differs in using a circuit that is different from the circuit of the incoming circuit portion 200 in FIG. 1. Other than the above in terms of structure, the ninth embodiment is substantially the same as the first embodiment, and therefore descriptions of the first embodiment will be properly quoted according to the ninth embodiment.

As shown in FIG. 24, an incoming circuit portion 415 according to the ninth embodiment has such a structure that the inductor 402 is connected in parallel to the serial circuit composed of the secondary winding 201 and capacitor 401 whereas the capacitor 203 is connected to a connection between the inductor 402 and the capacitor 401.

Figure 25:
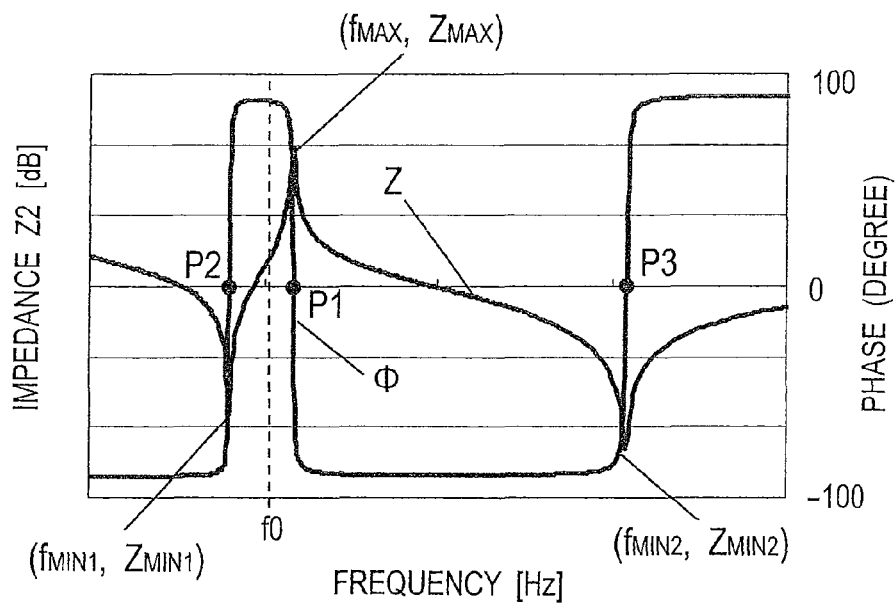
FIG. 25 shows the phase characteristic relative to the frequency of the impedance of only the secondary side in the contactless electricity-supplying device 20 in FIG. 24.

FIG. 25 shows the impedance characteristic (Z) and phase characteristic (Φ) relative to the frequency of the impedance ($Z_2$) of only the secondary side when viewed from the load portion 7 side, with the mutual inductance M as zero.

As shown in FIG. 25, the impedance characteristic (Z) of the impedance ($Z_2$) of only the secondary side has the fundamental wave frequency ($f_0$) between the frequency ($f_{MAX}$) taking the maximum ($Z_{MAX}$) and the frequency ($f_{MIN1}$) taking the minimum ($Z_{MIN1}$). Moreover, the impedance characteristic (Z) of the impedance ($Z_2$) of only the secondary side has the minimum ($Z_{MIN2}$) other than the minimum ($Z_{MIN1}$). Herein, the minimum corresponding to the frequency ($f_{MIN1}$) that is nearest to the fundamental wave frequency ($f_0$) is defined as $Z_{MIN1}$.

The phase characteristic (Φ) of the impedance ($Z_2$) of only the secondary side has two points (point P1 and point P2 shown in FIG. 25) at which the phase inclinations are diverged and which sandwich therebetween the fundamental wave frequency component ($f_0$), and has a portion (between the two points P1, P2) which is parallel to the frequency axis. In addition, other than the two points P1, P2 at which the phase inclinations are diverged, the phase characteristic (Φ) of the impedance ($Z_2$) has a point (point P3 shown in FIG. 25) at which the phase inclination is further diverged. In other words, the above phase characteristic (Φ) makes a turn around the area in the vicinity of the fundamental wave frequency ($f_0$) and comes back.

When the contactless electricity-supplying portion 10 is provided with the incoming circuit portion 415 having the impedance characteristic (Z) or phase characteristic (Φ) shown in FIG. 25, the phase characteristic of the input impedance ($Z_{in}$) has, referring to FIG. 5, such a characteristic as shown according to the first embodiment. With this, in the contactless electricity-supplying device 20 according to the ninth embodiment, the fluctuation band of the phase of the input impedance ($Z_{in}$) relative to the fundamental wave frequency ($f_0$) is small even when the coupling coefficient k fluctuates, thus suppressing the fluctuation of the phase ($Φ_0$), as a result, keeping the power factor high and making it possible to efficiently supply the electric power.

In addition, the capacitor 401 according to the ninth embodiment corresponds to "fifth capacitor" of the present invention and the capacitor 203 corresponds to "fourth capacitor" of the present invention, and the inductor 402 corresponds to "third inductor" of the present invention.

In addition, the power transmission circuit portions 100, 311, 312, 313 and the incoming circuit portions 200, 411, 413, 414, 415 shown according to the first to ninth embodiments may be arbitrarily combined to form the contactless electricity-supplying portion 10.

Tenth Embodiment

Figure 26:
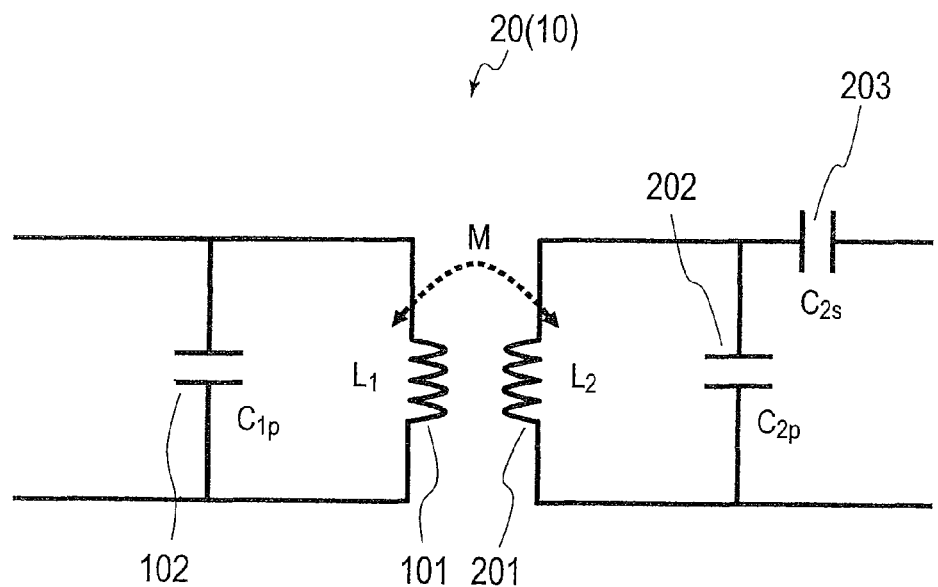
FIG. 26 is an electric circuit diagram of the contactless electricity-supplying device according to the tenth embodiment of the present invention.

FIG. 26 is a circuit portion showing the contactless electricity-supplying device 20 according to the tenth embodiment of the present invention. Compared with the first embodiment described above, the tenth embodiment differs in specifying scale of the inductance of each of the primary winding 101 and the secondary winding 201 and scale of capacitance of each of the capacitors 102, 202 and 203. Other than the above in terms of structure, the tenth embodiment is substantially the same as the first embodiment, and therefore descriptions of the first embodiment will be properly quoted according to the tenth embodiment.

As shown in FIG. 26, on the primary side, there are disposed the primary winding 101 and the capacitor 102 which is connected in parallel to the primary winding 101. On the secondary side, there are provided the secondary winding 201, the capacitor 202 connected in parallel to the secondary winding 201, and the capacitor 203 connected in series to the parallel circuit composed of the secondary winding 201 and capacitor 202. The above circuit corresponds to the contactless electricity-supplying portion 10 shown in FIG. 1. Herein, the inductance of the primary winding 101 is defined as $L_1$, the inductance of the secondary winding 201 is defined as $L_2$, the capacitance of the capacitor 102 is defined as $C_{1p}$, the capacitance of the capacitor 202 is defined as $C_{2p}$ and the capacitance of the capacitor 203 is defined as $C_{2s}$.

The tenth embodiment specifies conditions associated with the scale of the inductance of each of the primary winding 101 and the secondary winding 201 and the scale of each of the capacitors 102, 202 and 203, sets the fundamental wave frequency ($f_0$) in the vicinity of a resonant frequency ($f_1$) of the impedance ($Z_1$) on the primary side, and sets the fundamental wave frequency ($f_0$) between the first resonant frequency ($f_a$) and second resonant frequency ($f_b$) of the impedance ($Z_2$) on the secondary side.

Figure 27:
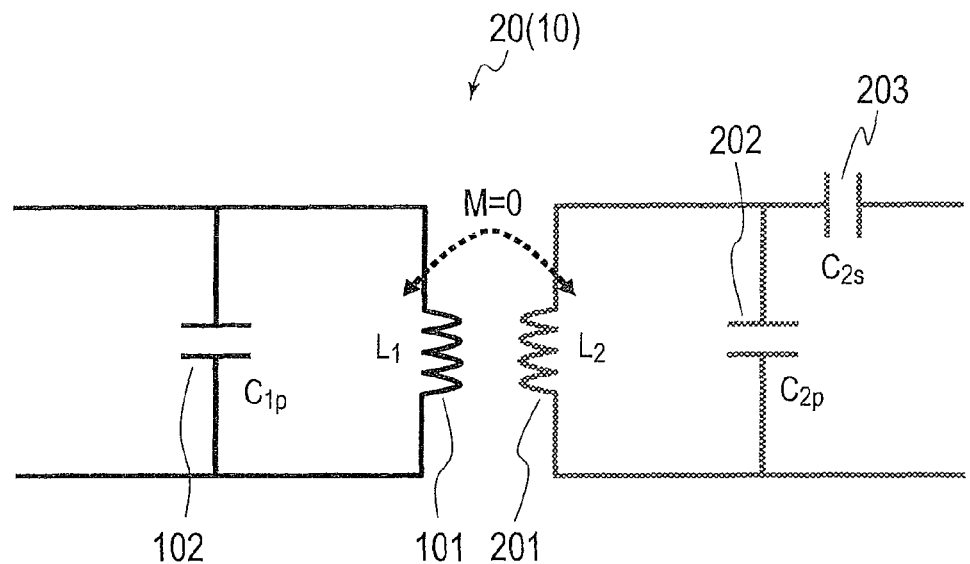
FIG. 27 is a primary side circuit diagram among the circuits of the contactless electricity-supplying device in FIG. 26.

At first, the capacitance $C_{1p}$ of the capacitor 102 is explained referring to FIG. 27. FIG. 27 shows a circuit on the primary side (transmission side) among the circuits in FIG. 26.

As shown in FIG. 27, the mutual inductance M=0 between the primary winding 101 and the secondary winding 201. Then, the circuit is so designed that the relation between the fundamental wave frequency ($f_0$) supplied from the high-frequency AC power supply circuit 6 to the circuit on the primary side, the inductance ($L_1$) and the capacitance ($C_{1p}$) satisfies the following formula 1.

(Expression 1)

$$C_{1p} = 1/(L_1(2\pi f_0)^2)$$ (Formula 1)

Figure 28:
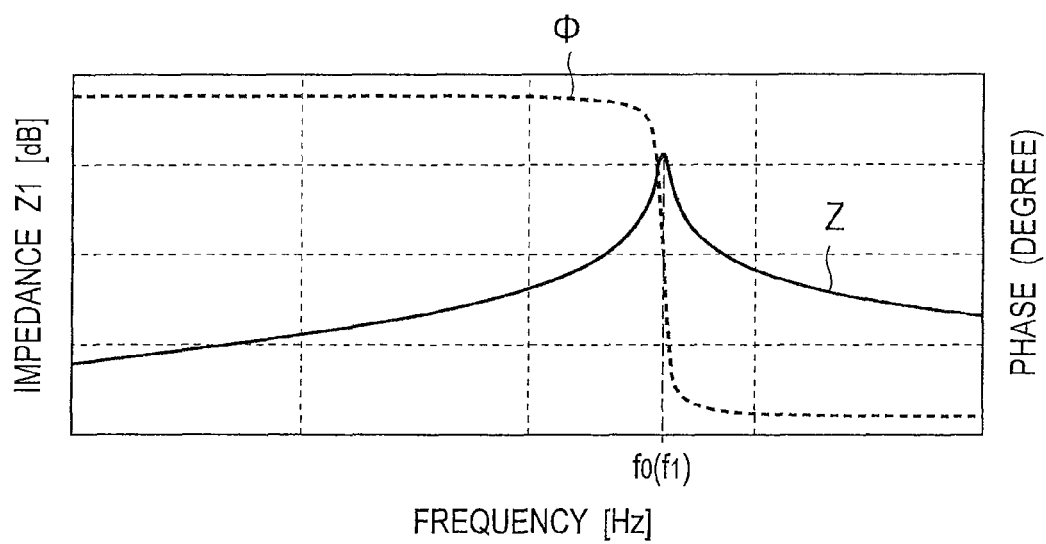
FIG. 28 is a graph showing the impedance characteristic and phase characteristic of the circuit in FIG. 27.

Then, the impedance characteristic (Z) and phase characteristic ($\Phi$) of the circuit on the primary side shown in FIG. 27 is shown in FIG. 28. FIG. 28 is a graph showing the impedance characteristic (Z) and phase characteristic ($\Phi$) of the circuit on the primary side relative to the frequency.

The resonant frequency ($f_1$) of the impedance ($Z_1$) corresponds to the frequency showing the maximum of the impedance characteristic (Z) and corresponds to the frequency of the center point of the rotating phase characteristic. Therefore, FIG. 28 verifies that the fundamental wave frequency ($f_0$) is positioned in the vicinity of the resonant frequency ($f_1$). That is, designing the circuit such that the fundamental wave frequency ($f_0$) is set in the vicinity of the resonant frequency ($f_1$) satisfies the condition of the formula 1.

With this, the current supplied to the contactless electricity-supplying portion 10 from the high-frequency AC power supply circuit 6 can be suppressed low, thus making it possible to enhance the efficiency.

Figure 29:
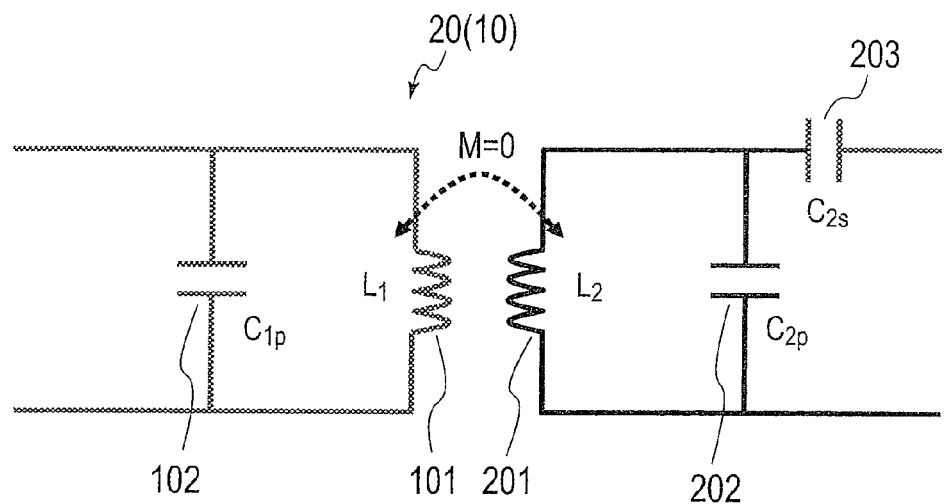
FIG. 29 shows a parallel circuit between the secondary winding and the capacitor, among the secondary side (incoming side) circuits in the circuits of the contactless electricity-supplying device in FIG. 26.

Then, the capacitance $C_{2p}$ of the capacitor 202 will be explained referring to FIG. 29. FIG. 29 shows the parallel circuit composed of the secondary winding 201 and capacitor 202, among the circuits on the secondary side (incoming side) of the circuits in FIG. 26.

As shown in FIG. 29, the mutual inductance M=0 between the primary winding 101 and the secondary winding 201. Then, the circuit is so designed that the relation between the inductance ($L_1$), the capacitance ($C_{1p}$) and the inductance ($L_2$) and capacitance ($C_{2p}$) satisfies the following formula 2.

(Expression 2)

$$C_{2p} < (L_1/L_2) C_{1p}$$ (Formula 2)

Figure 30:
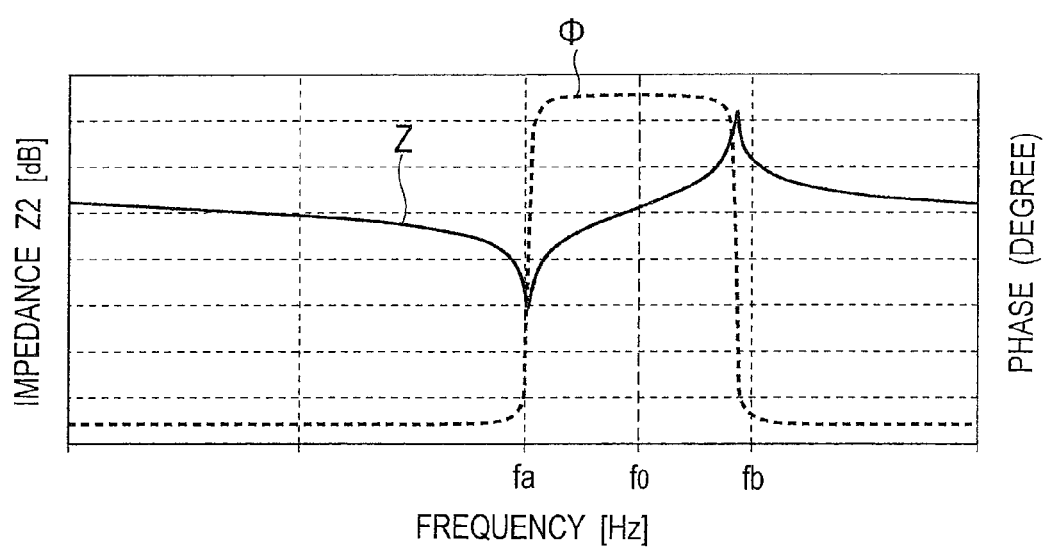
FIG. 30 is a graph showing the impedance characteristic and phase characteristic of the circuit on the secondary side of the contactless electricity-supplying device in FIG. 26.

The formula 2 will be explained, while showing in FIG. 30 the impedance characteristic (Z) and phase characteristic ($\Phi$) of the circuit on the secondary side of the circuit in FIG. 26. FIG. 30 is a graph showing the impedance characteristic (Z) and phase characteristic ($\Phi$) of the circuit on the secondary side relative to the frequency.

As shown in FIG. 30, the second resonant frequency ($f_b$) of the impedance ($Z_2$) corresponds to the frequency ($f_{MAX}$) showing the maximum ($Z_{MAX}$) of the impedance characteristic (Z) and corresponds to the frequency of the center point of the rotating phase characteristic ($\Phi$). Moreover, the second resonant frequency ($f_b$) is formed by the resonant circuit (refer to FIG. 29) which is a combination of the inductance ($L_2$) and the capacitance ($C_{2p}$), where the above resonant circuit and the second resonant frequency ($f_b$) in combination has the following relation (formula 3).

(Expression 3)

$$\left( f_b = \frac{1}{2\pi\sqrt{L_2 C_{2p}}} \right)$$ (Formula 3)

Then, designing the circuit such that the second resonant frequency ($f_b$) is higher than the fundamental wave frequency ($f_0$) establishes the formula 4.

(Expression 4)

$$f_0 < f_b$$ (Formula 4)

Substituting the formula 1 and formula 3 into the formula 4 leads to the formula 2. That is, designing the circuit such that the fundamental wave frequency ($f_0$) is lower than the second resonant frequency ($f_b$) for satisfying the expression 4 can satisfy the condition of the expression 2.

Figure 31:
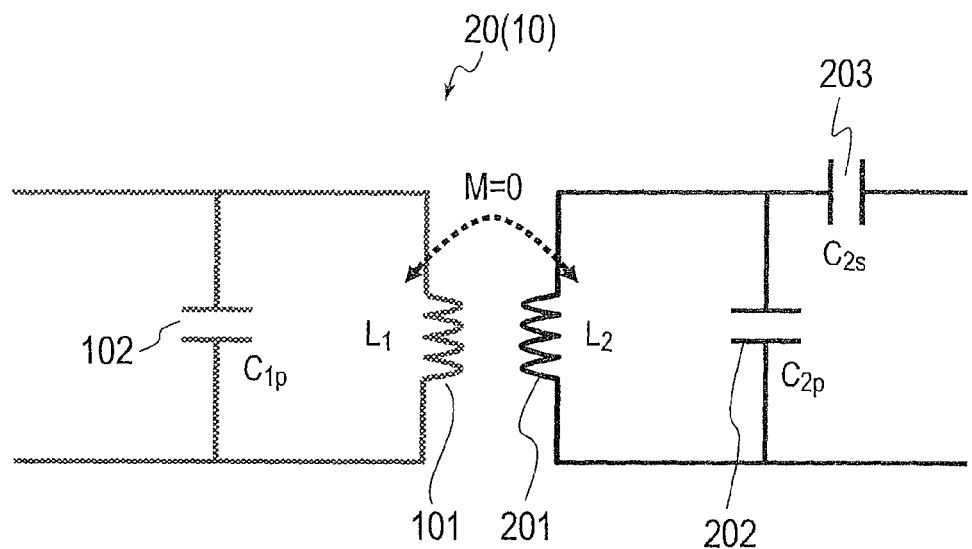
FIG. 31 is a secondary side circuit diagram among the circuits of the contactless electricity-supplying device in FIG. 26.

Then, the capacitance $C_{2s}$ of the capacitor 203 will be explained referring to FIG. 31. FIG. 31 shows a circuit of the secondary side (incoming side) of the circuit in FIG. 26 where the circuit in FIG. 31 has the parallel circuit (composed of the secondary winding 201 and capacitor 202) and the capacitor 203 which is connected in series to the parallel circuit.

As shown in FIG. 31, the mutual inductance M=0 between the primary winding 101 and the secondary winding 201. Then, the circuit is so designed that the relation between the inductance ($L_1$), the capacitance ($C_{1p}$), the inductance ($L_2$), the capacitance ($C_{2p}$) and the capacitance ($C_{2s}$) satisfies the following formula 5.

(Expression 5)

$$(C_{2s} + C_{2p}) > (L_1/L_2) C_{1p}$$ (Formula 5)

The formula 5 will be explained while showing in FIG. 30 the impedance characteristic (Z) and phase characteristic ($\Phi$) of the circuit on the secondary side of the circuit in FIG. 31.

As shown in FIG. 30, the first resonant frequency ($f_a$) of the impedance ($Z_2$) of only the secondary side corresponds to the frequency showing the minimum ($Z_{MIN}$) of the impedance characteristic (Z) and corresponds to the frequency of the center point of the rotating phase characteristic (101). Moreover, the first resonant frequency ($f_a$) is a resonant frequency of a resonant circuit which is formed by the inductance ($L_2$), the capacitance ($C_{2p}$) and the capacitance ($C_{2s}$), where the above resonant circuit and the first resonant frequency ($f_a$) have the following relation (formula 6).

(Expression 6)

$$f_a = \frac{1}{2\pi\sqrt{L_2(C_{2s} + C_{2p})}}$$ (Formula 6)

Then, designing the circuit such that the first resonant frequency ($f_a$) is lower than the fundamental wave frequency ($f_0$) establishes the formula 7.

(Expression 7)

$$f_0 > f_a$$ (Formula 7)

Substituting the formula 1 and formula 6 into the formula 7 leads to the formula 5. That is, designing the circuit such that the fundamental wave frequency ($f_0$) is higher than the first resonant frequency ($f_a$) to satisfy the formula 7 can satisfy the condition of the formula 5.

Then, from the formula 2 and formula 5, the formula 8 can be led as a relation between the inductances $L_1$, $L_2$ and the capacities $C_{1p}$, $C_{2p}$, $C_{2s}$ of the circuits on the primary and secondary sides.

(Expression 8)

$$C_{2p} < (L_1/L_2)C_{1p} < (C_{2s}+C_{2p}) \quad \text{(Formula 8)}$$

With this, the phase characteristic ($\Phi$) of the impedance ($Z_2$) has two points {corresponding to the first resonant frequency ($f_a$) and second resonant frequency ($f_b$) shown in FIG. 30} at which the phase inclinations are diverged, and has a portion {between the two points ($f_a$) and ($f_b$)} which is parallel to the frequency axis, where the fundamental wave frequency component ($f_0$) is present between the first resonant frequency ($f_a$) and the second resonant frequency ($f_b$). As a result, the efficiency of supplying the electric power from the primary side to the secondary side is improved.

Then, an explanation is made about the impedance characteristic ($Z_{in}$) which is viewed from the output side of the high-frequency AC power supply circuit 6 in the circuit of the contactless electricity-supplying portion 10 shown in FIG. 26.

Figure 32:
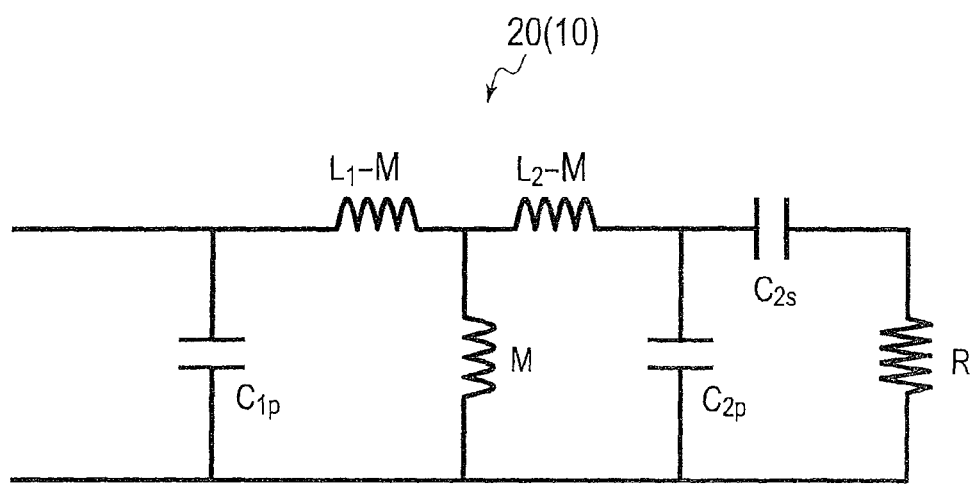
FIG. 32 is a circuit diagram of an equivalent circuit of the contactless electricity-supplying device in FIG. 26.

FIG. 32 shows an equivalent circuit of the circuit in FIG. 26.

Then, based on the circuit shown in FIG. 32, the impedance characteristic ($Z_{in}$) viewed from the output side of the high-frequency AC power supply circuit 6 is subjected to Laplace transformation, as shown in the formula 9.

(Expression 9)

$$Z_{in} = \frac{RC_{2p}C_{2s}(L_1L_2 - M^2)s^4 + (C_{2p}+C_{2s})(L_1L_2-M^2)s^3 + RL_1C_{2s}s^2 + L_1s}{RC_{1p}C_{2p}C_{2s}(L_1L_2-M^2)s^5 + C_{1p}(C_{2p}+C_{2s})(L_1L_2-M^2)s^4 + RC_{2s}(L_1C_{1p}+L_2C_{2p})s^3 + \{L_1C_{1p}+L_2(C_{2p}+C_{2s})\}s^2 + RC_{2s}s + 1} \quad \text{(Formula 9)}$$

Figure 33:
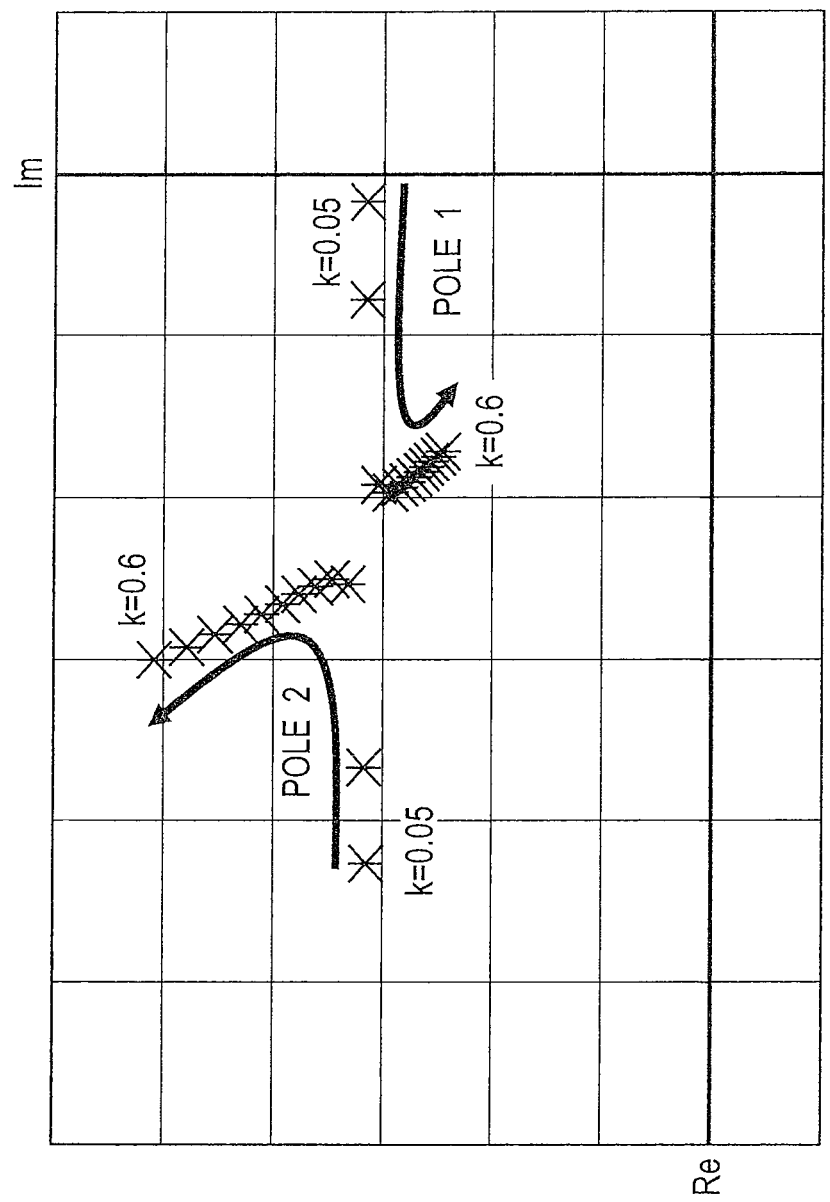
FIG. 33 shows the impedance characteristic on the complex plane of the contactless electricity-supplying device in FIG. 26.

FIG. 33 shows pole tracks of the impedance characteristic ($Z_{in}$). FIG. 33 shows two typical characteristical roots causing a great influence on the circuit characteristic of the poles in formula 9, that is, a pole 1 that is nearest to an imaginary axis Im (Imaginary) side and a pole 2 that is second nearest to the imaginary axis Im side. When the coupling coefficient k between the primary winding 101 and the secondary winding 201 is increased from an area in the vicinity of 0, the pole 1 and pole 2 draw the tracks as shown in FIG. 33. That is, the pole 1 moves away from the imaginary axis Im in accordance with the increase of the coupling coefficient k, meanwhile the pole 2 approaches the pole 1 in accordance with the increase of the coupling coefficient k.

That is, it is assumed that, in accordance with the increase of the coupling coefficient k, the pole 1 moves away from the imaginary axis Im whereas the pole 2 approaches the pole 1, thus the pole and pole 2 mutually negate the influence, as a result, suppressing decrease of efficiency. That is, the two poles (pole 1 and pole 2) which are typical characteristical roots draw mutually opposite tracks in accordance with the change of the coupling coefficient k.

Figure 34:
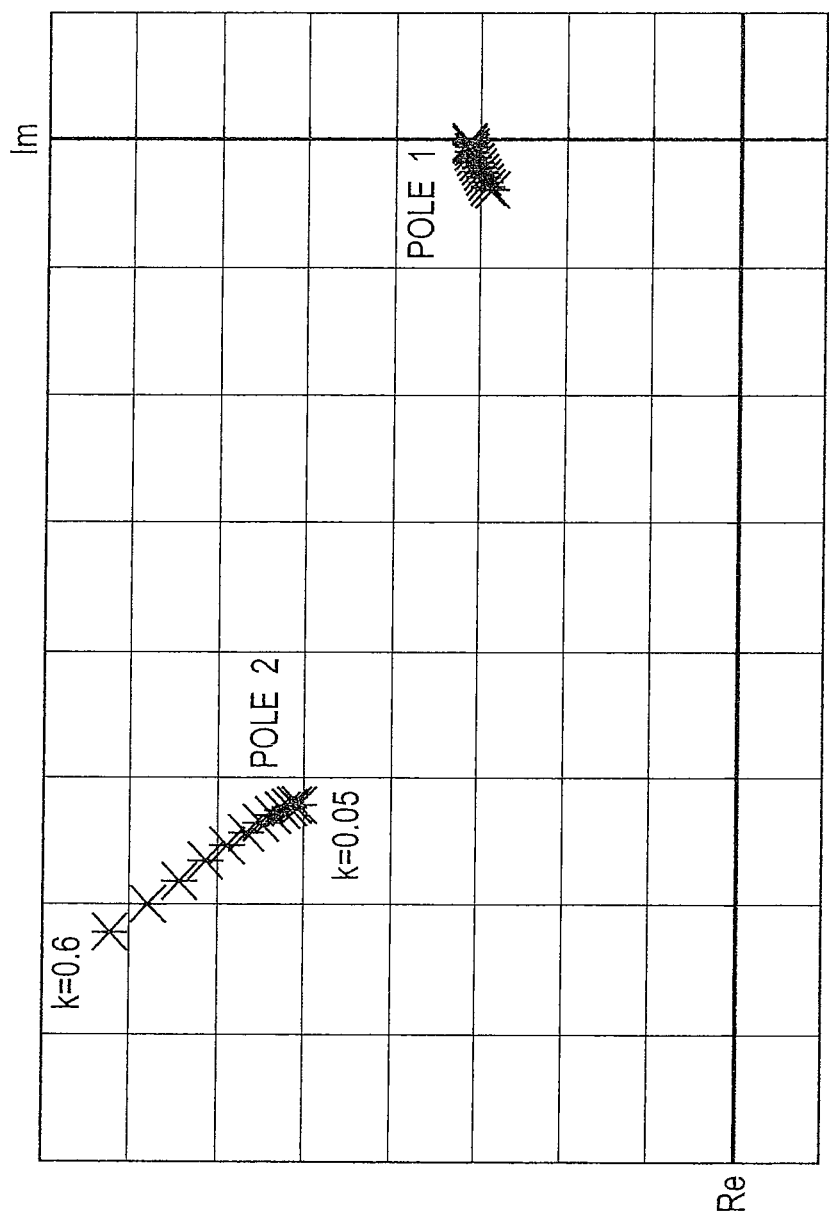
FIG. 34 shows the impedance characteristic on the complex plane.

On the other hand, in the circuit shown in FIG. 26 or the circuit shown in FIG. 32, the inductances $L_1$, $L_2$ and capacitances $C_{1p}$, $C_{2p}$, $C_{2s}$ of the circuit are so set that the formula 1 and formula 8 are not satisfied, in this case, the impedance characteristic ($Z_{in}$) viewed from the output side of the high-frequency AC power supply circuit 6 is denoted as in FIG. 34. FIG. 34 shows the pole track of the impedance characteristic ($Z_{in}$) in a complex plane under a circuit condition where the formula 1 and formula 8 are not satisfied.

As shown in FIG. 34, the pole 1 that is nearest to the imaginary axis Im side does not move away from the imaginary axis Im in accordance with the increase of the coupling coefficient k, whereas the pole 2 that is second nearest to the imaginary axis Im side does not approach the imaginary axis Im in accordance with the increase of the coupling coefficient k. Moreover, the pole 1 and pole 2 in FIG. 34, compared with those in FIG. 33, draw the tracks in positions away from each other in accordance with the increase of the coupling coefficient k (pole 2 not being a typical characteristical root), therefore do not cause an influence on each other. Thus, a control root moves away from the imaginary axis Im in accordance with the increase of the coupling coefficient k, thus decreasing the efficiency.

That is, when the pole 1 which moves away from the imaginary axis Im in accordance with the increase of the coupling coefficient k is present (FIG. 33), the pole 1 which moves away from the imaginary axis Im and the pole 2 which approaches the imaginary axis Im {two typical characteristical roots (pole 1 and pole 2) draw mutually opposite tracks in accordance with the change of the coupling coefficient k} are present in the circuit according to the tenth embodiment, and then the control root switches positions from the pole 1 to the pole 2 in accordance with the increase of the coupling coefficient k. Thus, according to the tenth embodiment, when the coupling coefficient k is increased, the control root is present in the vicinity of the imaginary axis Im. As a result, the efficiency change in accordance with the change of the coupling coefficient k can be suppressed.

Figure 35A:
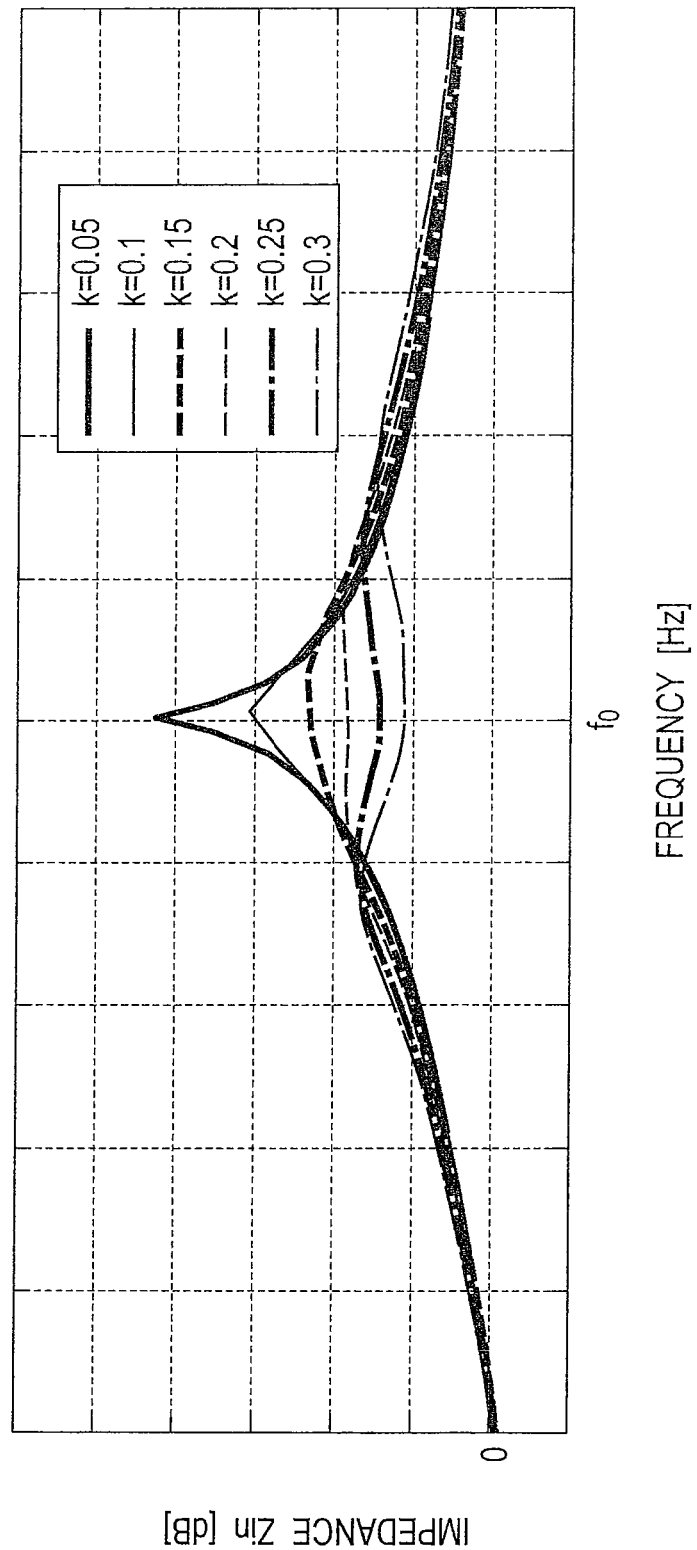
FIG. 35a shows the impedance characteristic of the contactless electricity-supplying device in FIG. 26.

Then, an explain is made about the impedance characteristic ($Z_{in}$) and phase characteristic ($\Phi_{in}$) which are viewed from the output side of the high-frequency AC power supply circuit 6. FIG. 35a shows the impedance characteristic ($Z_{in}$) and FIG. 35b shows the phase characteristic ($\Phi_{in}$), in the contactless electricity-supplying portion 10 according to the tenth embodiment. Moreover, FIG. 35a and FIG. 35b show respective changes of the impedance characteristic ($Z_{in}$) and the phase characteristic ($\Phi_{in}$) in accordance with the change of the coupling coefficient k.

As shown in FIG. 35b, the tenth embodiment has such a characteristic that the phase rotates around the area in the vicinity of the fundamental wave frequency ($f_0$) in accordance with the increase of the coupling coefficient k. Therefore, even when the coupling coefficient k changes, the phase corresponding to the fundamental wave frequency ($f_0$) takes a value close to 0 degree, thus making it possible to suppress decrease of power factor.

As shown above (especially, FIG. 26), according to the tenth embodiment, the contactless electricity-supplying portion 10 has such a structure that the primary winding 101 and the capacitor 102 are connected in parallel on the primary side whereas the parallel circuit (composed of the secondary winding 201 and the capacitor 202) and the capacitor 203 connected in series to the parallel circuit are connected on the secondary side. In the contactless electricity-supplying portion 10, the fundamental wave frequency ($f_0$) of the alternating power supplied from the high-frequency AC power supply circuit 6 to the contactless electricity-supplying portion 10 is set in the vicinity of the resonant frequency ($f_1$) of the impedance ($Z_1$) of only the primary side and is set between the first resonant frequency ($f_a$) and second resonant frequency ($f_b$) of the impedance ($Z_2$) of only the secondary side.

With this, in accordance with the change of the coupling coefficient k and in the vicinity of the fundamental wave frequency ($f_0$), the fluctuation of the phase is suppressed, thereby making it possible to suppress decrease of efficiency.

Moreover, according to the tenth embodiment, the circuit is so designed as to satisfy the conditions of the formula 1 and formula 8 in the above circuit. With this, in accordance with the change of the coupling coefficient k and in the vicinity of the fundamental wave frequency ($f_0$), the fluctuation of the phase is suppressed, thereby making it possible to suppress decrease of efficiency.

Moreover, according to the tenth embodiment, when the input impedance characteristic ($Z_{in}$) is shown by the complex plane in the above circuit, in accordance with the increase of the coupling coefficient k, the pole 1 that is nearest to the imaginary axis Im moves away from the imaginary axis Im and the pole 2 that is second nearest to the imaginary axis Im approaches the pole 1 (FIG. 33). With this, in accordance with the change of the coupling coefficient k and in the vicinity of the fundamental wave frequency ($f_0$), the fluctuation of the phase is suppressed, thereby making it possible to suppress decrease of efficiency.

In addition, according to the tenth embodiment, the pole 1 corresponds to "first pole" of the present invention and the pole 2 corresponds to "second pole" of the present invention.

Eleventh Embodiment

Figure 36:
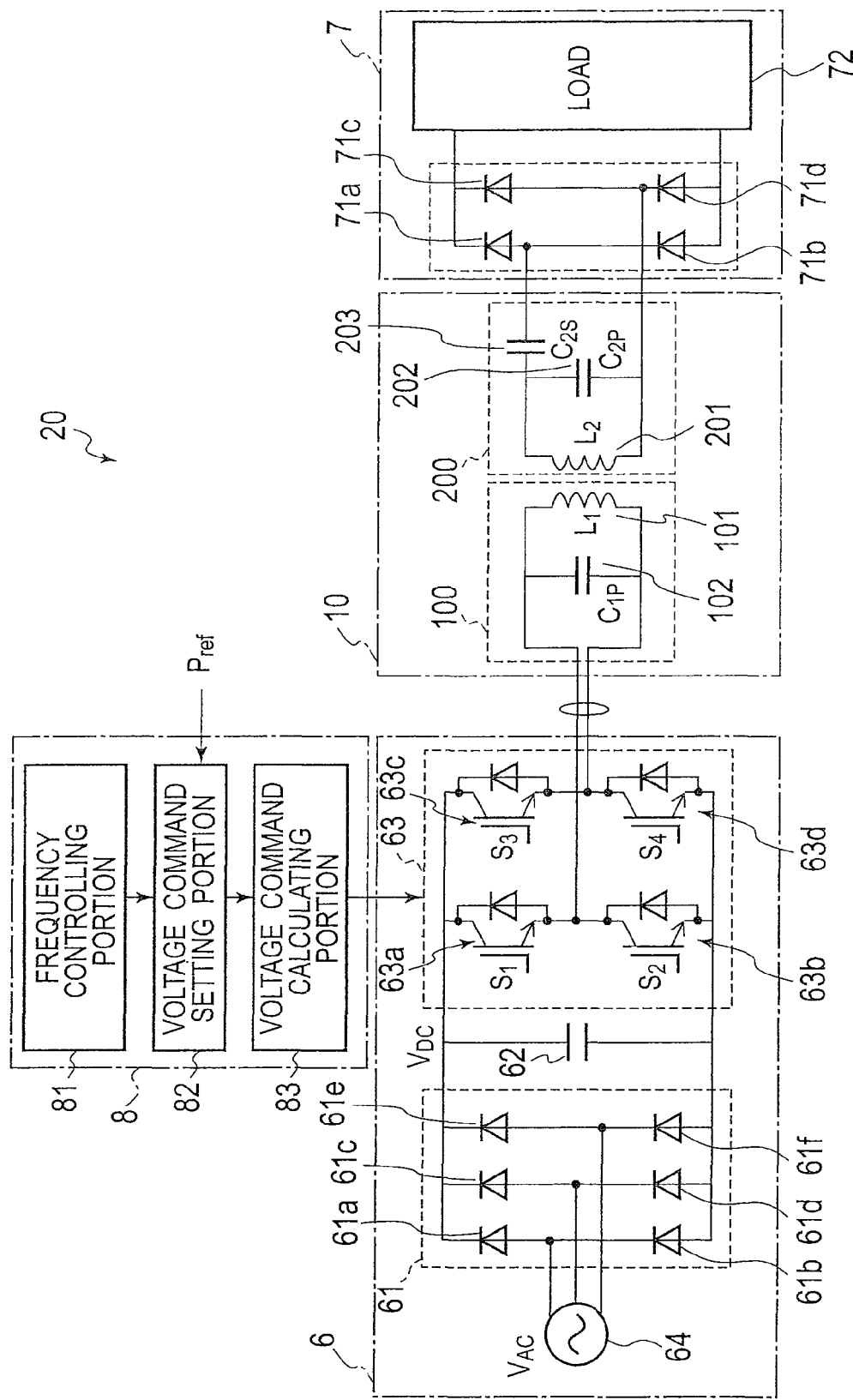
FIG. 36 is an electric circuit diagram of the contactless electricity-supplying device according to the eleventh embodiment of the present invention.

FIG. 36 shows an electric circuit diagram showing the contactless electricity-supplying device 20 according to the eleventh embodiment of the present invention. Compared with the first embodiment described above, the eleventh embodiment differs in an output voltage waveform from the high-frequency AC power supply circuit 6 to the contactless electricity-supplying portion 10. Other than the above in terms of structure, the eleventh embodiment is substantially the same as the first embodiment, and therefore descriptions of the first embodiment will be properly quoted according to the eleventh embodiment.

As shown in FIG. 36, the contactless electricity-supplying device 20 according to the eleventh embodiment is provided with a controlling portion 8 for controlling switching of the transistors (switching elements) 63a to 63d. The controlling portion 8 includes a frequency controlling portion 81, a voltage command setting portion 82 and a voltage command calculating portion 83.

Figure 37:
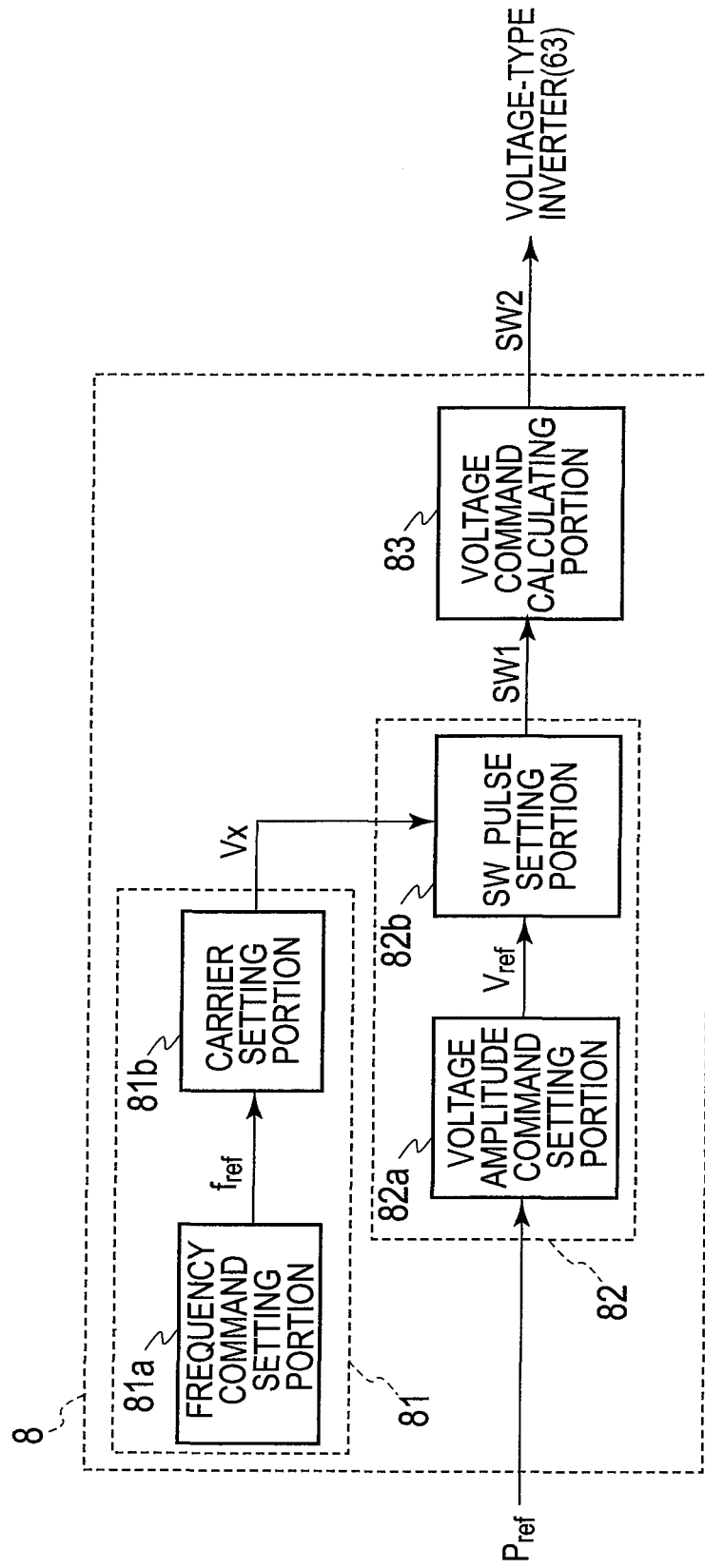
FIG. 37 shows a block diagram of the controlling portion in FIG. 36.

Then, an explanation is made about detailed structure of the controlling portion 8, referring to FIG. 37. FIG. 37 shows a block diagram of the controlling portion 8. The frequency controlling portion 81 has a frequency command setting portion 81a and a carrier setting portion 81b. The frequency command setting portion 81a sets a frequency command value ($f_{ref}$) of the output voltage of the voltage-type inverter 63 and transmits the frequency command value ($f_{ref}$) to the carrier setting portion 81b. The carrier setting portion 81b forms an amplitude ($V_x$) of carrier based on the frequency command value ($f_{ref}$), to thereby form a carrier signal of triangular wave. The carrier setting portion 81b uses a digital control using for example a microcomputer and forms the amplitude ($V_x$) from a clock counter which is based on the frequency command value ($f_{ref}$).

The voltage command setting portion 82 has a voltage amplitude command setting portion 82a and a switching pulse setting portion (SW pulse setting portion) 82b. The voltage amplitude command setting portion 82a sets an amplitude command value ($V_{ref}$) of the output voltage of the voltage-type inverter 63, and transmits the amplitude command value ($V_{ref}$) to the switching pulse setting portion 82b. Based on a power command value ($P_{ref}$) given from an external portion, the voltage amplitude command setting portion 82a determines the amplitude command value ($V_{ref}$). Comparing the carrier transmitted from the carrier setting portion 81b with the amplitude command value ($V_{ref}$), the switching pulse setting portion 82b sets the switching pulse (SW1) for switching the transistors (switching elements) 63a to 63d.

Herein, conventionally, the switching pulse (SW1) is inputted to the voltage-type inverter 63, and the voltage-type inverter 63 outputs a supply voltage, for example, sine wave, to the contactless electricity-supplying portion 10. According to the eleventh embodiment, setting the voltage command calculating portion 83 at the controlling portion 8 outputs, to the contactless electricity-supplying portion 10, a supply voltage that is different from the conventional sine wave supply voltage.

Figure 38:
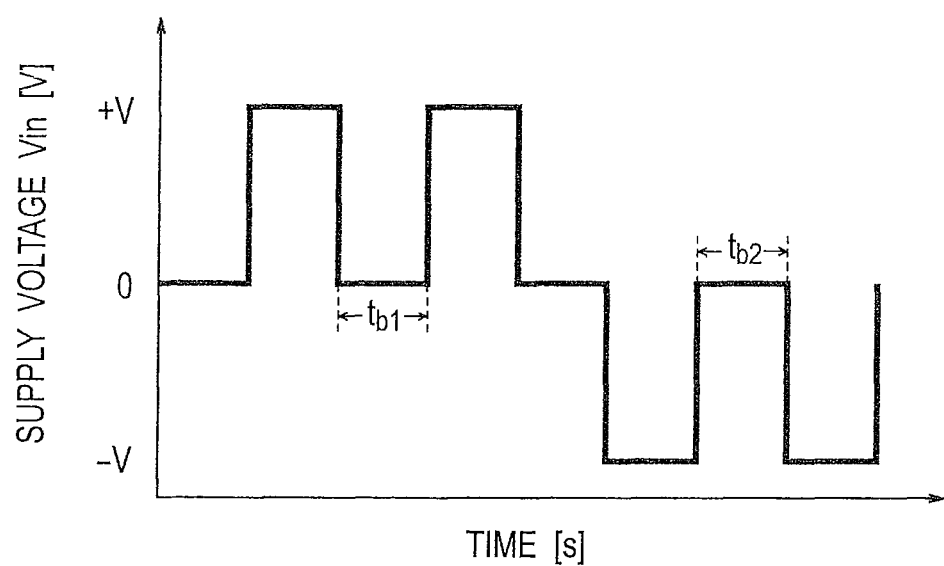
FIG. 38 shows an output characteristic of the supply voltage relative to time, in the contactless electricity-supplying device in FIG. 36.

Based on the switching pulse (SW1) transmitted from the switching pulse setting portion 82b, the voltage command calculating portion 83 sets a new switching pulse (SW2). When the new switching pulse (SW2) controls the transistors (switching elements) 63a to 63d, the supply voltage ($V_{in}$) supplied from the high-frequency AC power supply circuit 6 to the contactless electricity-supplying portion 10 makes a waveform which has, per period, a first rest period ($t_{b1}$) between a plurality of positive voltage output periods and a second rest period ($t_{b2}$) between a plurality of negative voltage output periods, as shown in FIG. 38. In each of the first and second rest periods ($t_{b1}$, $t_{b2}$), the voltage output has a rest or the voltage is not outputted. FIG. 38 shows output characteristic of supply voltage ($V_{in}$) relative to time. In addition, according to the eleventh embodiment, the explanation will be made on the premise that the first rest period ($t_{b1}$) and the second rest period ($t_{b2}$) have the same length, however, the above two periods ($t_{b1}$, $t_{b2}$) failing to have the same length are also allowed.

Figure 39:
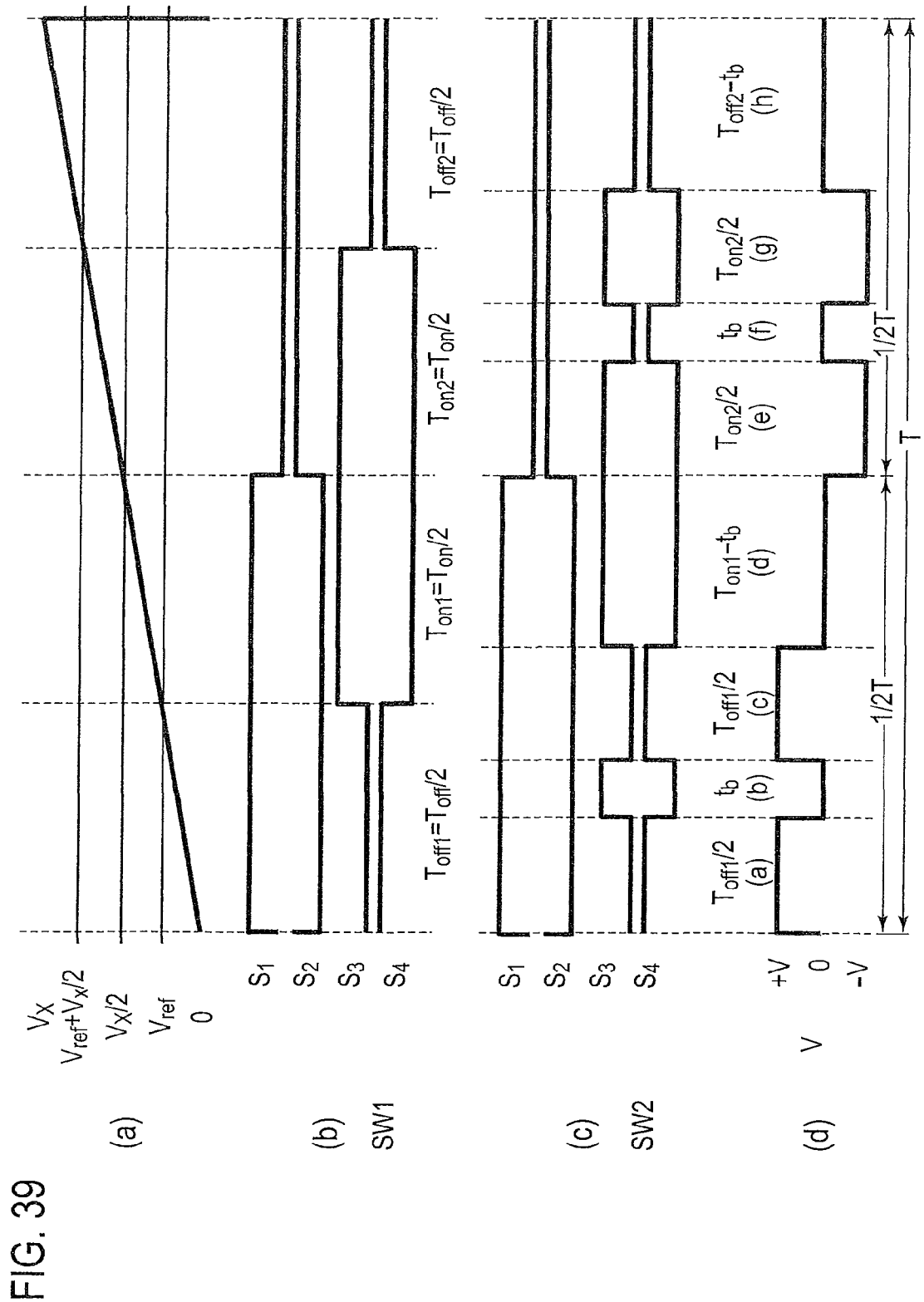
FIG. 39 shows carrier waveform, output waveforms, switching pulse waveform, and supply voltage waveform. Herein, in FIG. 39, the abscissa denotes time axis and is omitted, in the controlling portion in FIG. 36.

Hereinafter, referring to FIG. 39, the control operations of the controlling portion 8 will be set forth. FIG. 39 shows the carrier waveform, output waveforms, switching pulse (SW1) waveform, switching pulse (SW2) waveform and supply voltage waveform. In FIG. 39, the abscissa denotes time axis.

At first, the carrier setting portion 81b transmits the carrier signal of the amplitude ($V_x$) to the switching pulse setting portion 82b, as shown in FIG. 39(a). The voltage amplitude command setting portion 82a, as shown in FIG. 39(a), sets the amplitude command value ($V_{ref}$) to the amplitude ($V_x$).

Then, based on the following conditions, the switching pulse setting portion 82b forms the switching pulse (SW1) shown in FIG. 39(b).

Switch $S_1$ when carrier≤$V_x/2$

OFF when carrier>$V_x/2$

Switch $S_2$ OFF when carrier≤$V_x/2$

ON when carrier>$V_x/2$

Switch $S_3$ ON when carrier≥$V_{ref}$ and carrier≤$V_{ref}+V_x/2$

OFF when carrier<$V_{ref}$ or carrier>$V_{ref}+V_x/2$

Switch $S_4$ OFF when carrier≥$V_{ref}$ and carrier≤$V_{ref}+V_x/2$

ON when carrier<$V_{ref}$ or carrier>$V_{ref}+V_x/2$ (Expression 10)

By the above conditions, the switching pulses (SW1) shown in FIG. 39(b) are formed.

Then, based on the switching pulse (SW1), the voltage command calculating portion 83 forms the switching pulse (SW2) shown in FIG. 39(*c*). At first, the voltage command calculating portion 83 divides the period (T) equivalent to one period of the switching pulse of the switch $S_3$ into four sections ($T_{on1}$, $T_{on2}$, $T_{off1}$, $T_{off2}$), thus establishing the relation of the formula 10.

(Expression 11)

$$T = T_{on} + T_{off} = T_{on1} + T_{on2} + T_{off1} + T_{off2} \quad \text{(Formula 10)}$$

Then, with $T_{on}$ as an ON-period of the transistor 63*c*, $T_{off}$ as an OFF-period of the transistor 63*c*, and D as a duty ratio, the following formula 11 is established.

(Expression 12)

$$T_{on} = T_{on1} + T_{on2}, \ T_{off} = T_{off1} + T_{off2}, \ D = T_{on}/T \quad \text{(Formula 11)}$$

The duty ratio D is determined by the amplitude command value ($V_{ref}$) set by the voltage amplitude command setting portion 82*a* and the period T is determined by the frequency command value ($f_{ref}$) set by the frequency command setting portion 81*a*.

Then, the voltage command calculating portion 83 further divides the four sections ($T_{on1}$, $T_{on2}$, $T_{off1}$, $T_{off2}$) into eight sections (a to h).

(Expression 13)

$$a = T_{off1}/2, \ b = t_b, \ c = T_{off2}/2, \ d = T_{on1} - t_b$$

$$e = T_{on2}/2, \ f = t_b, \ g = T_{on2}/2, \ h = T_{off2} - t_b$$

Herein, the rest period $t_b$ is for stopping supply voltage to the contactless electricity-supplying portion 10 by making ON-OFF control of the switching of the transistors (switching elements) 63*a* to 63*d* and is set by the controlling portion 8 based on the period (T) and duty ratio (D). The period (T), the duty ratio (D) and the rest period ($t_b$) have a predetermined relation and when the period (T) or duty ratio (D) changes, the rest period ($t_b$) also changes. The controlling portion 8 stores in advance the relation between the period (T), duty ratio (D) and rest period ($t_b$) by, for example, a table and the like.

The section of the rest period $t_b$ is different (opposite) from neighboring sections in ON/OFF characteristic. For example, in a section of a certain rest period $t_b$, when the switching pulse (SW2) is ON, the switching pulses (SW2) in the sections neighboring the section of the rest period $t_b$, in other words, the former and latter sections are OFF.

Then, the sections a to h are arranged in order, to thereby form the switching pulse (SW2) as shown in FIG. 39(*c*). Since the section a and section c are OFF-periods, the section b is an ON-period and since the section e and section g are ON-periods, the section f is an OFF-period.

Moreover, the switching pulse (SW2) of the switch $S_4$ is formed in a manner same as that of the switch S3. However, the switching pulse (SW2) of the switch S4 is opposite to the switching pulse (SW2) of the switch S3, causing a reversed waveform (symmetrical waveform). The switching pulse (SW2) of each of the switch S1 and the switch S2 is like the waveform of the switching pulse (SW1).

With this, as shown in FIG. 39(*c*), the voltage command calculating portion 83 forms the switching pulse (SW2) based on the switching pulse (SW1). Then, the switching pulse (SW2) operates each of the transistors (switching elements) 63*a* to 63*d* and the power is supplied from the 3-phase AC power supply 64. Then, the high-frequency AC power supply circuit 6 supplies to the contactless electricity-supplying portion 10 the voltage shown in FIG. 39(*d*). That is, in the high-frequency AC power supply circuit 6 according to the eleventh embodiment, the supply voltage which includes, per period (T), a plurality of periods (equivalent to sections a and c) for outputting the positive voltage, a period (equivalent to section b) for stopping the voltage output and disposed between the plurality of periods (sections a and c), a plurality of periods (equivalent to sections e and g) for outputting the negative voltage, and a period (equivalent to section f) for stopping the voltage output and disposed between the plurality of periods (sections e and g) is supplied to the circuit on the primary side of the contactless electricity-supplying portion 10.

Figure 40:
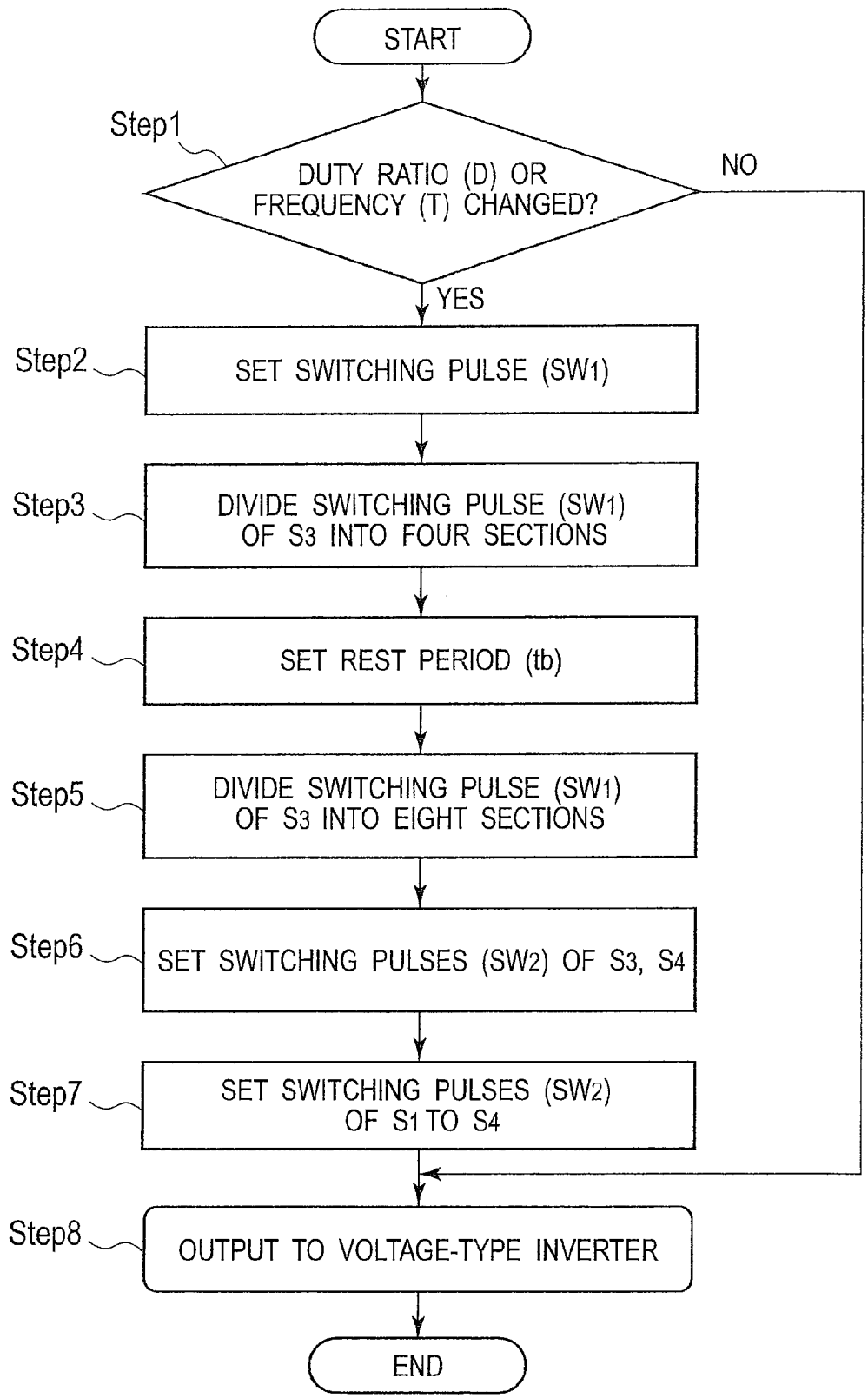
FIG. 40 is a flowchart showing controlling procedures of the controlling portion.

Then, controlling procedures of the controlling portion 8 will be explained referring to FIG. 40. FIG. 40 is a flowchart showing the controlling procedures of the controlling portion 8.

At step 1, based on the power command value ($P_{ref}$), the controlling portion 8 determines whether or not the duty ratio (D) or the period (T) is changed. When changed (Yes in FIG. 40), the routine proceeds to step 2 and when not changed (No in FIG. 40), the routine proceeds to step 8. In addition, the duty ratio (D) and the period (T) each has an initial value which is set in advance. When implementing the flow in FIG. 40 at the first setout, the routine proceeds to step 2 and in the second flow and thereafter, the routine compares the current duty ratio (D) and period (T) with their initial values or former values, to thereby determine the change.

At step 2, the switching pulse setting portion 82*b* sets the switching pulse (SW1).

At step 3, based on the formula 10, the voltage command calculating portion 83 divides the switching pulse (SW1) of the switch S3 into four sections ($T_{on1}$, $T_{on2}$, $T_{off1}$, $T_{off2}$).

At step 4, based on the duty ratio (D) and period (T), the controlling portion 8 sets the rest period ($t_b$).

At step 5, the voltage command calculating portion 83 divides the switching pulse (SW1) of the switch $S_3$ into eight sections (a to h).

At step 6, based on the eight sections (a to h) divided at step 5, the voltage command calculating portion 83 sets the switching pulse (SW2) of the switch $S_3$. Moreover, the voltage command calculating portion 83 reverses the switching pulse (SW2) of the switch $S_3$, to thereby set the switching pulse (SW2) of the switch $S_4$.

Then, at step 7, the voltage command calculating portion 83 sets the switching pulse (SW2) of the switches $S_1$ to $S_4$.

Then, at step 8, the voltage command calculating portion 83 outputs the switching pulses (SW2) to the respective transistors (switching elements) 63*a* to 63*d*.

Figure 41:
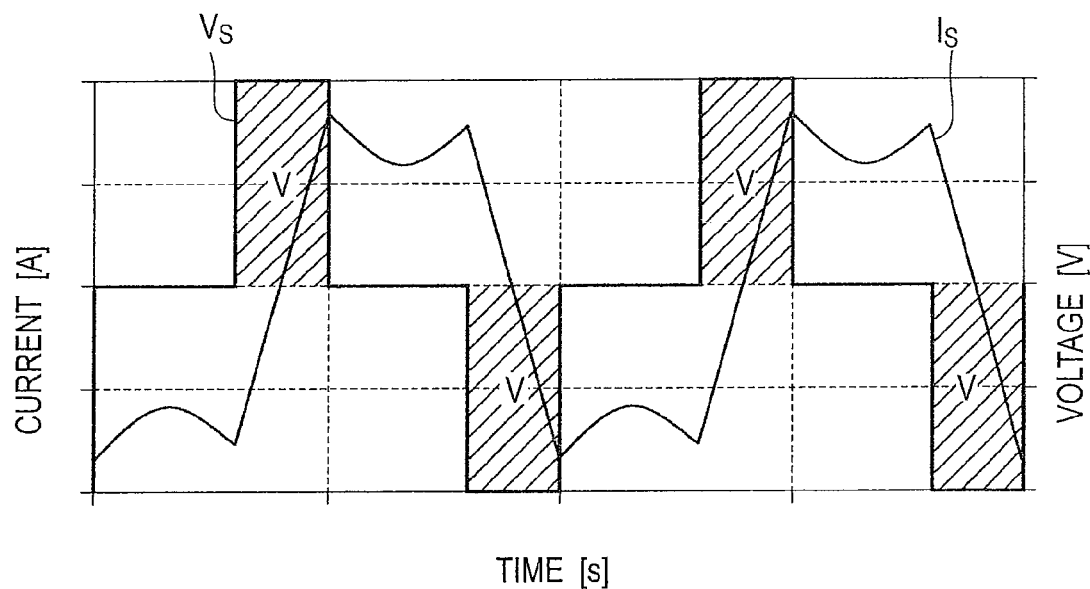
FIG. 41 shows the characteristics of the supply voltage and current relative to time according to the example 1.
Figure 42:
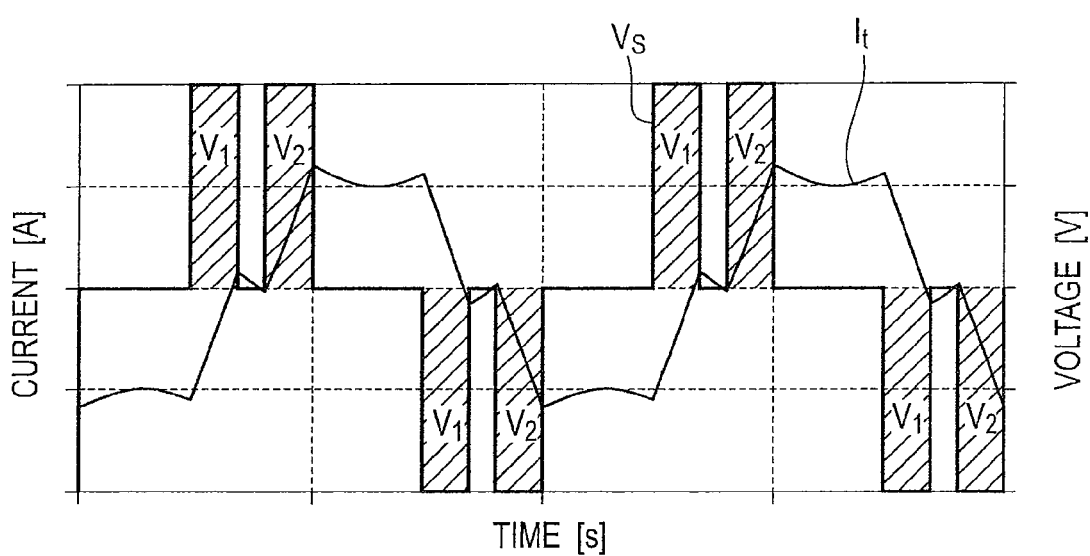
FIG. 42 shows the characteristics of the supply voltage and current relative to time according to the example 2.

Then, in the circuit of the contactless electricity-supplying portion 10 shown in FIG. 36, the first situation where the pulse having no rest period ($t_b$) unlike the eleventh embodiment is defined as the supply voltage (hereinafter referred to as example 1) is compared with the second situation that has the supply voltage according to the eleventh embodiment (hereinafter referred to as example 2), while explaining about the EMI (Electro-Magnetic-Interference) level and efficiency. FIG. 41 shows the characteristics of the supply voltage and current relative to time according to the example 1, and FIG. 42 shows the characteristics of the supply voltage and current relative to time according to the example 2.

Specifically, according to the example 1, as shown in FIG. 41, when an ordinary pulse voltage (Vs) is supplied to the contactless electricity-supplying portion 10, the output current (Is) flows from the high-frequency AC power supply circuit 6 to the contactless electricity-supplying portion 10. On the other hand, according to the example 2, when the pulse voltage (Vt) having the rest period ($t_b$) is supplied to the contactless electricity-supplying portion 10, the output current (It) flows from the high-frequency AC power supply circuit 6 to the contactless electricity-supplying portion 10. However, according to the example 2, setting the rest period ($t_b$) allows the example 2 to be unchanged from the example 1 in terms of total energy. Sum of integral values ($V_1+V_2$) of the supply voltage of the example 2 is made equal to the integral value (V) of the supply voltage of the example 1.

Unlike the example 1, setting the rest period ($t_b$) according to the example 2 allows the raised output current (It) to be lowered once or allows the lowered output current (It) to be raised once. The output current (It) is lowered once or raised once in the rest period ($t_b$), to thereby suppress the peak of the current. Moreover, the inclination (dIt/dt) of the output current (It) is made small.

Figure 43:
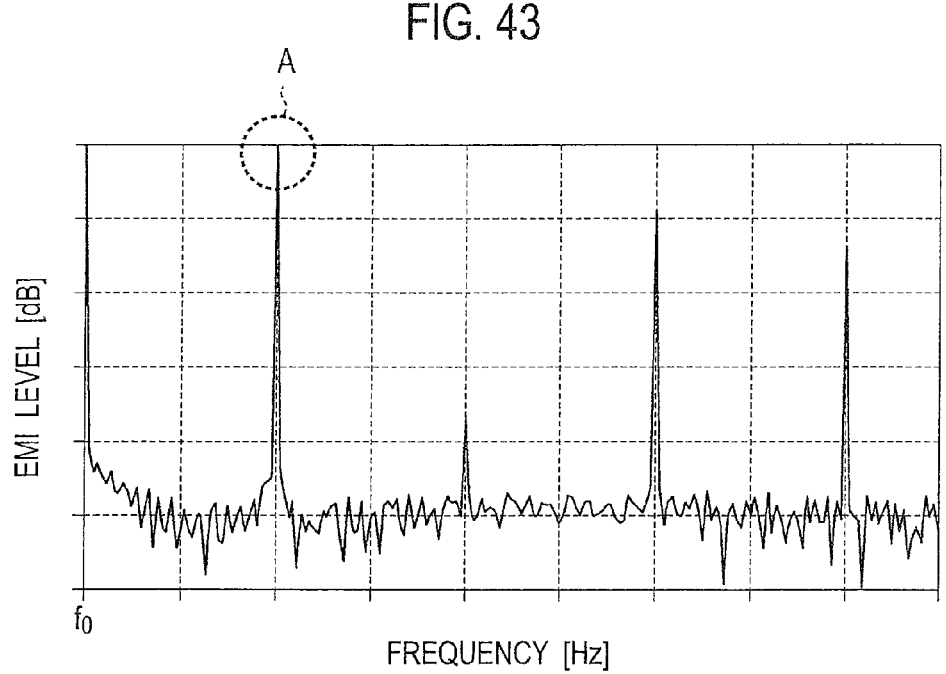
FIG. 43 shows characteristic of the EMI (Electro-Magnetic-Interference) level relative to frequency, according to the example 1.
Figure 44:
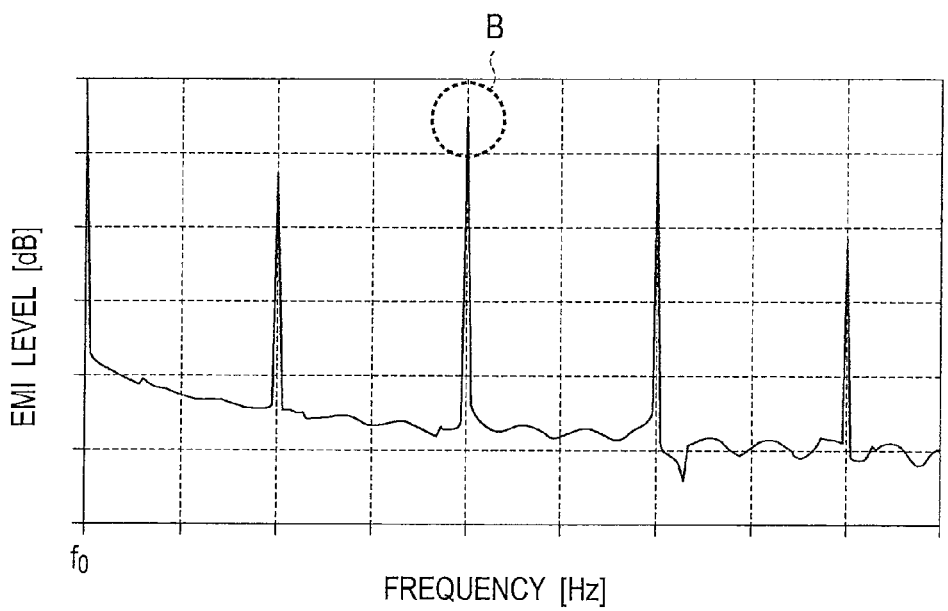
FIG. 44 shows characteristic of the EMI level relative to frequency, according to the example 2.

Then, the EMI (Electro-Magnetic-interference) level will be explained referring to FIG. 43 and FIG. 44. FIG. 43 and FIG. 44 respectively show that the output current (Is) according to the example 1 and the output current (It) according to the example 2 are subjected to FET (Fast Fourier Transformation) analyses, showing characteristics of the EMI level relative to the frequency. The left end of the abscissa corresponds to the fundamental wave frequency component of the fundamental wave frequency ($f_0$).

Herein, the EMI level will be explained. When the output current (Is) of the example 1 or the output current (It) of the example 2 flows in the wiring which connects the high-frequency AC power supply circuit 6 with the contactless electricity-supplying portion 10, the wiring acts like an antenna, thereby causing a possibility that a noise leaks out of the wiring. Then, the noise which corresponds to the EMI occurs at the frequency which is a multiple (in the order of integer) of the fundamental wave frequency component (in other words, having higher frequency component than the fundamental wave frequency component). Then EMI level, that is, the scale of noise depends on the scale of the inclination (dI/dt) of the output current.

When comparing the peak (corresponding to a portion A in FIG. 43) of the EMI level of the example 1 with the peak (corresponding to a portion B in FIG. 44) of the EMI level of the example 2, it is confirmed that the peak of the EMI level according to the example 2 is suppressed. That is, compared with the example 1, the example 2 having the rest period ($t_b$) can make the inclination (dIt/dt) of the output current (It) small, thereby suppressing the EMI level. Then, suppressing the EMI level as shown in the example 2 can prevent noise leak out of the wiring and the example 2 makes the output current (It) small, thereby also suppressing a steady loss.

As stated above, according to the example 2 (eleventh embodiment), the supply voltage including a plurality of positive voltage output periods (sections a and c), the rest period ($t_b$) (section b) between the plurality of positive voltage output periods (sections a and c), a plurality of negative voltage output periods (sections e and g), and the rest period ($t_b$) (section f) disposed between the plurality of negative voltage output periods (sections e and g) is supplied to at least the primary winding 101. This makes it possible to suppress the EMI level and enhance the efficiency.

Figure 45:
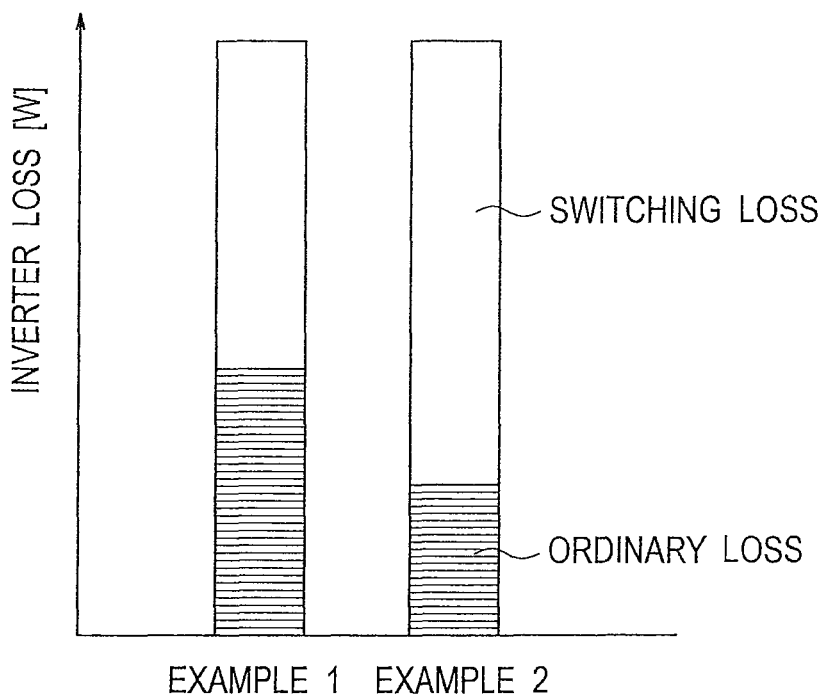
FIG. 45 is a graph showing inverter losses of the respective example 1 and example 2.
Figure 46:
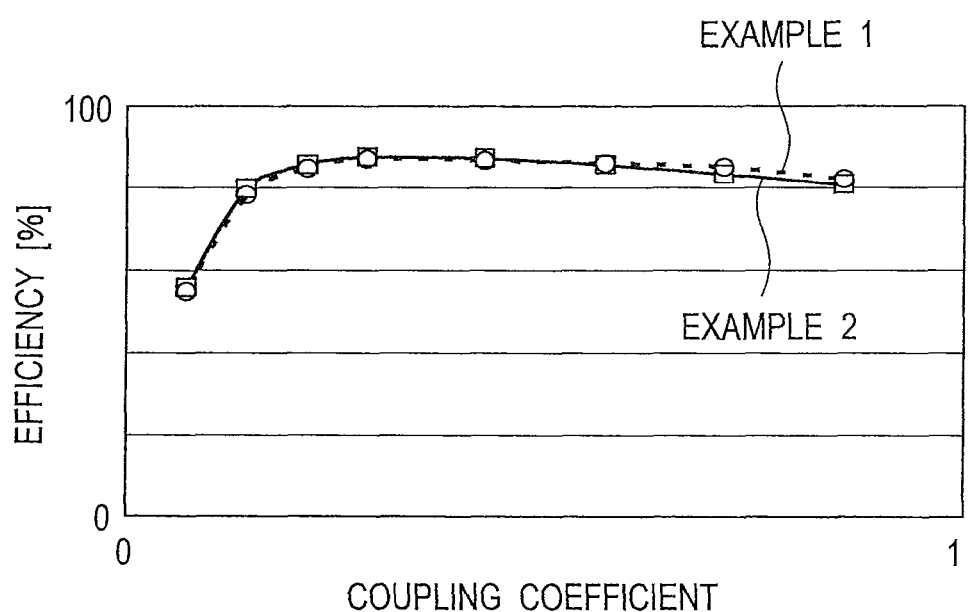
FIG. 46 shows characteristics of the efficiency relative to the coupling coefficient k, according to the example 1 and example 2.

Then, the inverter loss and the efficiency of the example 1 and example 2 will be set forth referring to FIG. 45 and FIG. 46. FIG. 45 is a graph showing inverter losses of the respective example 1 and example 2, and FIG. 46 shows characteristics of the efficiency relative to the coupling coefficient k, according to the example 1 and example 2.

As shown in FIG. 45, the example 2 compared with the example 1 can suppress the steady loss, as stated above. On the other hand, as set forth in FIG. 39(c) and FIG. 39(d), setting the rest period ($t_b$) according to the example 2 increases the number of switching operations of the transistor 63c and transistor 63d per period (T), thus increasing the switching loss compared with the example 1. Thus, comparing the example 1 with the example 2 concludes that there is not so great a difference in total loss. However, as set forth above, the EMI level contributing to the steady loss causes an influence due to the noise leak out of the circuit. Thus, when the EMI level is high, as the case may be, a noise countermeasure is provided otherwise, as a result, increasing cost and providing an extra circuit space. Therefore, when the inverter loss is equivalent, the example 2 is more preferable in that the steady loss can be more suppressed.

The output current It (refer to FIG. 42) of the example 2 is made smaller than the output current Is (refer to FIG. 41) of the example 1 (Is>It), however, as shown in FIG. 46, the efficiency is not decreased according to the example 2. Thus, compared with the example 1, the example 2 keeps the efficiency while making it possible to suppress the steady loss.

Then, an explanation is made about the number of rest periods ($t_b$) provided per period (T). In the circuit of the contactless electricity-supplying portion 10 shown in FIG. 36, unlike the example 2 which sets one rest period ($t_b$) per half period (T/2), the third situation (hereinafter referred to as example 3) has the rest period ($t_b$) set twice per half period (T/2). The example 3 is compared with the example 2.

Figure 47:
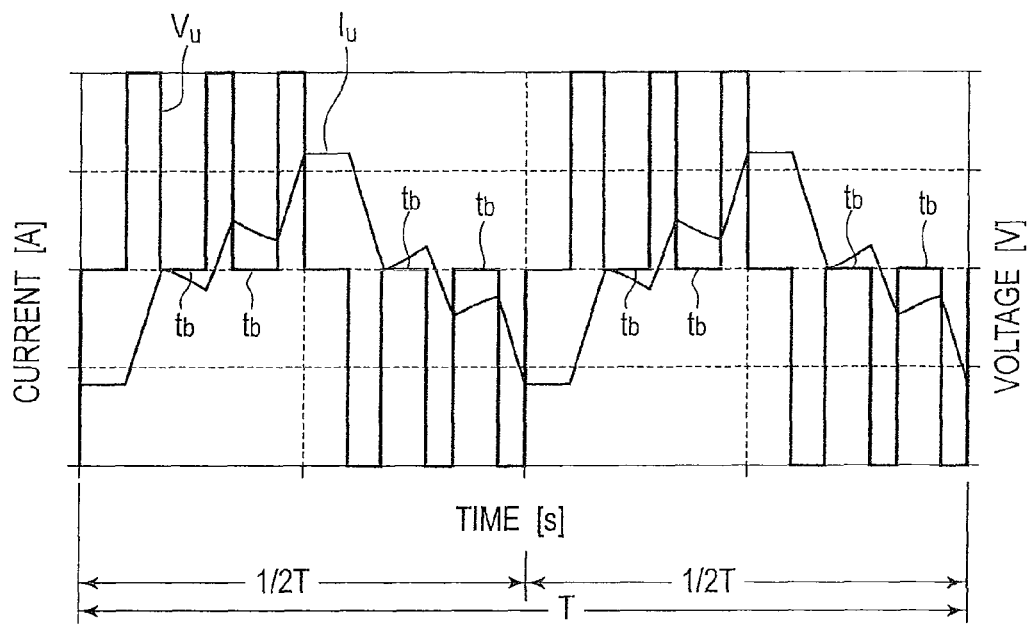
FIG. 47 shows characteristics of the supply voltage and current relative to time.

As shown in FIG. 47, according to the example 3, setting the two rest periods ($t_b$) per half period (T/2) decreases the peak of the output current ($I_u$). FIG. 47 shows characteristics of the supply voltage and current relative to time.

Figure 48:
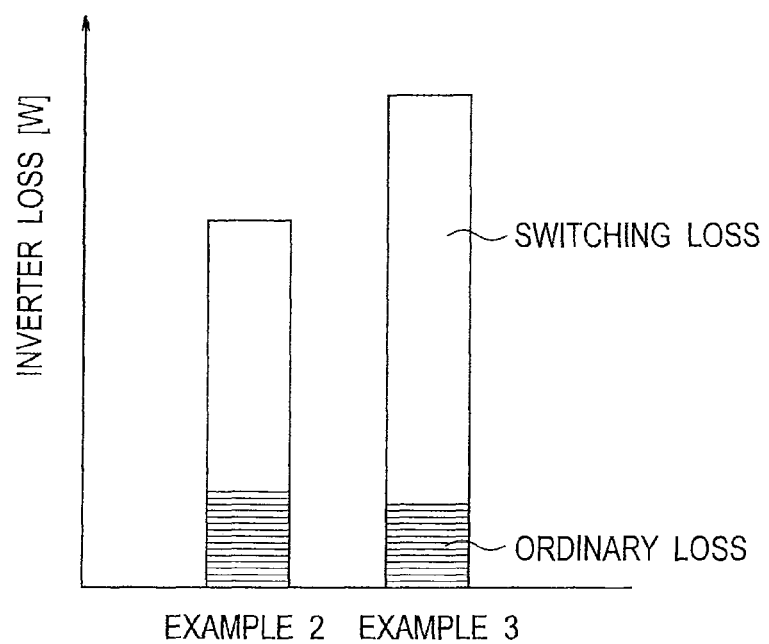
FIG. 48 is a graph showing the inverter losses of the respective example 2 and example 3.

Referring to FIG. 48, the inverter loss of each of the example 2 and the example 3 will be set forth. FIG. 48 is a graph showing the inverter losses of the respective example 2 and example 3. As shown in FIG. 48, the example 3 (refer to FIG. 47) has the output current (I) smaller than that of the example 2 (refer to FIG. 42) (In<It), thereby, the steady loss according to the example 3 decreases, however, such decrease is small. Moreover, according to the example 3, increase of the number of ON-OFF operations of the transistor 63c and transistor 63d increases the switching loss. Then, the increase of the switching loss is larger than the decrease of the steady loss, thereby the example 3 is larger than the example 2 in terms of total inverter loss. That is, in the case of the two or more rest periods ($t_b$) per half period (T/2) (example 3), the effect of suppressing the peak of the output current (I) is smaller compared with one rest period (example 2), meanwhile, the number of switching operations is increased, thus increasing the inverter loss in total.

In addition, in the case of three or more rest periods ($t_b$) per half period (T/2), the effect of suppressing the EMI level is small like the case of two rest periods ($t_b$), thus further enlarging the switching loss, resulting in increased inverter loss.

As set forth above, the example 2 (eleventh embodiment) sets, per period (T), only one rest period ($t_b$) in each of the positive voltage output period and the negative voltage output period. Thus, the EMI level is decreased and thereby the EMI countermeasure is relieved, while making it possible to improve the efficiency.

Figure 49:
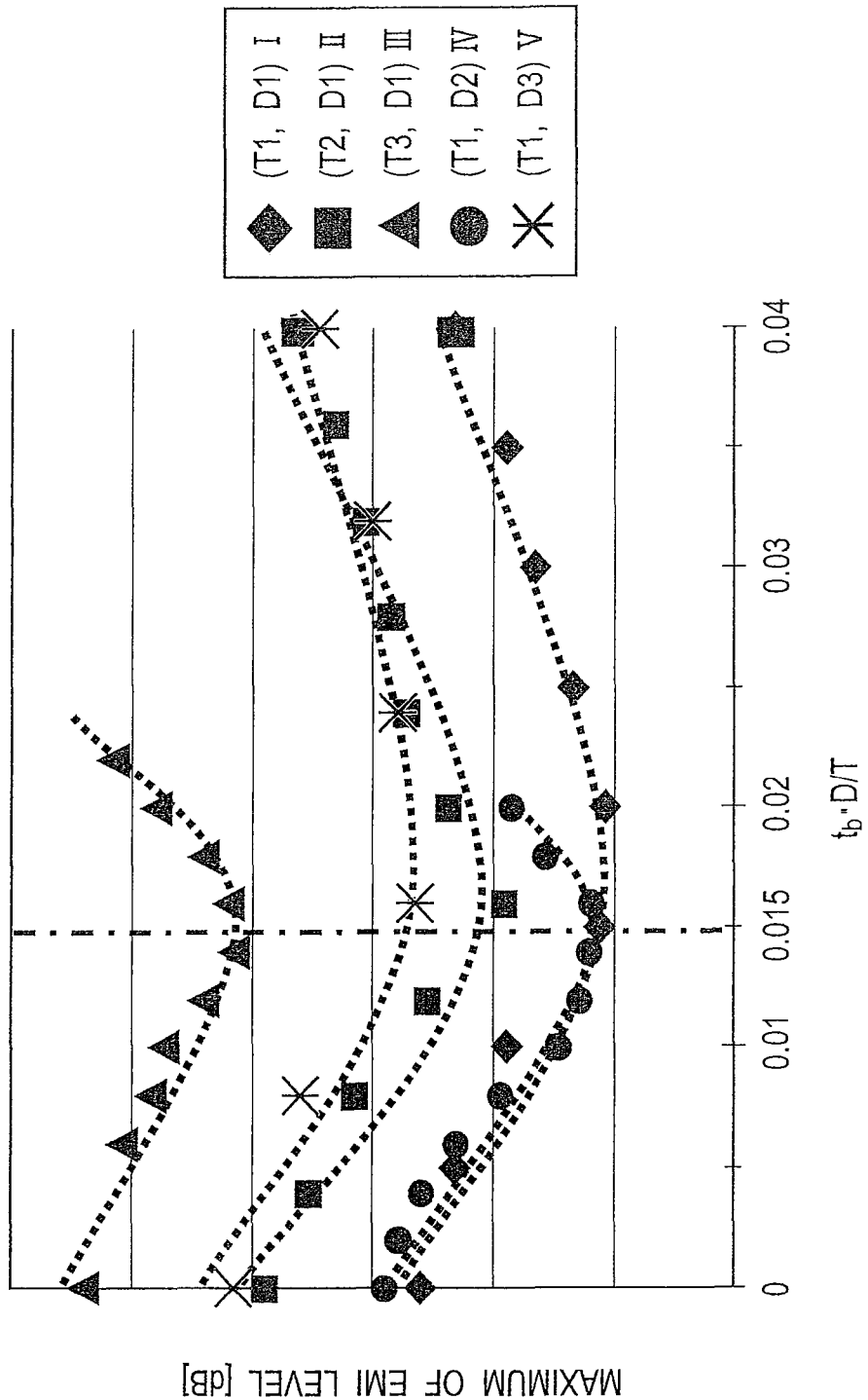
FIG. 49 shows characteristics of the maximum of the EMI (Electro-Magnetic-Interference) level relative to the duty ratio, period and rest period.
Figure 50:
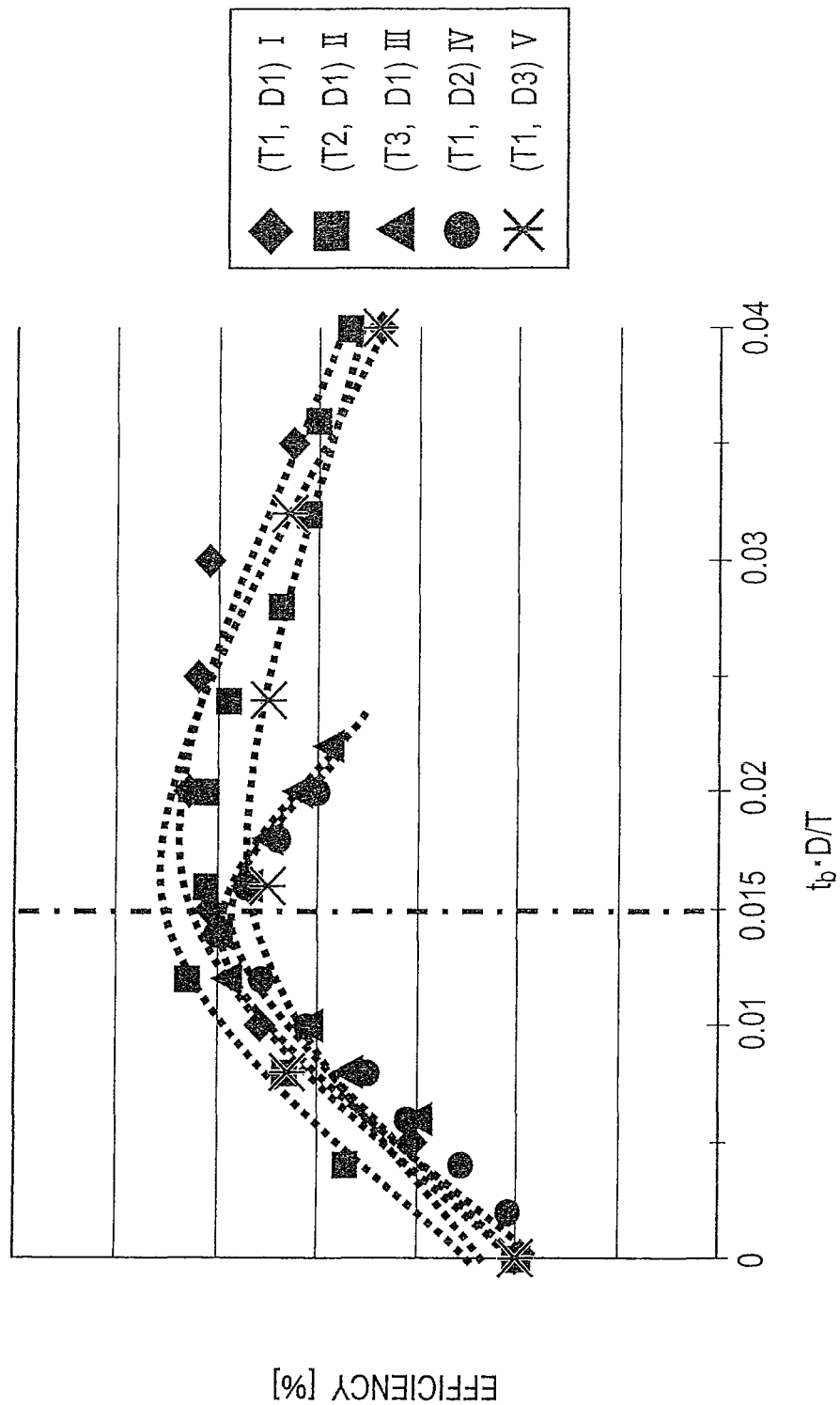
FIG. 50 shows the efficiency relative to the duty ratio, period and rest period.

Then, the rest period ($t_b$) will be set forth referring to FIG. 49 and FIG. 50. FIG. 49 shows characteristics of the maximum of the EMI (Electro-Magnetic-Interference) level relative to the duty ratio (D), period (T) and rest period ($t_b$), and FIG. 50 shows the efficiency relative to the duty ratio (D), period (T) and rest period ($t_b$).

According to the eleventh embodiment, the duty ratio (D) is fixed to a fixed value (D1), the period T is set to a period (T1), a period (T2) and a period (T3), and the rest period ($t_b$)

is changed, to thereby provide the maximum of the EMI level (refer to FIG. 49). Moreover, the period (T) is set to a fixed value (T1), the duty ratio (D) is set to a duty ratio (D2) and a duty ratio (D3), and the rest period ($t_b$) is changed, to thereby provide the maximum of the EMI level. Relative to the rest period ($t_b$), the duty ratio (D) and period (T) are fixed, and as shown in FIG. 49, ($t_b$·D)/T is set as an abscissa and the maximum of the EMI level is set as an ordinate. In FIG. 49, the period (T1) and duty ratio (D1) are denoted by graph I, the period (T2) and duty ratio (D1) are denoted by graph II, the period (T3) and duty ratio (D1) are denoted by graph III, the period (T1) and duty ratio (D2) are denoted by graph IV, and the period (T1) and duty ratio (D3) are denoted by graph V.

Moreover, as shown in FIG. 50, like FIG. 49, the duty ratio (D) is set to a fixed value (D1) and the period (T) is set to a fixed value (T1), to thereby provide the efficiency relative to ($t_b$·D)/T from the graph I to graph V. In addition, the characteristics shown in FIG. 49 and FIG. 50 are denoted by approximate curves of the rest period $t_b$ by taking the rest period $t_b$ with a plurality of discrete values.

As shown in FIG. 49 and FIG. 50, in the case where the duty ratio (D) is fixed to the fixed value (D1) and the period (T) is fluctuated (corresponding to graph I to graph III) and in the case where the period (T) is fixed to the fixed value (T1) and the duty ratio (D) is fluctuated (corresponding to graph IV to graph V), the maximum of EMI level is lowest when the condition of the formula 12 is satisfied, thus causing the highest efficiency.

[Expression 14]

$$t_b = 0.015 \cdot T/D \quad \text{(Formula 12)}$$

As shown above, according to the eleventh embodiment (example 2), the period (T), the rest period ($t_b$) and the duty ratio (D) satisfy the condition of the formula 12. This makes it possible to decrease the maximum of the EMI level while improving the efficiency.

It is not necessary that the relation of formula 12 is completely equal, that is, the rest period ($t_b$) being close to 0.015·T/D is acceptable.

Moreover, according to the eleventh embodiment, the switching pulse (SW1) of the switch $S_3$ is divided to thereby set the switching pulses (SW2) of the switch $S_1$ to switch $S_4$. However, the switching pulse (SW1) of any of the switch $S_1$, switch $S_2$ and switch $S_4$ may be divided.

Moreover, according to the eleventh embodiment, the first rest period ($t_{b1}$) in the output period of the positive voltage is equal in length to the second rest period ($t_{b2}$) in the output period of the negative voltage, however, such lengths failing to be the same are allowed.

Moreover, according to the eleventh embodiment, the explanation has been made about the case where only one rest period ($t_b$) is set per half period (T/2) (example 2), however, this does not eliminate the case where two or more rest periods ($t_b$) per half period (T/2) are set (example 3).

Moreover, according to the eleventh embodiment, the explanation has been made that it is preferable that the relation between the period (T), rest period ($t_b$) and duty ratio (D) have the condition of the formula 12. However, failing to meet the formula 12 is allowed.

In addition, according to the eleventh embodiment, the section a and section c correspond to "positive voltage output period" of the present invention, the section b corresponds to "first rest period" of the present invention, the section e and section g correspond to "negative voltage output period" of the present invention and the section f corresponds to "second rest period" of the present invention.

The entire contents of the Japanese Patent Application No. 2009-117527 (filed May 14, 2009) and Japanese Patent Application No. 2010-101755 (filed Apr. 27, 2010) are incorporated herein by reference, in order to protect the above applications from erroneous translations or omitted portions.

As set forth above, the present invention has been described according to the first to eleventh embodiments, however, the present invention is not limited to the above descriptions and various changes or improvements thereof will obviously occur to those skilled in the art.

INDUSTRIAL APPLICABILITY

According to the present invention, the phase characteristic of the impedance (relative to the frequency) viewed from the output side of an AC power supply so changes as to rotate around an area in the vicinity of a fundamental wave frequency in accordance with the fluctuation of a coupling coefficient. Therefore, when the impedance is set in accordance with the coupling coefficient, the fluctuation band of the phase of the impedance becomes small, as a result, making it possible to suppress decrease of efficiency.

The invention claimed is:

1. A contactless electricity-supplying device comprising:
a secondary winding to which an electric power is supplied from a primary winding by an alternating current power supply;
an impedance characteristic of $Z_1$ relative to a frequency has a maximum in a vicinity of a frequency of a fundamental wave component of the alternating current power supply,
an impedance characteristic of $Z_2$ relative to the frequency has the frequency of the fundamental wave component between, a frequency that has a maximum nearest to the frequency of the fundamental wave component, and a frequency that has a minimum nearest to the frequency of the fundamental wave component,
wherein
$Z_1$ shows that a coupling coefficient between the primary winding and the secondary winding is a certain value, and that the $Z_1$ is an impedance of only a primary side when the $Z_1$ is viewed from an output side of the alternating current power supply, and
$Z_2$ shows that the coupling coefficient between the primary winding and the secondary winding is the certain value, and that the $Z_2$ is an impedance of only a secondary side when the $Z_2$ is viewed from a load side connected to the secondary winding.

2. The contactless electricity-supplying device according to claim 1 wherein, with the coupling coefficient between the primary winding and the secondary winding being the certain value, a phase characteristic of an impedance relative to the frequency viewed from the output side of the alternating current power supply is close to zero relative to the frequency of the fundamental wave component.

3. The contactless electricity-supplying device according to claim 1 wherein, with the coupling coefficient between the primary winding and the secondary winding being the certain value, a phase characteristic of an impedance relative to the frequency viewed from the output side of the alternating current power supply has such a characteristic that when the coupling coefficient is changed in a certain range relative to the certain value, a phase relative to the frequency of the fundamental wave component fluctuates at a value close to zero.

4. The contactless electricity-supplying device according to claim 1 wherein the impedance characteristic of the $Z_1$ further has an extreme value other than the maximum.

5. The contactless electricity-supplying device according to claim 1 wherein the impedance characteristic of the $Z_2$ further has an extreme value other than the maximum and the minimum.

6. The contactless electricity-supplying device according to claim 1 wherein
the phase characteristic of the $Z_1$ relative to the frequency has such a characteristic that a phase inclination relative to the frequency is diverged in an area in the vicinity of the frequency of the fundamental wave component,
the phase characteristic of the $Z_2$ relative to the frequency has such a characteristic as to have at least two points on a frequency axis at which points the phase inclination relative to the frequency is diverged,
between the two points, the phase characteristic has a portion which is parallel to the frequency axis, and
the frequency of the fundamental wave component is disposed between the two points.

7. The contactless electricity-supplying device according to claim 1 wherein a first capacitor is connected in parallel to the primary winding.

8. The contactless electricity-supplying device according to claim 7 wherein a first inductor is connected in series to the primary winding and the first capacitor.

9. The contactless electricity-supplying device according to claim 7 wherein a second capacitor is connected in series to a parallel circuit composed of the primary winding and the first capacitor.

10. The contactless electricity-supplying device according to claim 7 wherein a first inductor is connected to a first end of a parallel circuit composed of the primary winding and the first capacitor and a second capacitor is connected to a second end of the parallel circuit composed of the primary winding and the first capacitor.

11. The contactless electricity-supplying device according to claim 1 wherein a fourth capacitor is connected in series to a parallel circuit composed of the secondary winding and a third capacitor.

12. The contactless electricity-supplying device according to claim 1 wherein
a fifth capacitor is connected in series to the secondary winding, and
a third capacitor is connected in parallel to a series circuit composed of the secondary winding and the fifth capacitor.

13. The contactless electricity-supplying device according claim 12 wherein a sixth capacitor is connected to an area between a connection point between the secondary winding and the fifth capacitor and a second end of the secondary winding.

14. The contactless electricity-supplying device according claim 12 wherein a fourth capacitor is connected to a connection point between the fifth capacitor and the third capacitor.

15. The contactless electricity-supplying device according to claim 1 wherein
a fifth capacitor is connected in series to the secondary winding, and
a third inductor is connected in parallel to a series circuit composed of the secondary winding and the fifth capacitor.

16. The contactless electricity-supplying device according to claim 15 wherein a fourth capacitor is connected to a connection point between the fifth capacitor and the third inductor.

17. The contactless electricity-supplying device according to claim 1 wherein a fourth inductor is connected in series to the secondary winding and a third capacitor is connected in parallel to a series circuit composed of the secondary winding and the fourth inductor.

18. A vehicle comprising:
the contactless electricity-supplying device according to claim 1,
wherein the secondary winding is mounted to the vehicle, and a coupling coefficient between the primary winding and the secondary winding is set in accordance with a parking position of the vehicle.

19. The contactless electricity-supplying device according to claim 1 wherein
a first capacitor is connected in parallel to the primary winding,
a fourth capacitor is connected in series to a parallel circuit composed of the secondary winding and a third capacitor,
the frequency of the fundamental wave component is set in a vicinity of a resonant frequency of the $Z_1$, and
the frequency of the fundamental wave component is set between a first resonant frequency of the $Z_2$ and a second resonant frequency of the $Z_2$, the second resonant frequency being higher than the first resonant frequency.

20. The contactless electricity-supplying device according to claim 1 wherein
a first capacitor is connected in parallel to the primary winding and a fourth capacitor is connected in series to a parallel circuit composed of the secondary winding and a third capacitor, satisfying $C_{1p}=1/(L_1(2\pi f_0)^2)$ and $C_{2p}<(L_1/L_2)C_{1p}<(C_{2s}+C_{2p})$, where $C_{1p}$ denotes a capacitance of the first capacitor, $L_1$ denotes an inductance of the primary winding, $f_0$ denotes the frequency of the fundamental wave component, $C_{2p}$ denotes a capacitance of the third capacitor, $C_{2s}$ denotes a capacitance of the fourth capacitor and $L_2$ denotes an inductance of the secondary winding.

21. The contactless electricity-supplying device according to claim 1 wherein
a first capacitor is connected in parallel to the primary winding,
a fourth capacitor is connected in series to a parallel circuit composed of the secondary winding and a third capacitor,
with the coupling coefficient between the primary winding and the secondary winding being the certain value, when the impedance characteristic viewed from the output side of the alternating current power supply is denoted by a complex plane, a first pole that is nearest to an imaginary axis moves away from the imaginary as the coupling coefficient between the primary winding and the secondary winding increases, and a second pole that is second nearest to the imaginary axis approaches the first pole as the coupling coefficient increases.

22. The contactless electricity-supplying device according to claim 1 wherein
a supply voltage supplied from the alternating current power supply to the primary winding at a certain period includes, per period, a plurality of positive voltage output periods and a plurality of negative voltage output periods, a first rest period disposed between the plurality of positive voltage output periods and a second rest period disposed between the plurality of negative voltage output periods.

23. The contactless electricity-supplying device according to claim 22 wherein the first rest period and the second rest period are the same in time length.

24. The contactless electricity-supplying device according to claim 22 wherein, per period, the supply voltage has each of the first rest period and the second rest period one in number.

25. The contactless electricity-supplying device according to claim 22 wherein when T denotes the certain period, $t_{b1}$ denotes the first rest period, $t_{b2}$ denotes the second rest period and D denotes a duty ratio, $t_{b1}=0.015 \cdot T/D$ or $t_{b2}=0.015 \cdot T/D$ is satisfied.

* * * * *